(12) United States Patent
Boudreau et al.

(10) Patent No.: US 9,705,649 B2
(45) Date of Patent: Jul. 11, 2017

(54) MOBILE RELAY NODE BASED COMP ASSISTED INTERFERENCE MITIGATION

(71) Applicant: Telefonaktiebolaget L M Ericsson (publ), Stockholm (SE)

(72) Inventors: Gary David Boudreau, Kanata (CA); Konstantinos Dimou, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 329 days.

(21) Appl. No.: 13/964,582

(22) Filed: Aug. 12, 2013

(65) Prior Publication Data

US 2015/0043419 A1 Feb. 12, 2015

(51) Int. Cl.
| | |
|---|---|
| H04B 7/14 | (2006.01) |
| H04L 5/00 | (2006.01) |
| H04B 7/024 | (2017.01) |
| H04B 7/026 | (2017.01) |
| H04B 7/155 | (2006.01) |

(52) U.S. Cl.
CPC ........... H04L 5/0037 (2013.01); H04B 7/024 (2013.01); H04B 7/026 (2013.01); H04B 7/15592 (2013.01)

(58) Field of Classification Search
CPC ...................................................... H04B 7/026
USPC ........................................................ 370/315
See application file for complete search history.

(56) References Cited

U.S. PATENT DOCUMENTS

| | | | | |
|---|---|---|---|---|
| 6,085,095 A * | 7/2000 | Collmann | ............... | H04M 3/36 455/446 |
| 7,836,305 B2 | 11/2010 | Verón | | |
| 8,305,987 B2 | 11/2012 | Fong et al. | | |
| 9,088,332 B2 | 7/2015 | Boudreau et al. | | |
| 9,144,037 B2 * | 9/2015 | Seong | ................... | H04L 1/0069 |
| 9,231,723 B2 * | 1/2016 | Zhu | ..................... | H04W 76/048 |
| 9,338,703 B2 | 5/2016 | Lee et al. | | |
| 9,538,450 B2 | 1/2017 | Al-Shalash | | |
| 2009/0227259 A1 | 9/2009 | Min et al. | | |
| 2010/0291936 A1 * | 11/2010 | Zangi | ..................... | H04B 7/024 455/450 |
| 2010/0296475 A1 * | 11/2010 | Visotsky | .............. | H04B 7/2606 370/329 |
| 2011/0021153 A1 * | 1/2011 | Safavi | .................. | H04B 7/0434 455/63.1 |
| 2011/0026421 A1 * | 2/2011 | Luo et al. | ..................... | 370/252 |

(Continued)

FOREIGN PATENT DOCUMENTS

| | | |
|---|---|---|
| WO | 2011020062 A2 | 2/2011 |
| WO | 2012109725 A2 | 8/2012 |

(Continued)

OTHER PUBLICATIONS

International Search Report and Written Opinion for PCT/IB2014/063859, mailed Feb. 3, 2015, 23 pages.

(Continued)

*Primary Examiner* — Guang Li

(74) *Attorney, Agent, or Firm* — Withrow & Terranova, PLLC

(57) ABSTRACT

Systems and methods for Mobile Relay Node (MRN) based Coordinated Multipoint (CoMP) operation in a cellular communications network are disclosed. In one embodiment, MRN based CoMP operation is utilized to provide interference mitigation for wireless devices, and preferably provide interference mitigation for cell edge wireless devices.

49 Claims, 39 Drawing Sheets

(56) References Cited

U.S. PATENT DOCUMENTS

| | | | |
|---|---|---|---|
| 2011/0051655 A1 | 3/2011 | Blankenship et al. | |
| 2011/0183669 A1 | 7/2011 | Kazmi | |
| 2011/0194483 A1 | 8/2011 | Ji et al. | |
| 2011/0237272 A1* | 9/2011 | Gorokhov | H04B 7/024 455/452.1 |
| 2012/0028663 A1* | 2/2012 | Nejatian | H04W 16/14 455/501 |
| 2012/0069790 A1 | 3/2012 | Chung et al. | |
| 2012/0184218 A1 | 7/2012 | Boudreau et al. | |
| 2012/0188950 A1* | 7/2012 | Luo et al. | 370/329 |
| 2012/0201191 A1 | 8/2012 | Seo et al. | |
| 2012/0236741 A1* | 9/2012 | Xu | H04B 7/024 370/252 |
| 2012/0282934 A1 | 11/2012 | Simonsson et al. | |
| 2013/0128832 A1* | 5/2013 | Kang et al. | 370/329 |
| 2013/0189930 A1* | 7/2013 | Kinnunen | H04W 16/12 455/67.11 |
| 2013/0223400 A1* | 8/2013 | Seo et al. | 370/329 |
| 2013/0235839 A1* | 9/2013 | Kim | H04L 5/0092 370/329 |
| 2013/0272170 A1* | 10/2013 | Chatterjee | H04W 28/02 370/280 |
| 2013/0303167 A1* | 11/2013 | Zhu | H04W 76/048 455/436 |
| 2013/0322287 A1* | 12/2013 | Bontu et al. | 370/252 |
| 2013/0329692 A1* | 12/2013 | Vrzic et al. | 370/329 |
| 2014/0153427 A1* | 6/2014 | Seo et al. | 370/252 |
| 2014/0177456 A1* | 6/2014 | Boudreau | H04W 72/0406 370/252 |
| 2014/0308905 A1* | 10/2014 | Miao | H04L 5/0023 455/67.11 |
| 2015/0023194 A1* | 1/2015 | Seo et al. | 370/252 |

FOREIGN PATENT DOCUMENTS

| | | |
|---|---|---|
| WO | 2012114151 A1 | 8/2012 |
| WO | WO 2012109725 A2 * | 8/2012 |

OTHER PUBLICATIONS

Huawei, "Discussion on relay in CoMP," R1-092371, 3GPP TSG RAN WG1 meeting #57bis, Jun. 29-Jul. 3, 2009, Los Angeles, CA, 3 pages.

Olszewski, Kim et al., "Concurrent Relay Station Frame Zones for Multi-hop Relaying," IEEE C802.16m-08/070, IEEE 802.16 Broadband Wireless Access Working Group, Jan. 16, 2008, 15 pages.

Soldani, D. et al., "Wireless Relays for Broadband Access," IEEE Communications Magazine, Mar. 2008, IEEE, pp. 58-66.

Invitation to Pay Additional Fees and Partial International Search for PCT/IB2014/063859, mailed Oct. 29, 2014, 9 pages.

Juntunen, Aki, "Resource Allocation in LTE-A Uplink with Relays," Thesis—Department of Electrical and Information Engineering Degree Program in Telecommunication at University of Oulu, 2011, 79 pages.

International Preliminary Report on Patentability for International Patent Application No. PCT/IB2014/063859, mailed Feb. 25, 2016, 16 pages.

* cited by examiner

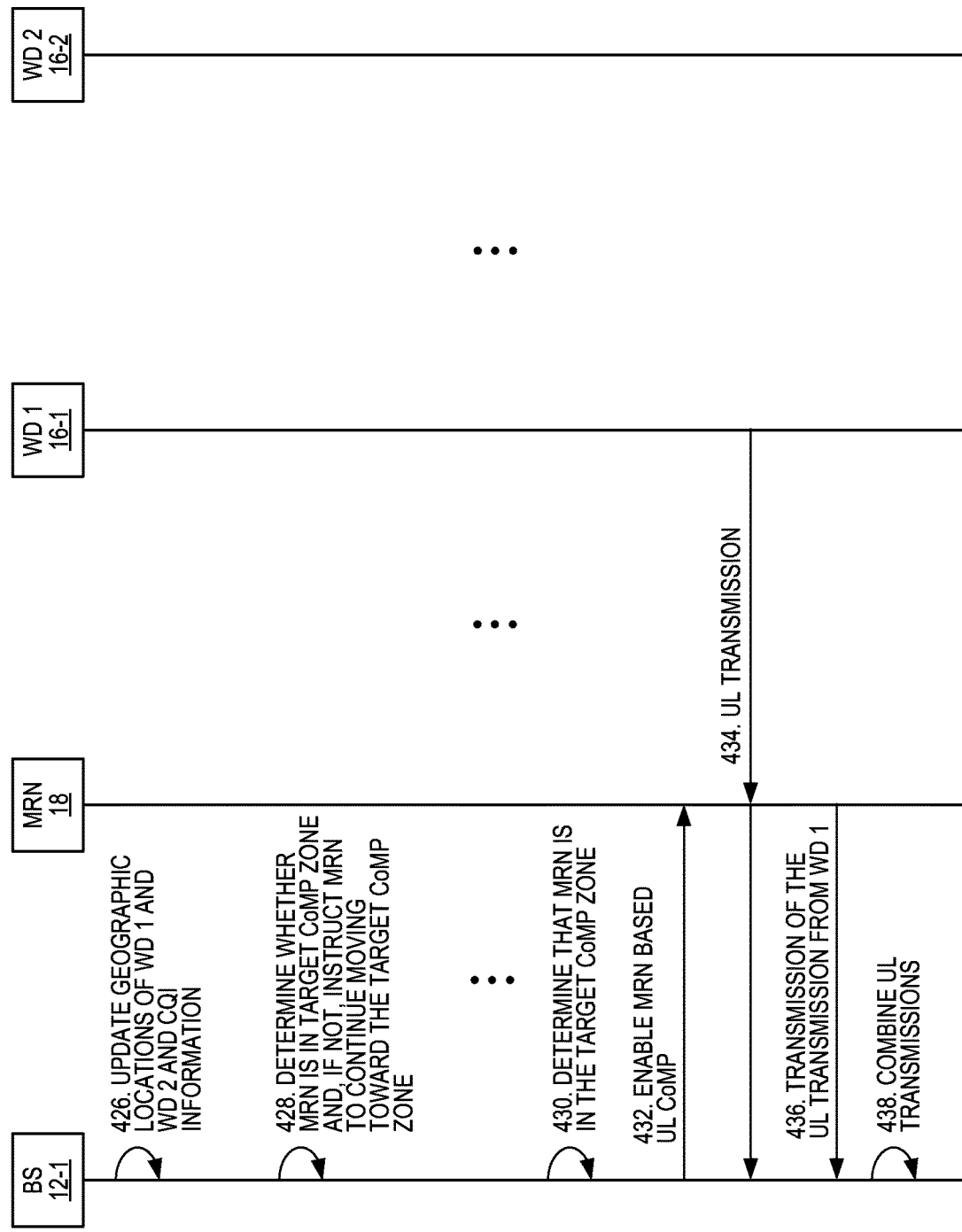

MOBILE RELAY NODE BASED COMP ASSISTED INTERFERENCE MITIGATION

FIELD OF THE DISCLOSURE

The present disclosure relates to a cellular communications network and more specifically relates to Mobile Relay Node (MRN) based Coordinated Multipoint (CoMP) operation in a cellular communications network.

BACKGROUND

The growing demands on cellular communications networks to support data applications at higher throughputs and spectral efficiencies has driven the need to develop Orthogonal Frequency Division Multiplexing (OFDM) based 4th generation (4G) networks including $3^{rd}$ Generation Partnership Project (3GPP) Long Term Evolution (LTE). A key objective with respect to deployment of OFDM 4G cellular communications networks is to utilize a frequency re-use of 1 (denoted by N=1), or as close to N=1 frequency re-use as is practical. A frequency re-use of N=1 implies that base stations simultaneously transmit on all available time-frequency Resource Blocks (RBs).

The need for higher throughput in 4G networks, especially near the cell edge, combined with the constraint on the uplink link budget will necessitate the need for smaller cell sizes than is typically deployed for present 2nd generation (2G) and 3rd generation (3G) cellular communications networks. The addition of smaller cells can be deployed in a traditional homogenous cell splitting approach or in a more ad hoc heterogeneous approach in which small cells (e.g., pico cells) or relay nodes are overlaid on a macro cell grid in an existing cellular communications network. For both a homogeneous and a heterogeneous approach, the resulting interference limited system for N=1 deployment will not achieve the full potential capacity that can be supported without the implementation of one or more viable interference mitigation and/or cancellation techniques.

Interference mitigation and cancellation techniques have been investigated and deployed with varying degrees of success in terrestrial cellular communications networks for over 20 years. Traditional approaches to interference mitigation between transmitted signals have focused on either: (i) ensuring orthogonality between transmitted signals in time, frequency, as well as space or (ii) actively removing and cancelling interfering signals from the desired signal if orthogonality between the desired signal and potential interferers cannot be achieved. In early 2G cellular communications networks such orthogonality was achieved primarily through static pre-planned allocations of radio resources. 3G cellular communications networks introduced interference cancellation techniques based mostly on a combination of blind information gathering at a base station (e.g., spectrum usage monitoring) and coarse exchange of interference indicators (e.g., the Rise over Thermal (RoT) indicator employed in the 3GPP2 1×EV-DO standard). Typically, interfering signals have been estimated using blind detection, and then the estimates of the interfering signals are subtracted from the desired signals.

More recently, Coordinated Multipoint (CoMP) transmission and reception approaches have been investigated to improve both cell edge and aggregate user throughputs on both Uplink (UL) and Downlink (DL) transmission in cellular communications networks including LTE release 8, 10, and 11. CoMP can take a number of forms including coordinated scheduling, coordinated beamforming, and joint processing. In particular, whereas joint processing can enhance cell edge coverage and capacity problems, it can result in high inter-base station transmission requirements (i.e., high X2 transmission requirements) for inter-base station CoMP solutions for both homogeneous and heterogeneous networks, including remote-radio head deployments. Thus, one of the fundamental problems of CoMP, which is particularly an issue for UL CoMP but is also an issue for DL CoMP, is the cost and complexity of the needed transport network required to deliver signals between base stations of CoMP coordinated cells and the base station of the CoMP coordinating cell.

One approach for addressing this issue involves transporting digitized Radio Frequency (RF) spectrum signals from Remote Radio Head (RRH) units of neighboring CoMP coordinated base stations to the CoMP coordinating base station. For LTE, this potentially incurs a needed bandwidth of up to 2.5 Gigabits per second (Gbps) per 2 Branch diversity 20 Megahertz (MHz) carrier. After provisions are made to allow multiple cells to share with neighboring cells, the amount of required intercellular bandwidth can potentially exceed the non-CoMP case by a factor of 20. Other choices exist for UL CoMP payload types—see for example U.S. Patent Application Publication No. 2012/0184218. While these payload types are amenable to packet transport and are less demanding for bandwidth, they too may drive high peak bandwidths due to short required latencies.

In the case where the CoMP payload is not a streaming type (i.e., the CoMP payload is not a signal such as RF over Common Public Radio Interface (CPRI) but rather a payload that is arrived at by computations at the cooperating base station), the cooperating base station is under time deadlines to execute the necessary computations and send the result of the computations to the serving base station such that the result arrives within a timeframe in which the serving cell needs the payload. In LTE, the Hybrid Automatic Repeat Request (HARQ) timing for Frequency Division Duplexing (FDD) operation is typically set to 4 milliseconds (ms) such that the HARQ process can assist in exploiting the short term behavior of the mobile channel. This is perceived as a valuable attribute of the air interface. Note that there are even more stringent real time processing requirements for streaming payloads.

Usual solutions are defined that deliver the CoMP payload with a latency that allows the payload to be useful at the serving cell within the HARQ deadline. This drives less than 500 microsecond (μs) latencies and, as a result, high peak data rate requirements. In addition, it should be recognized that, in LTE, the on-air timing of cells are the same such that hand-off and other functions of the air interface are optimized. This compounds the high peak data rates for inter-base station communications.

In addition to the issues discussed above, it has become evident that processing requirements (i.e., Central Processing Unit (CPU) or Digital Signal Processing (DSP) processing requirements) for harvesting a CoMP payload are an issue. Thus, there is also a need for reducing processing requirements for harvesting a CoMP payload.

U.S. Pat. No. 8,305,987, PCT Patent Application Publication No. WO 2012/114151, PCT Patent Application Publication No. WO 2011/020062, and U.S. Patent Application Publication No. 2012/0201191 propose the use of CoMP with mobile relay nodes with regard to a number of aspects including the use of Channel State Information Reference Signal (CSI-RS), carrier aggregation, control, and backhaul signaling. However, these disclosures fail to address interference to cell edge user equipments (and thus decreased throughput to cell edge user equipments), peak data rates, latency, and high processing requirements during CoMP operation.

Thus, there is a need for systems and methods that mitigate peak data rates for inter-base station communications (i.e., X2 communications in LTE) between CoMP coordinated base stations required for CoMP operation. There is also a need for systems and methods for reducing latency of inter-base station communications between CoMP coordinated base stations as well as increasing throughput of cell edge and network aggregate throughput.

SUMMARY

The present disclosure relates to Mobile Relay Node (MRN) based Coordinated Multipoint (CoMP) operation in a cellular communications network. In one embodiment, MRN based CoMP operation is utilized to provide interference mitigation for wireless devices, and preferably provide interference mitigation for cell edge wireless devices.

In one embodiment, a network node for a cellular communications network includes a radio subsystem and a processing subsystem. The processing subsystem is configured to effect MRN based CoMP operation for a wireless device via an MRN positioned in a target CoMP zone within a cell served by a serving base station of the wireless device. In one embodiment, the target CoMP zone is a zone with the cell served by the serving base station of the wireless device in which interference to the wireless device is mitigated by the MRN based CoMP operation for the wireless device. In one embodiment, the wireless device is located in a cell edge area of the cell served by the serving base station of the wireless device.

In one embodiment, the MRN based CoMP operation is MRN based Uplink (UL) CoMP, and the target CoMP zone for the wireless device is a zone within the cell served by the serving base station of the wireless device in which uplink interference from a second wireless device located in a cell edge area of a neighboring cell to an uplink of the wireless device is mitigated by the MRN based CoMP operation. In one embodiment, the target CoMP zone is a function of a number of link metrics that include a link metric that is indicative of a radio distance between the MRN and the serving base station, a link metric that is indicative of a radio distance between the MRN and the wireless device, a link metric that is indicative of a radio distance between the second wireless device and the serving base station, and a link metric that is indicative of a radio distance between the MRN and the second wireless device. Further, in one embodiment, the target CoMP zone is a zone in which the radio distance between the MRN and the serving base station is relatively small as compared to the radio distance between the second wireless device and the serving base station and the radio distance between the MRN and the wireless device is relatively small as compared to the radio distance between the MRN and the second wireless device.

In another embodiment, the MRN based CoMP operation is MRN based Downlink (DL) CoMP, and the target CoMP zone for the wireless device is a zone within the cell served by the serving base station of the wireless device in which downlink interference from a neighboring base station to a downlink of the wireless device is mitigated by the MRN based CoMP operation. In one embodiment, the target CoMP zone is a function of a number of link metrics that include a link metric that is indicative of a radio distance between the MRN and the serving base station, a link metric that is indicative of a radio distance between the MRN and the wireless device, a link metric that is indicative of a radio distance between the neighboring base station and the wireless device, and a link metric that is indicative of a radio distance between the neighboring base station and the MRN. Further, in one embodiment, the target CoMP zone is a zone in which the radio distance between the serving base station and the MRN is relatively small as compared to the radio distance between the neighboring base station and the MRN and the radio distance between the MRN and the wireless device is relatively small as compared to the radio distance between the neighboring base station and the wireless device.

In one embodiment, the network node is the base station. In another embodiment, the network node is the MRN.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 6A:
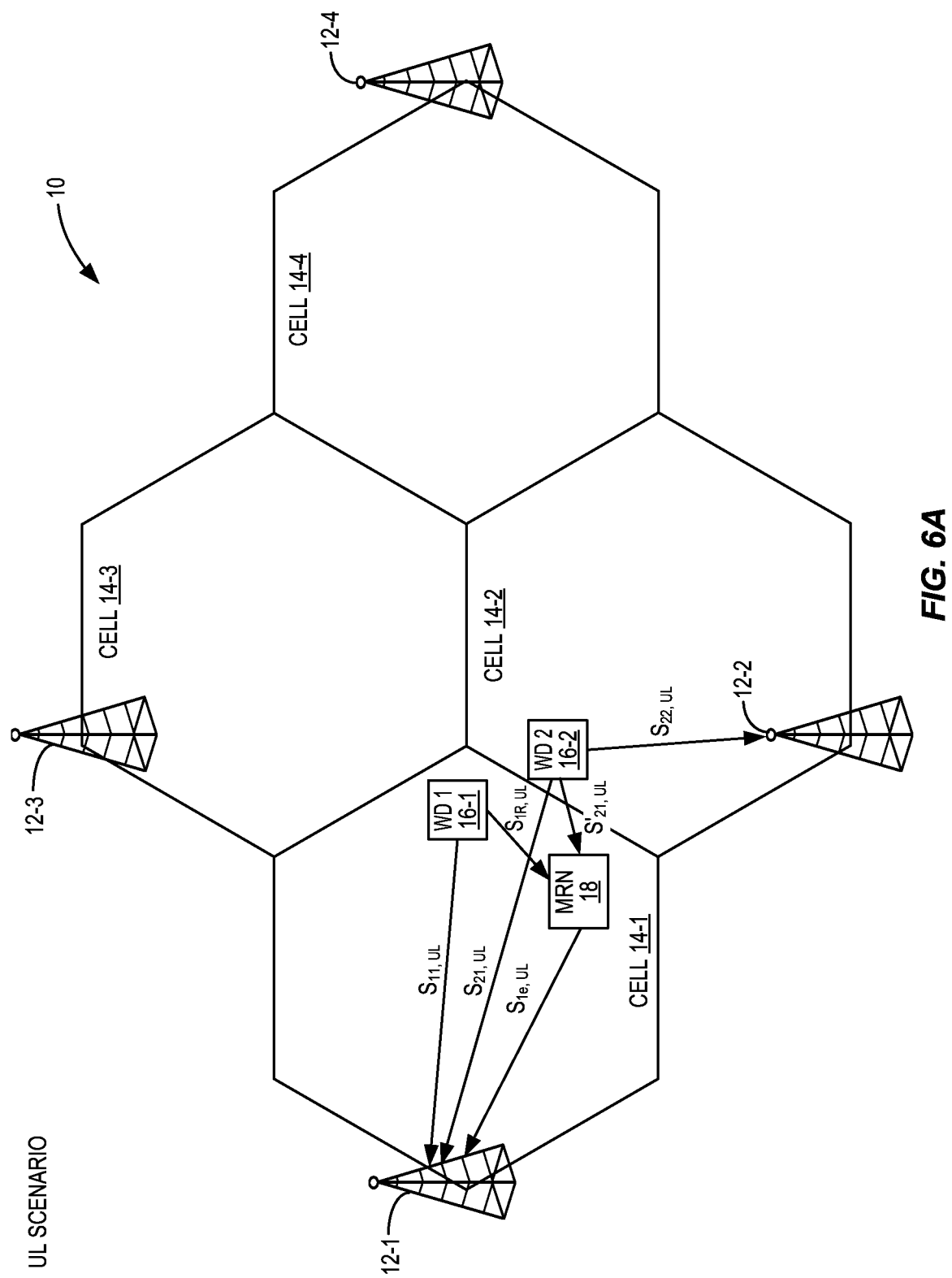
Figure 6B:
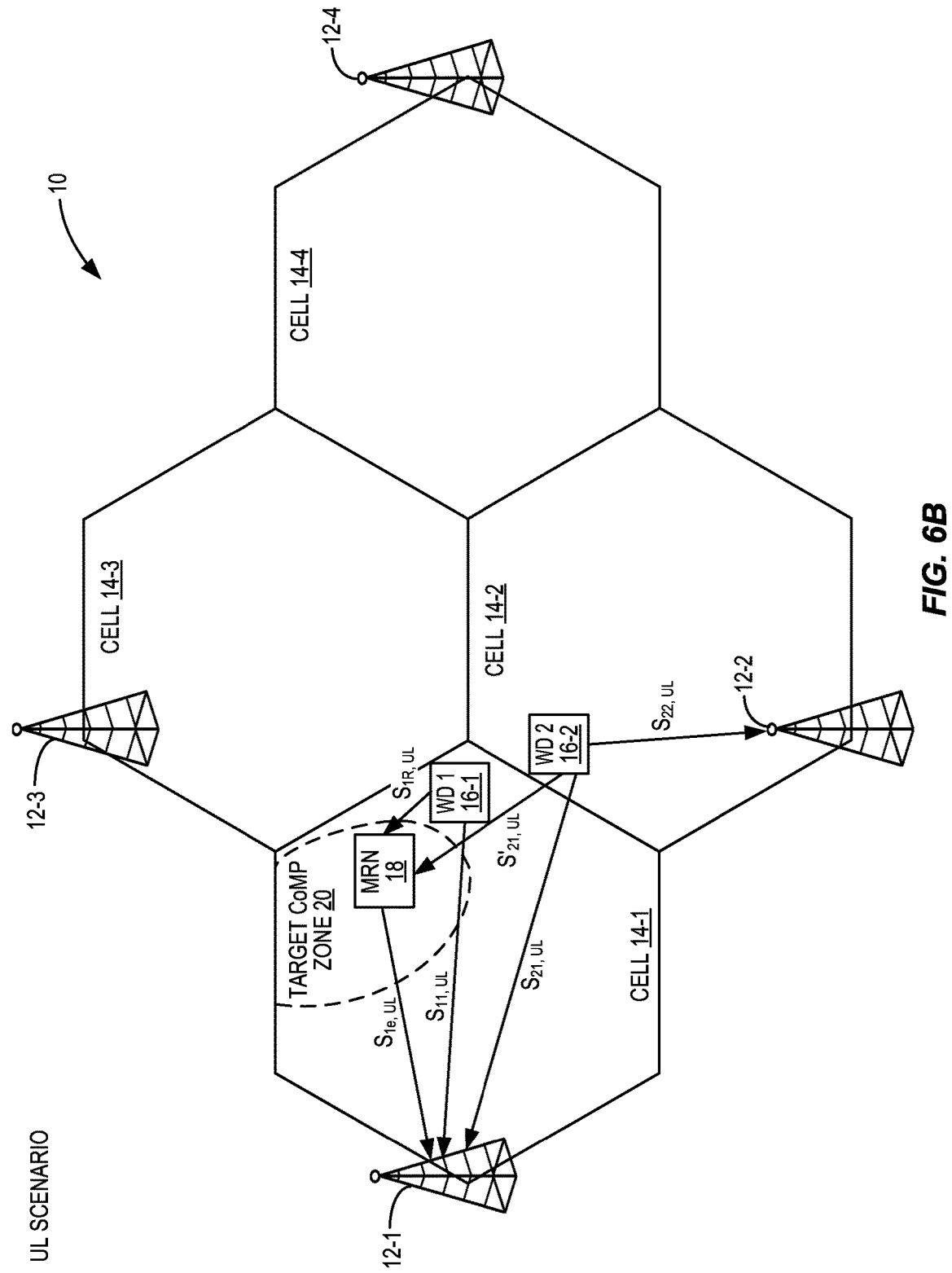
Figure 7A:
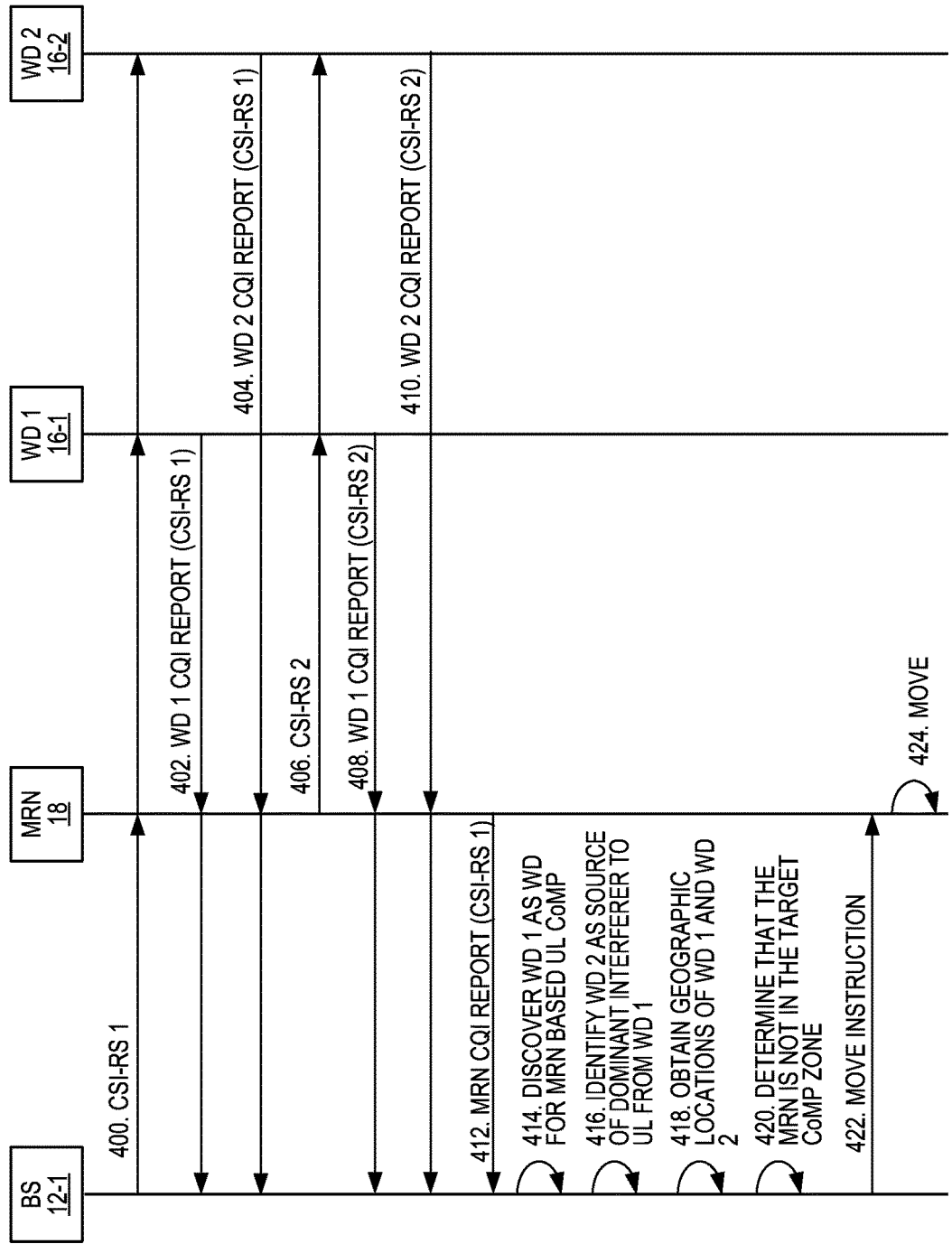
Figure 8:
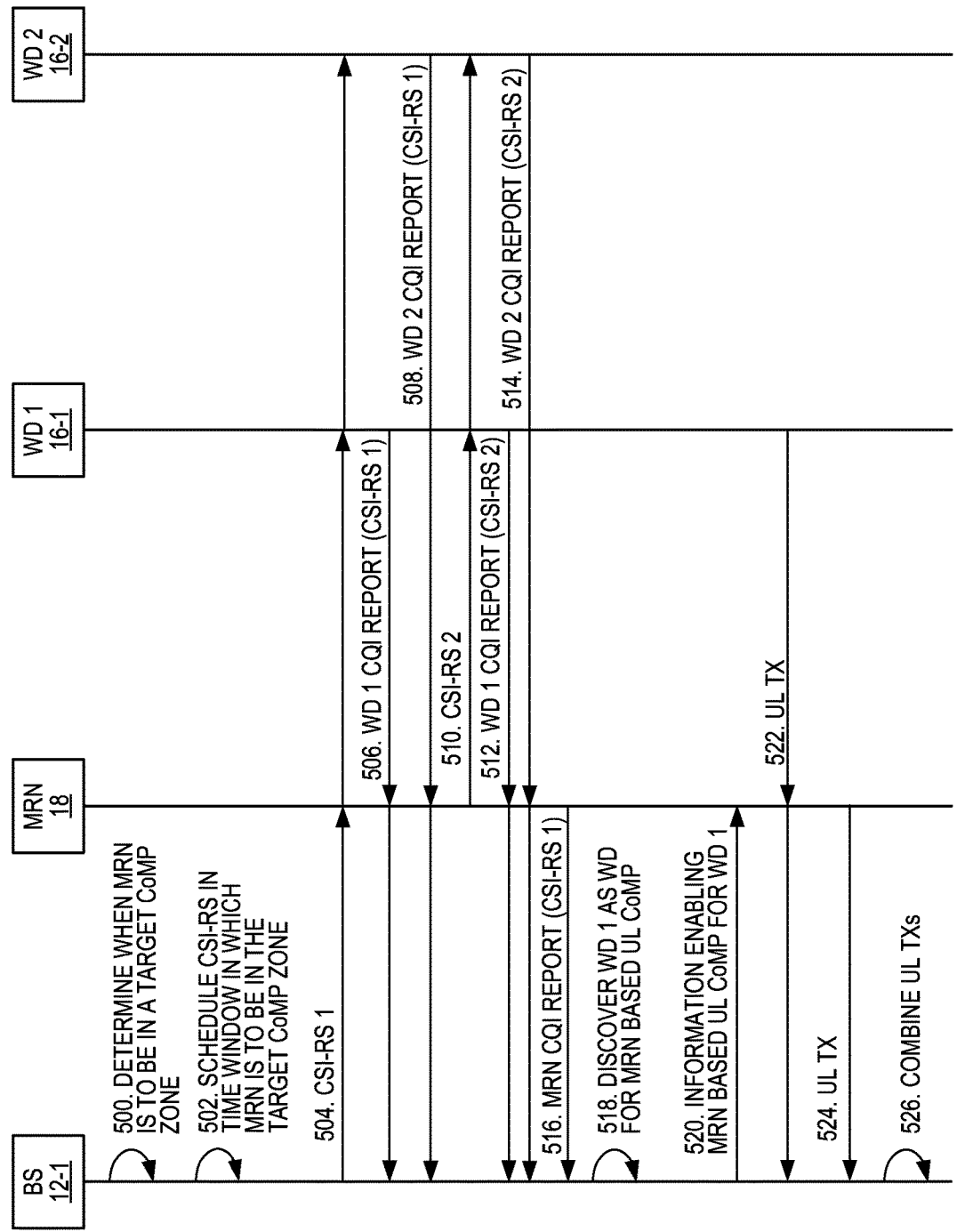
Figure 9:
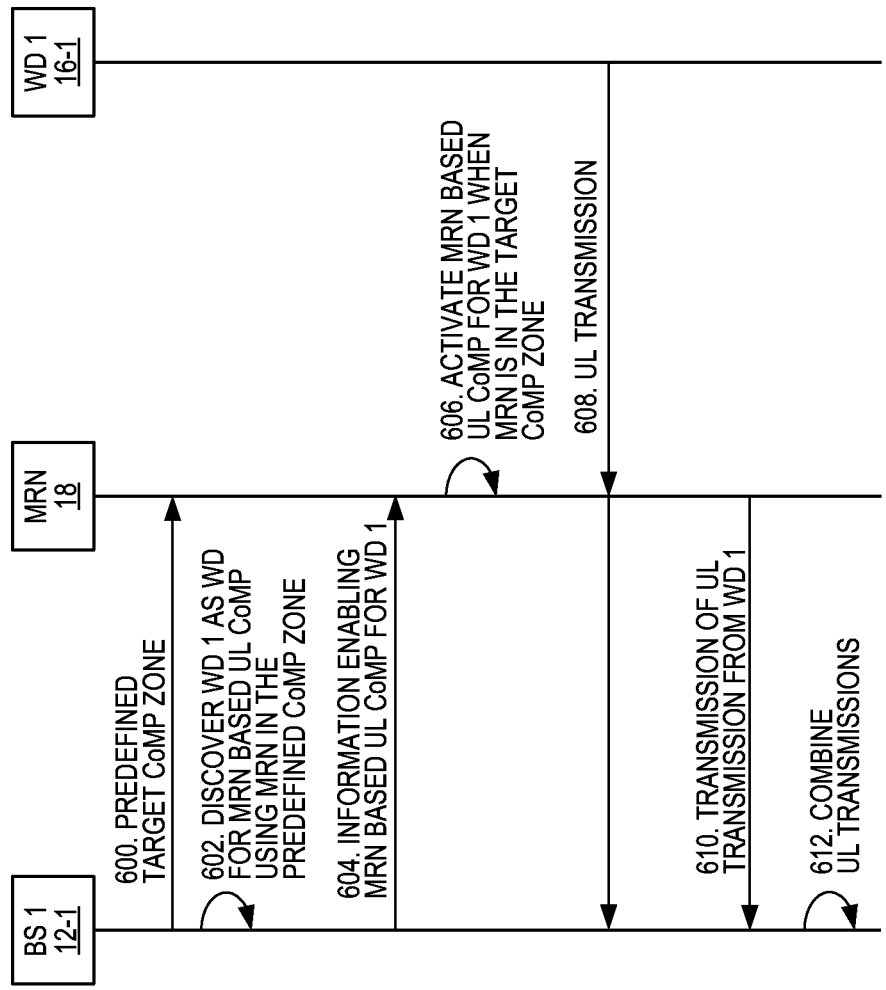
Figure 10A:
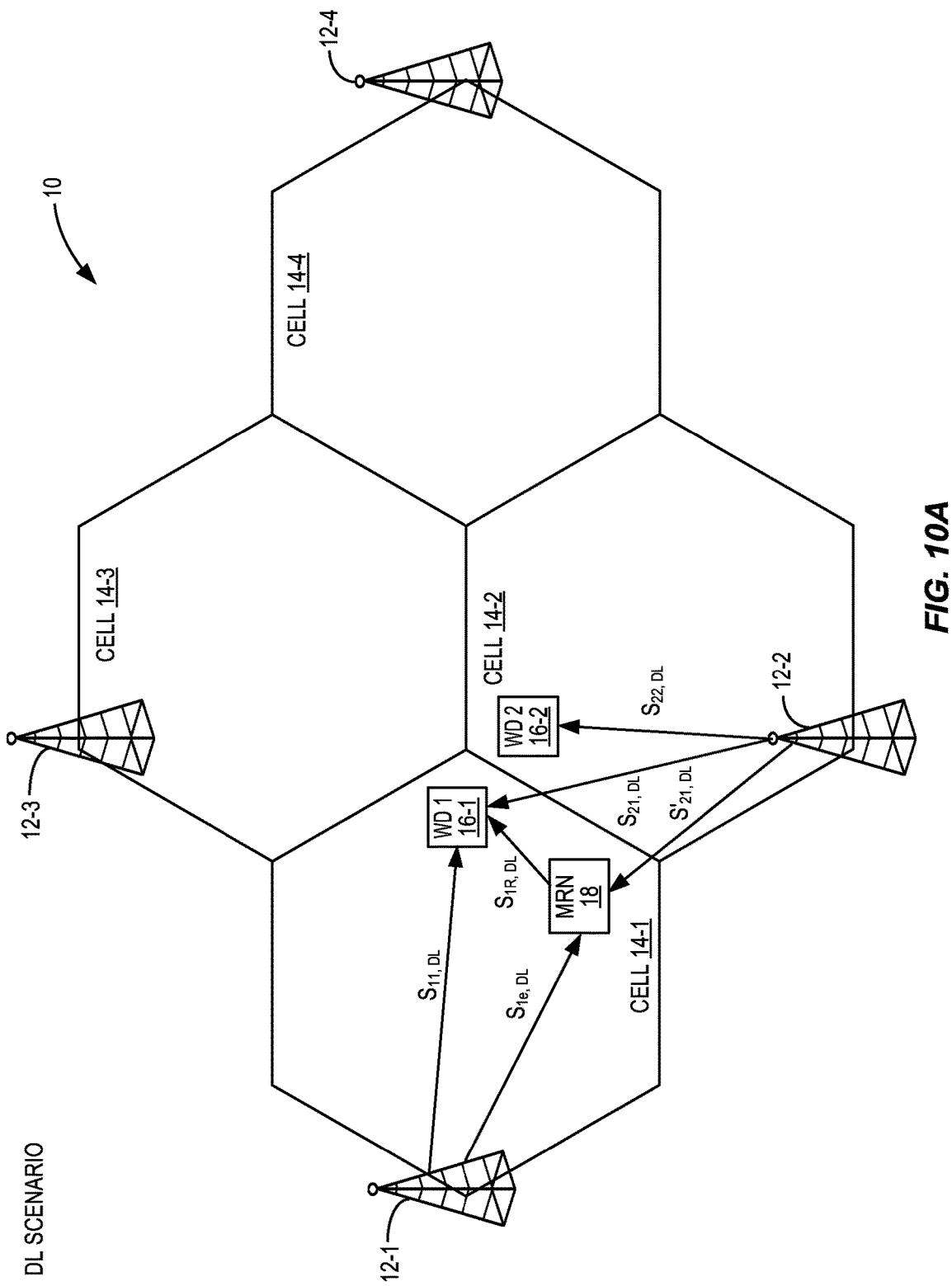
Figure 10B:
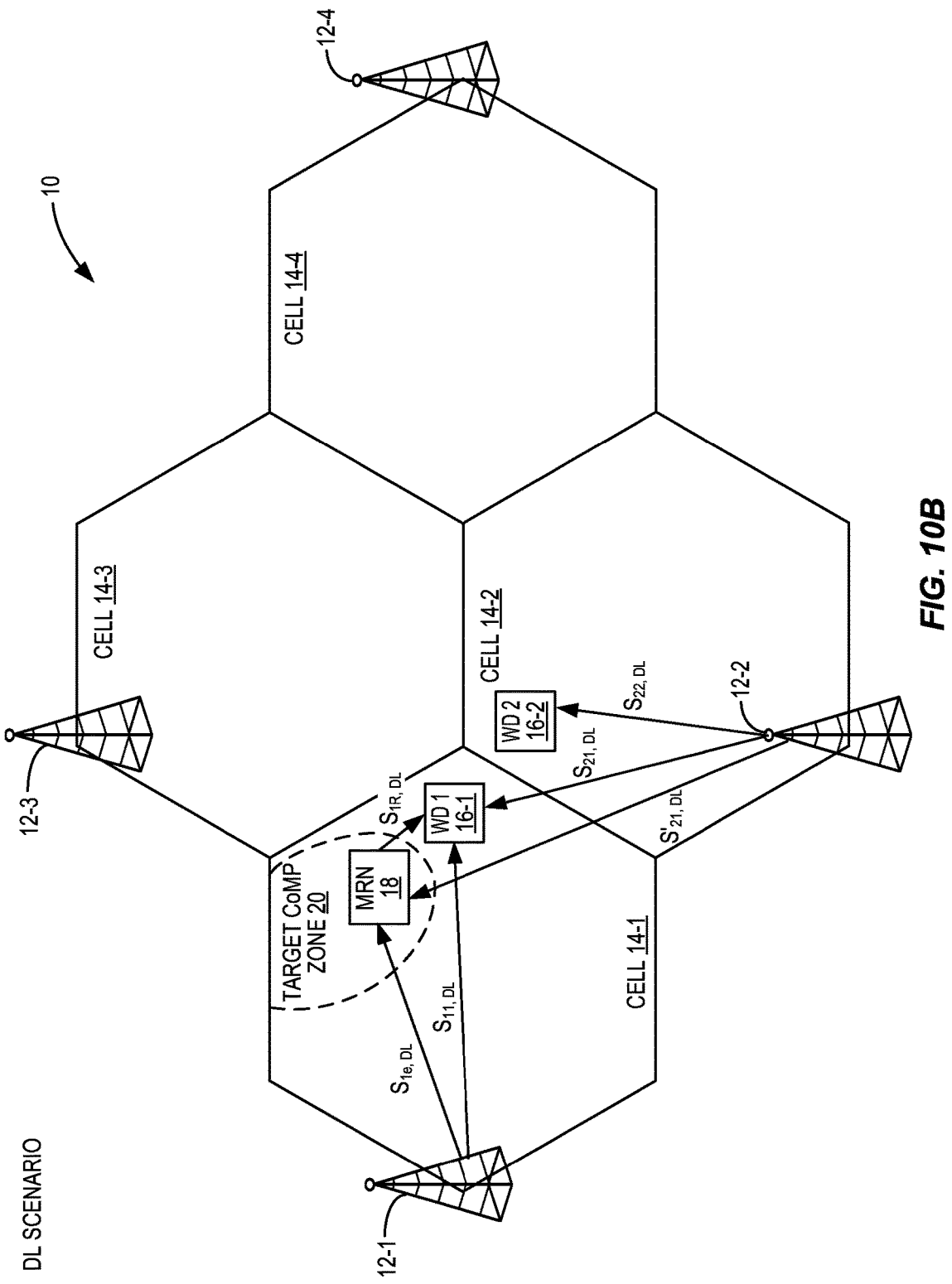
Figure 11A:
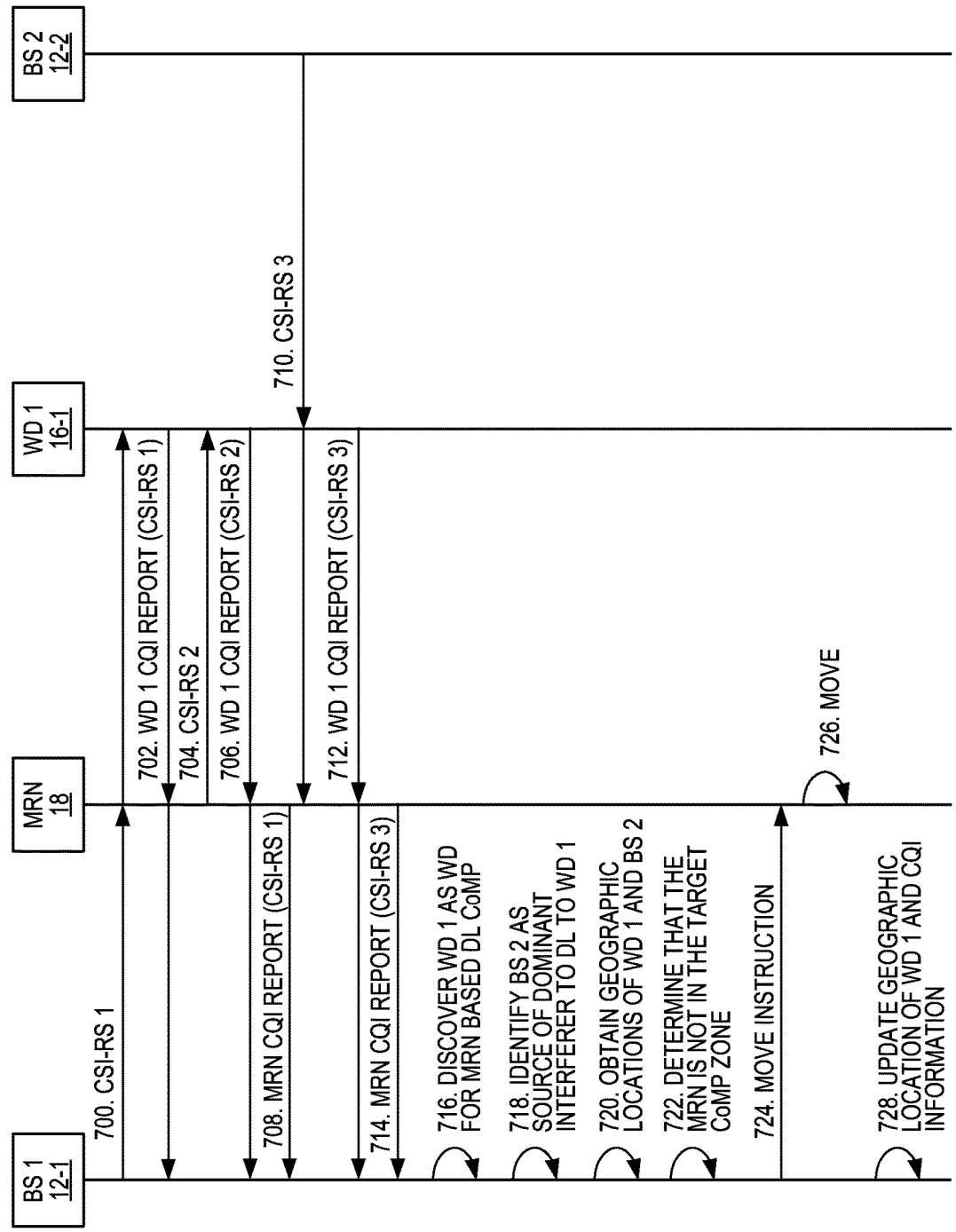
Figure 11B:
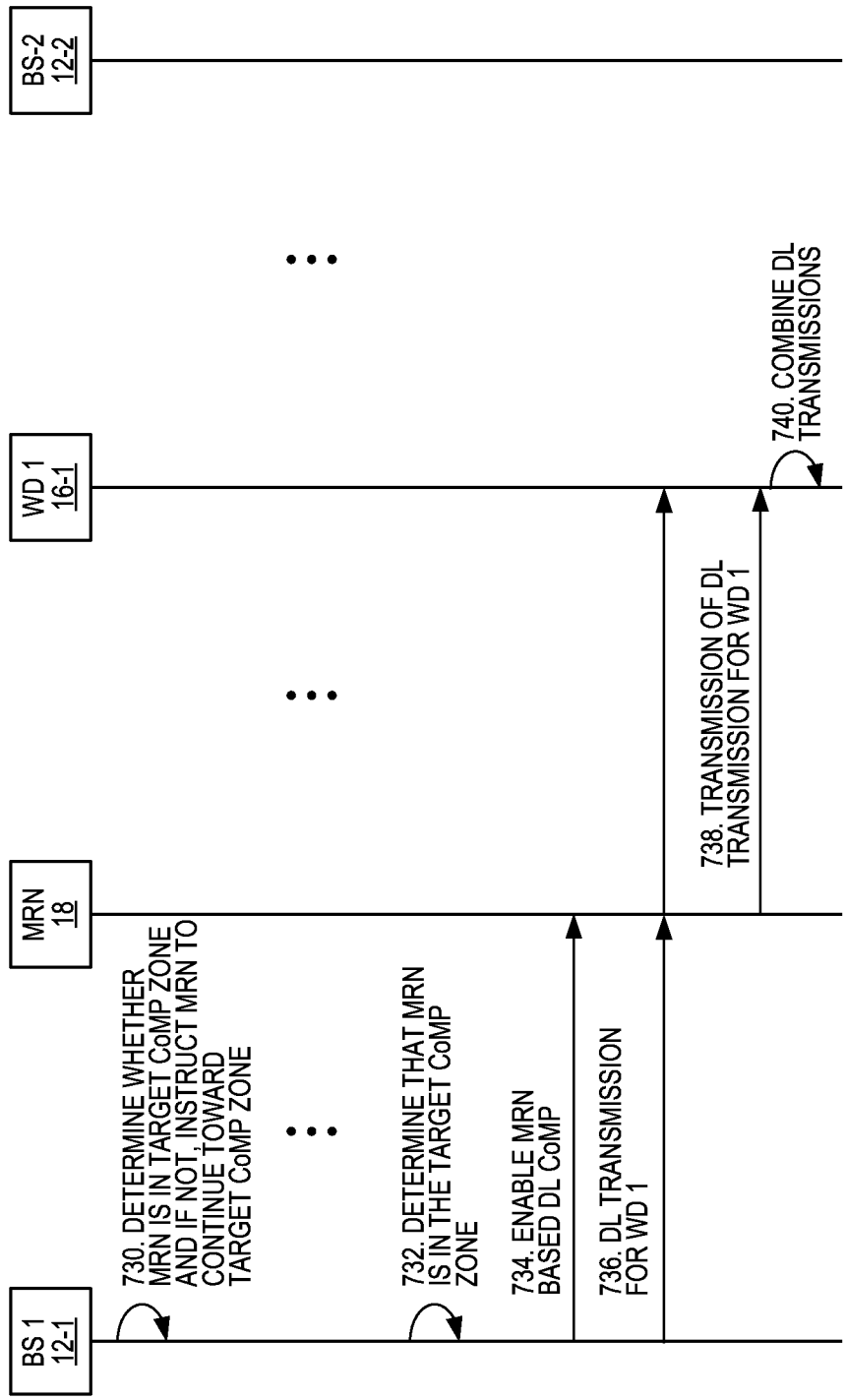
Figure 12:
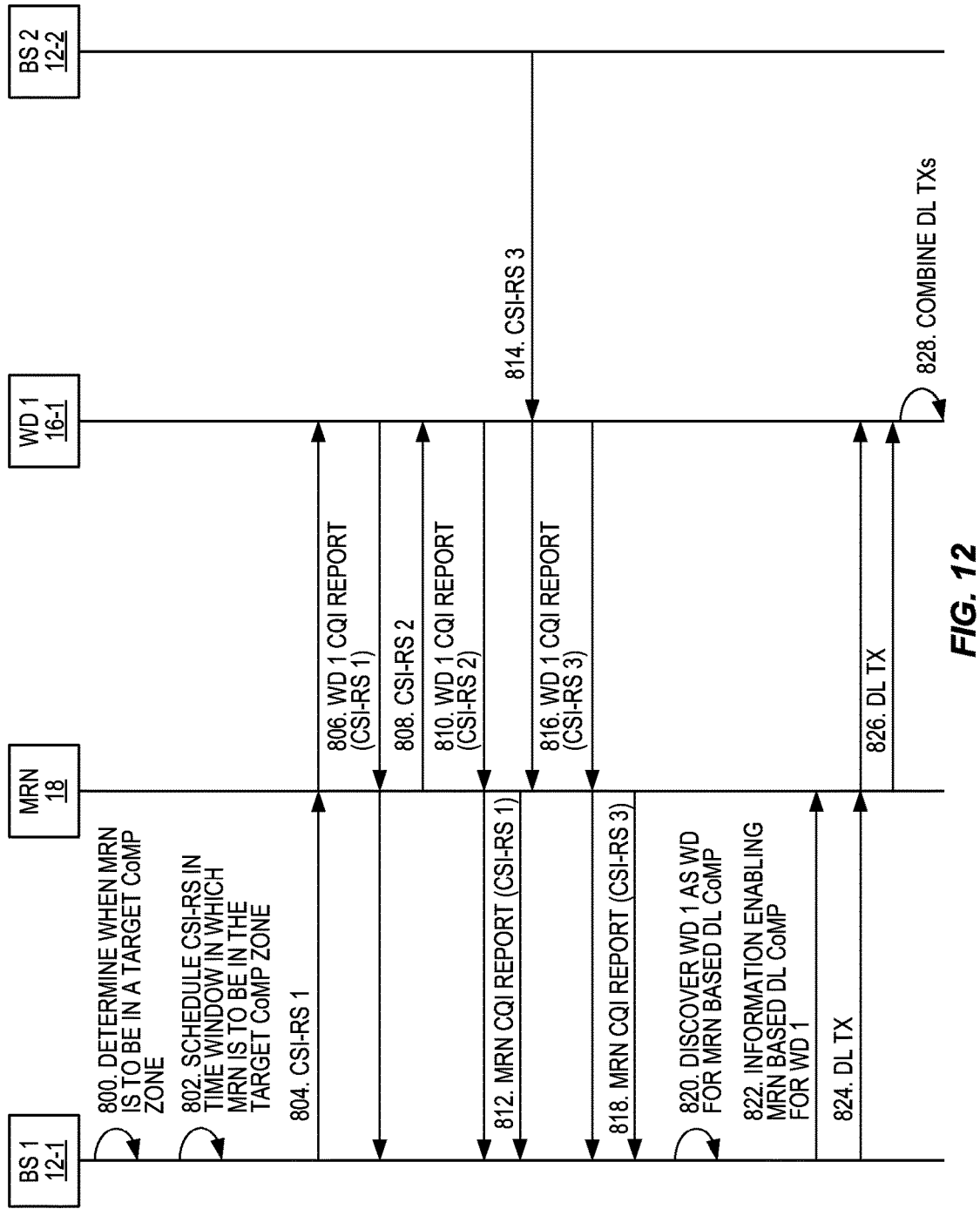
Figure 13:
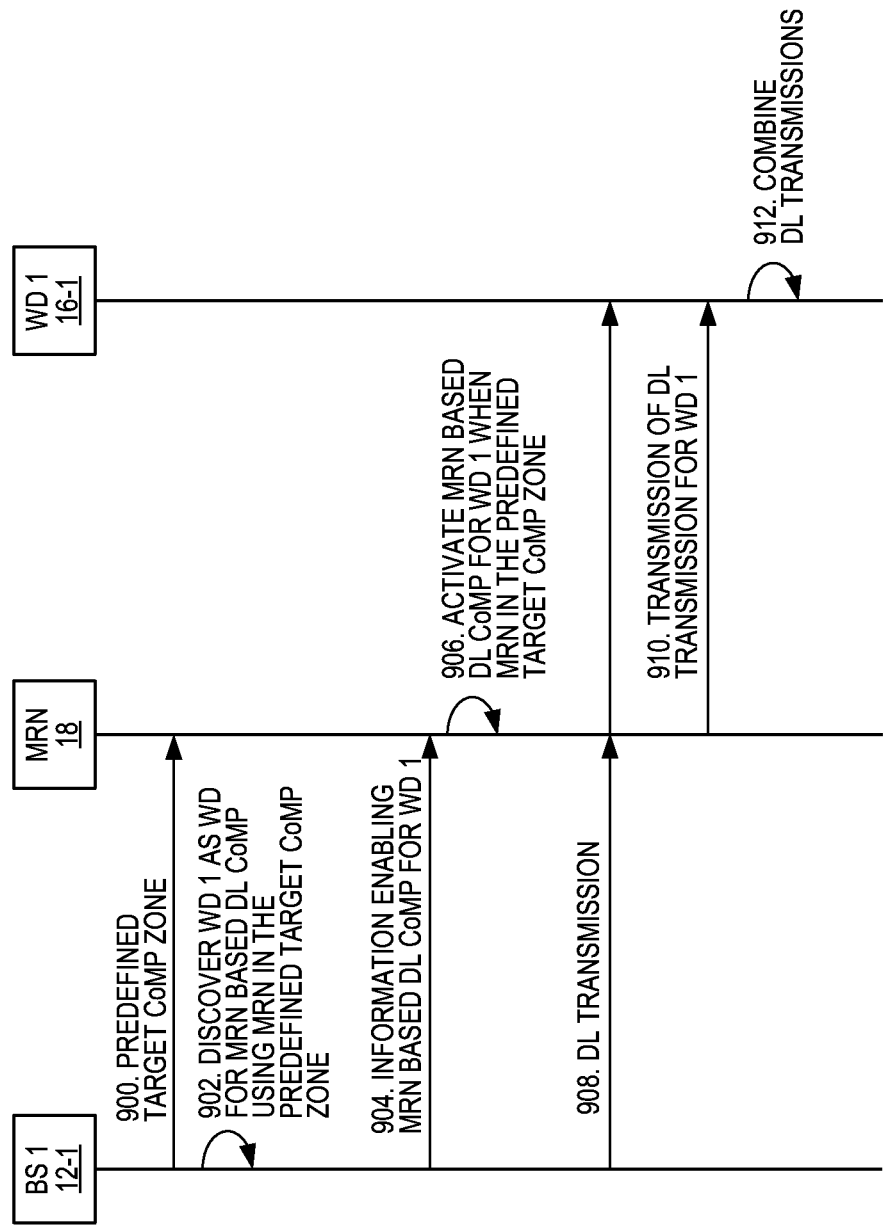
Figure 14:
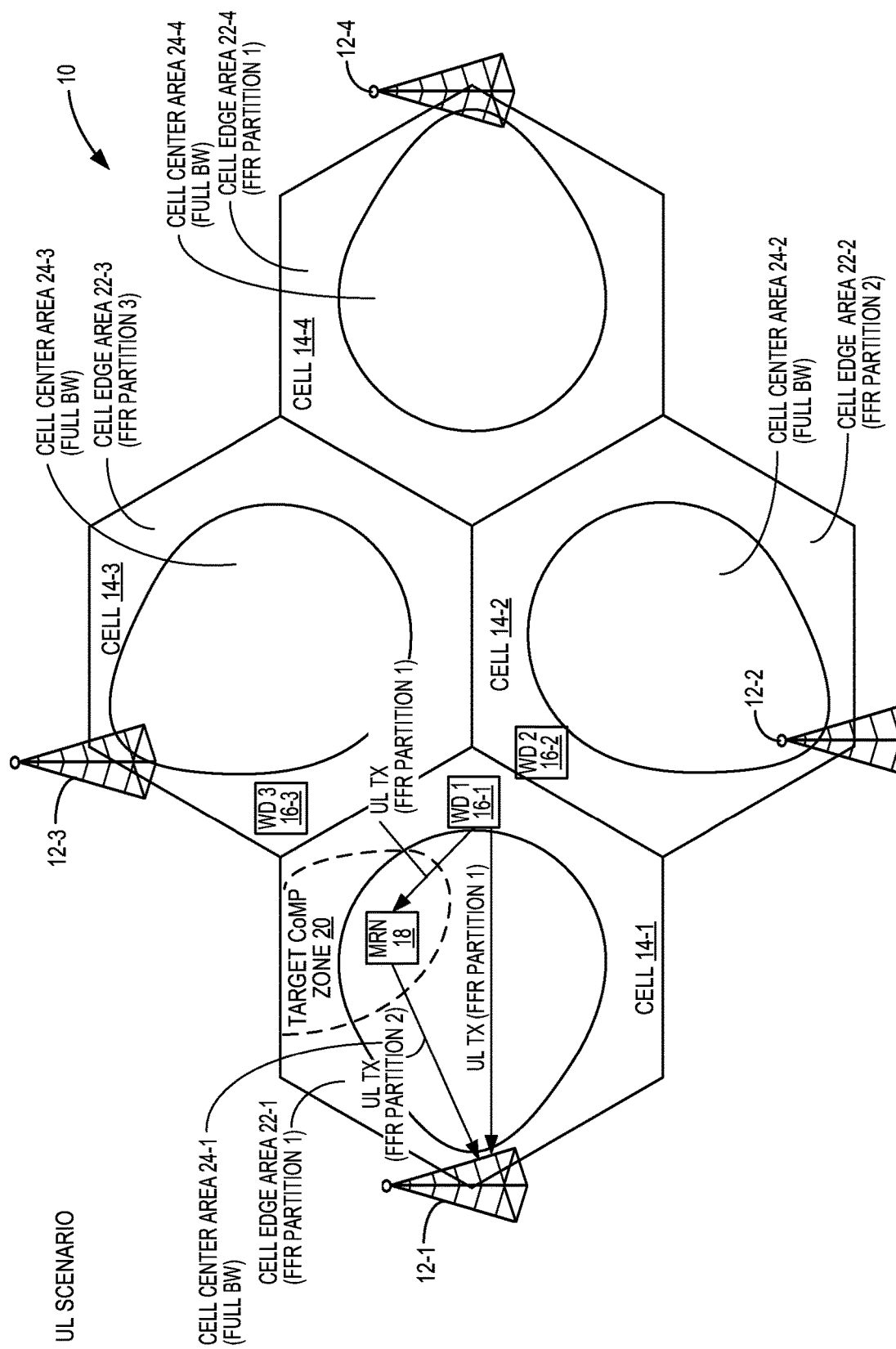
Figure 15:
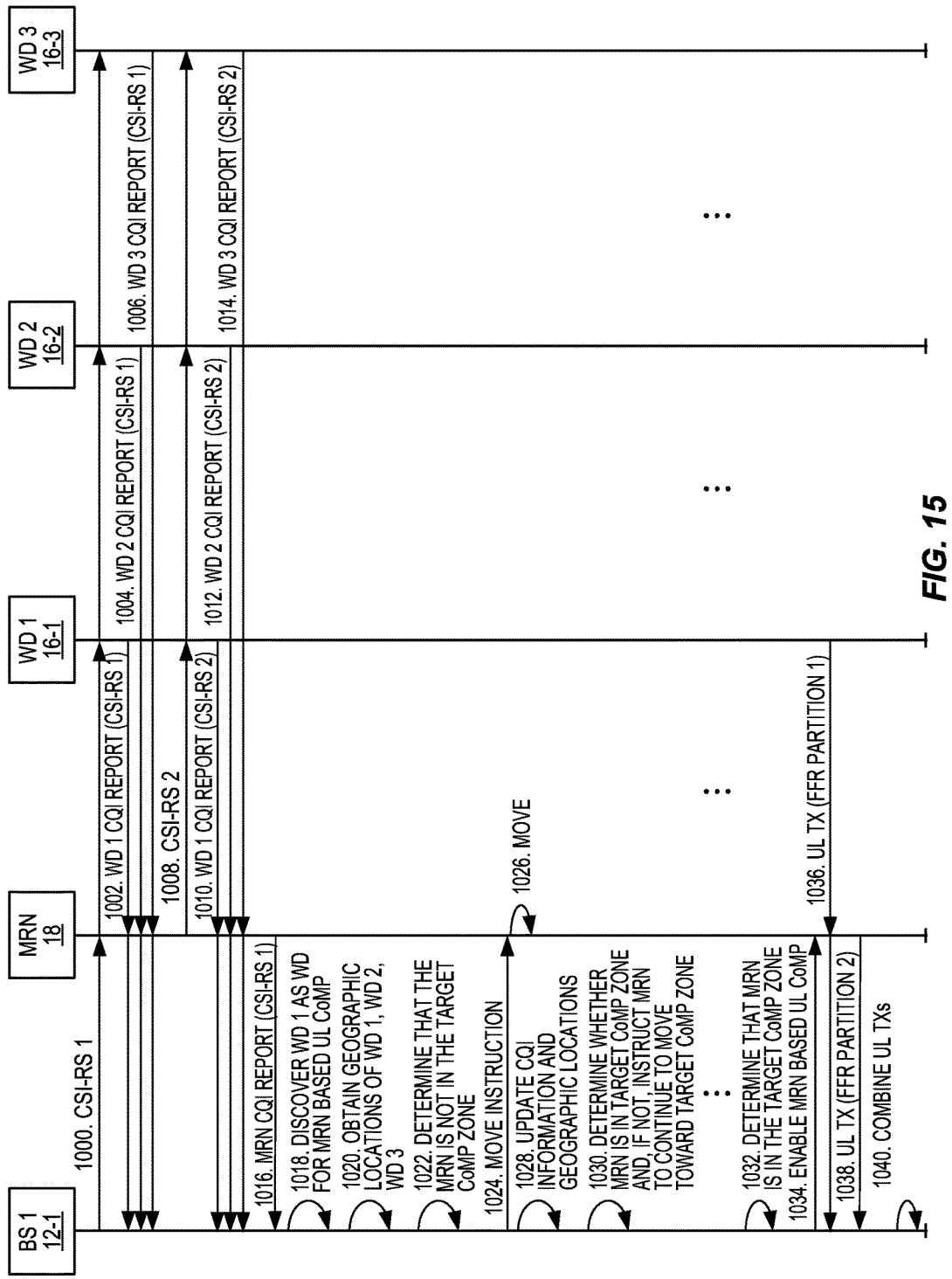
Figure 16:
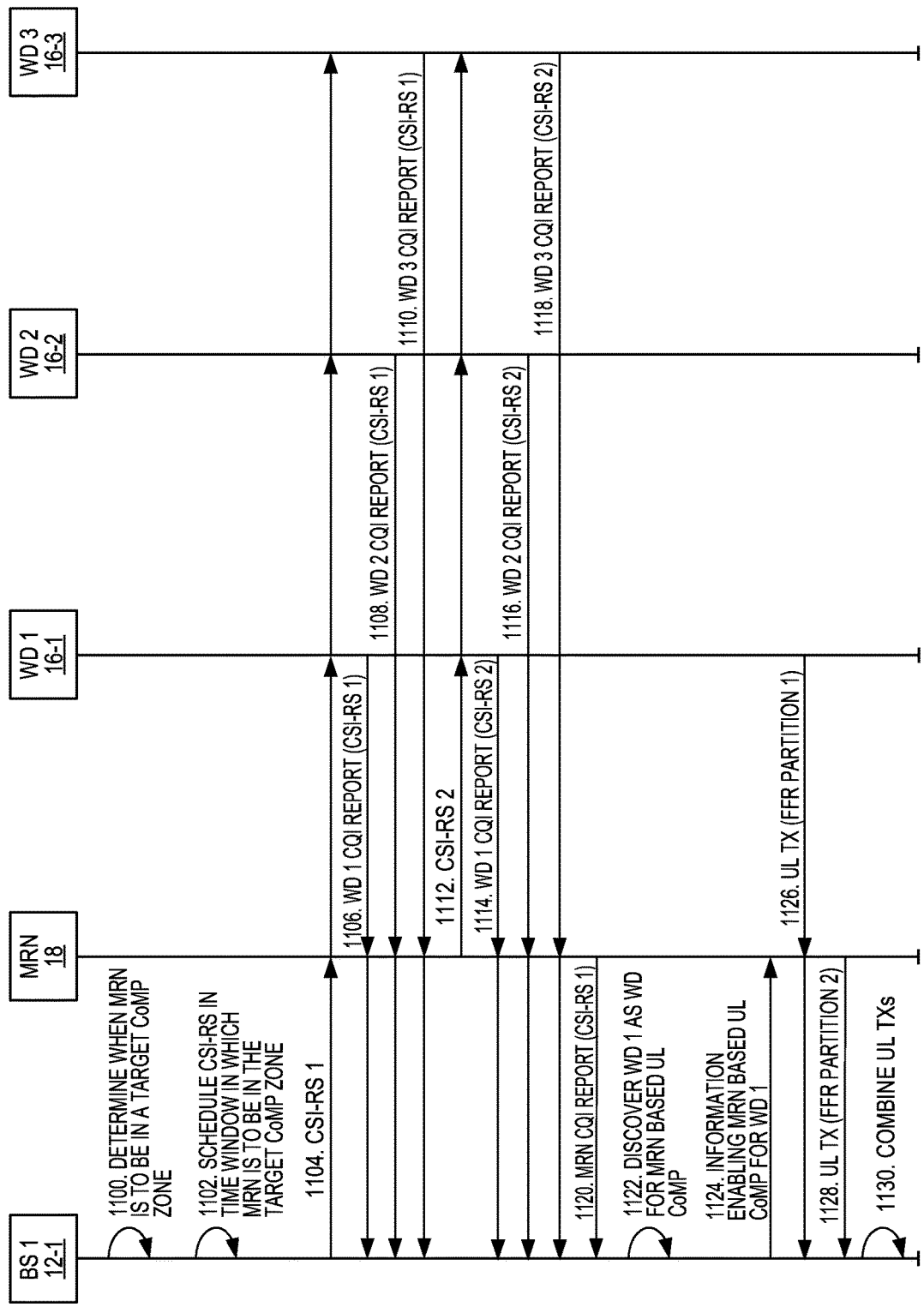
Figure 17:
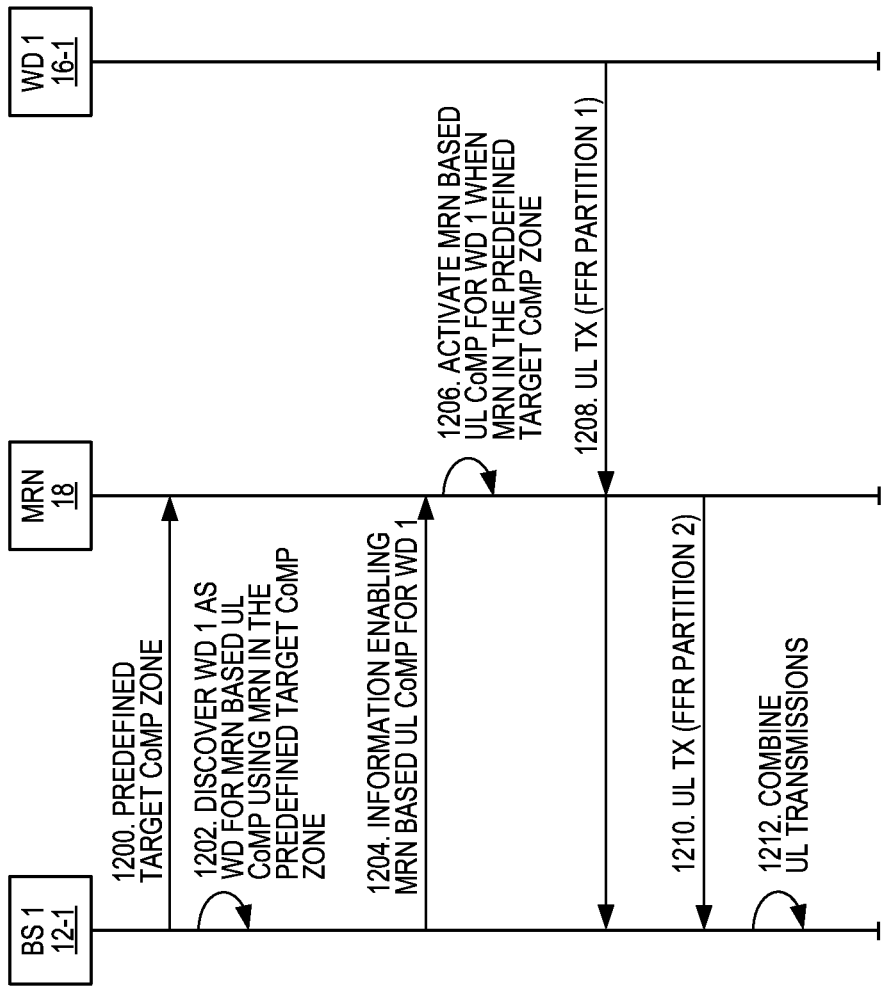
Figure 18:
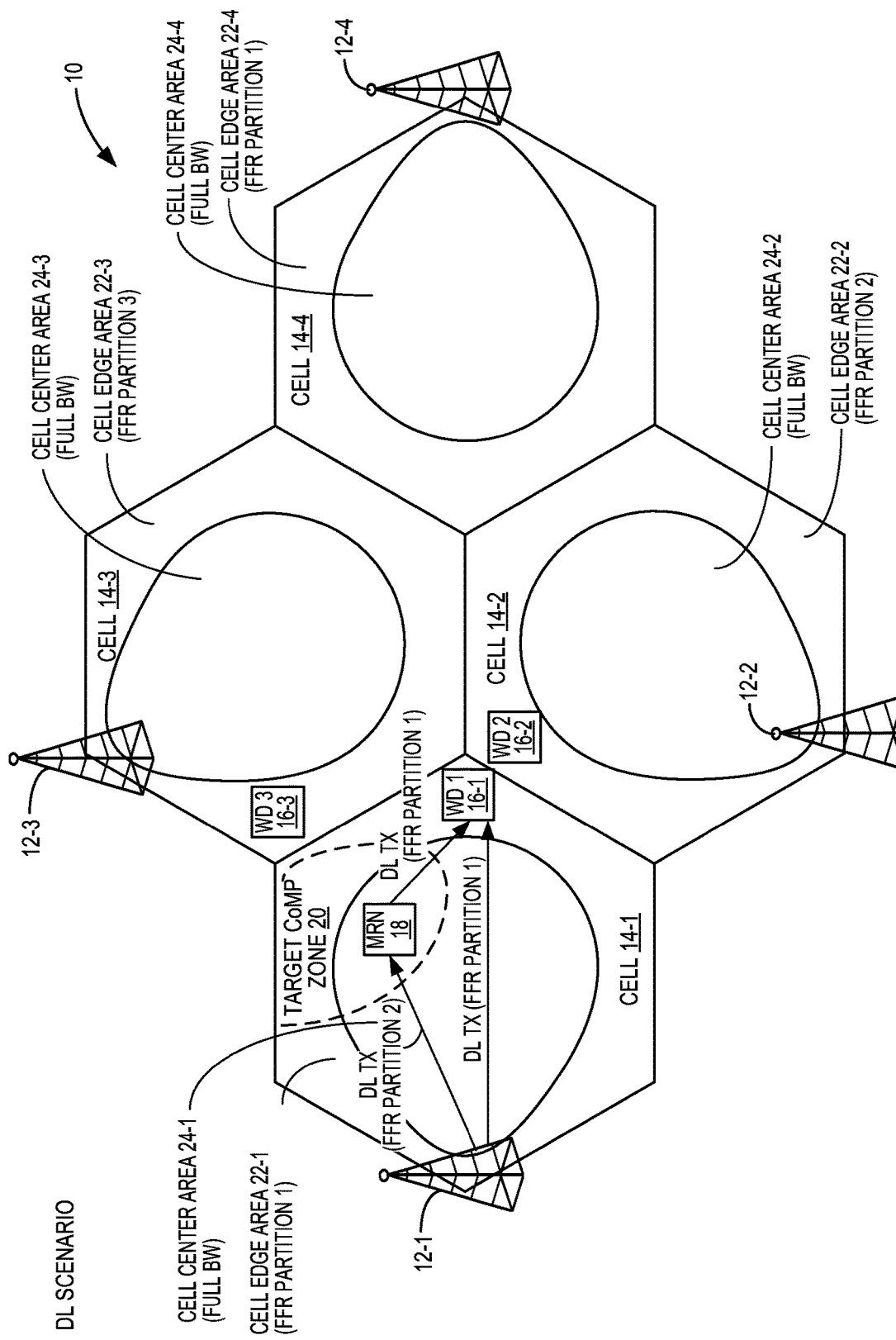
Figure 19A:
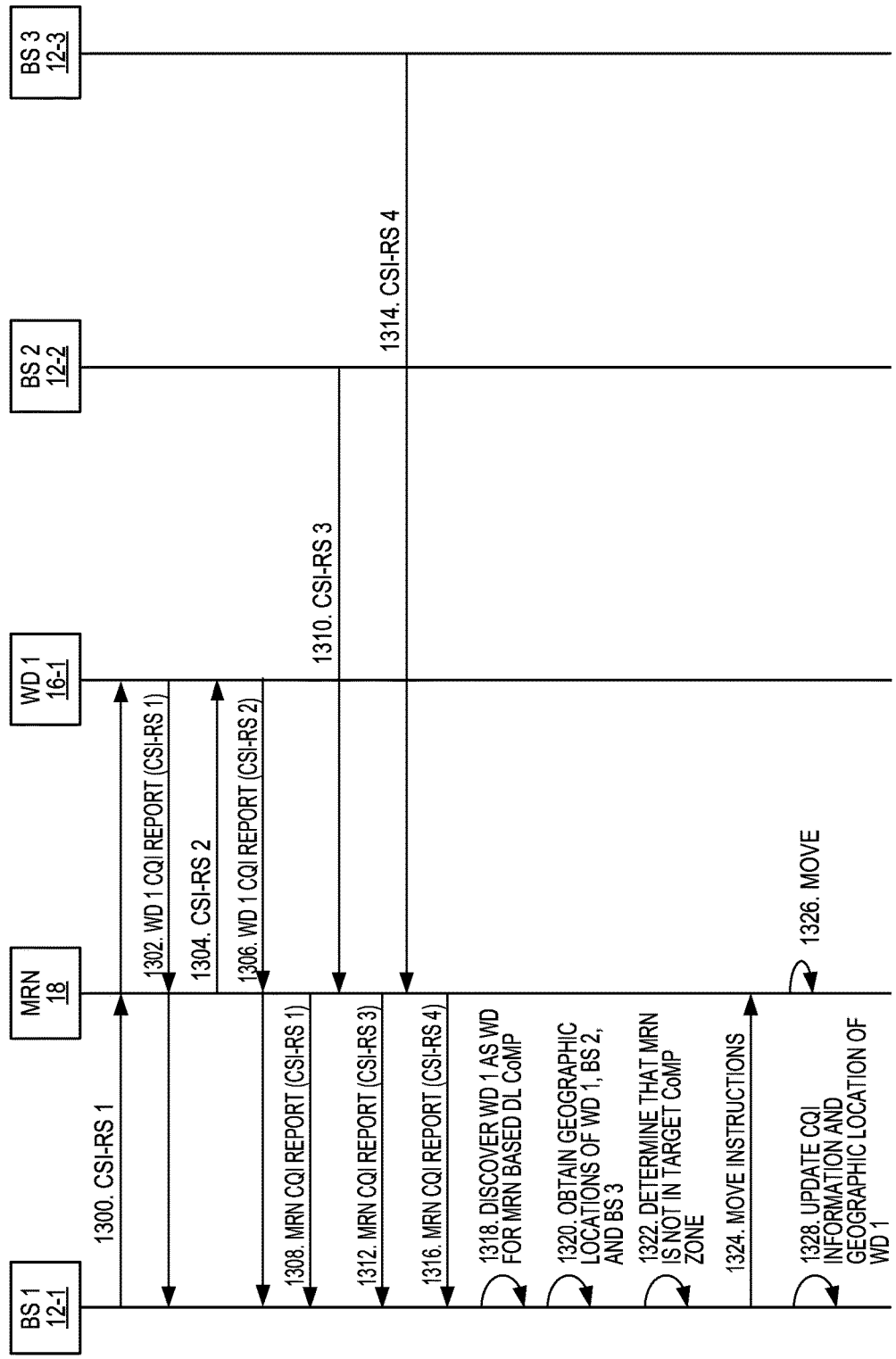
Figure 19B:
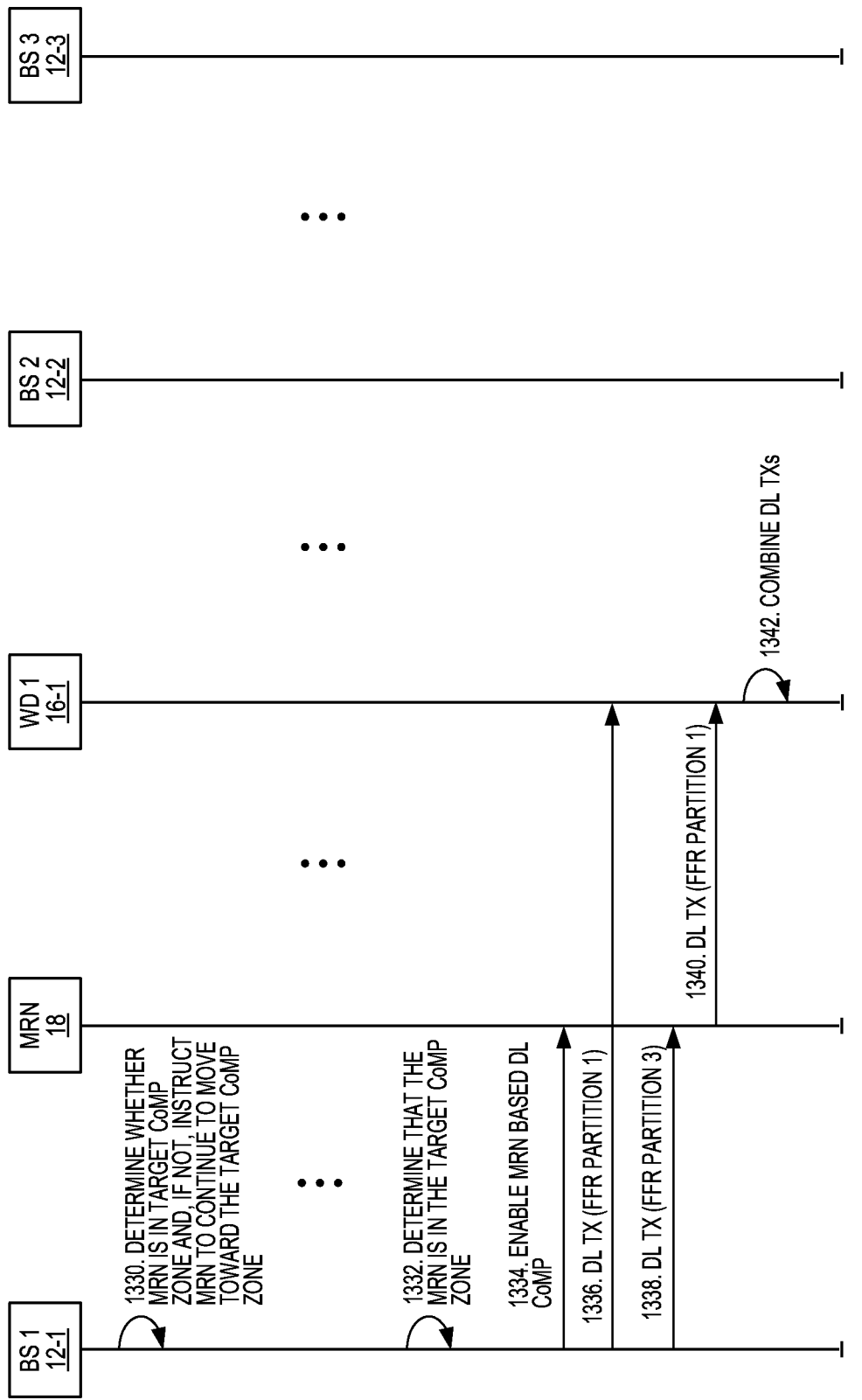
Figure 20:
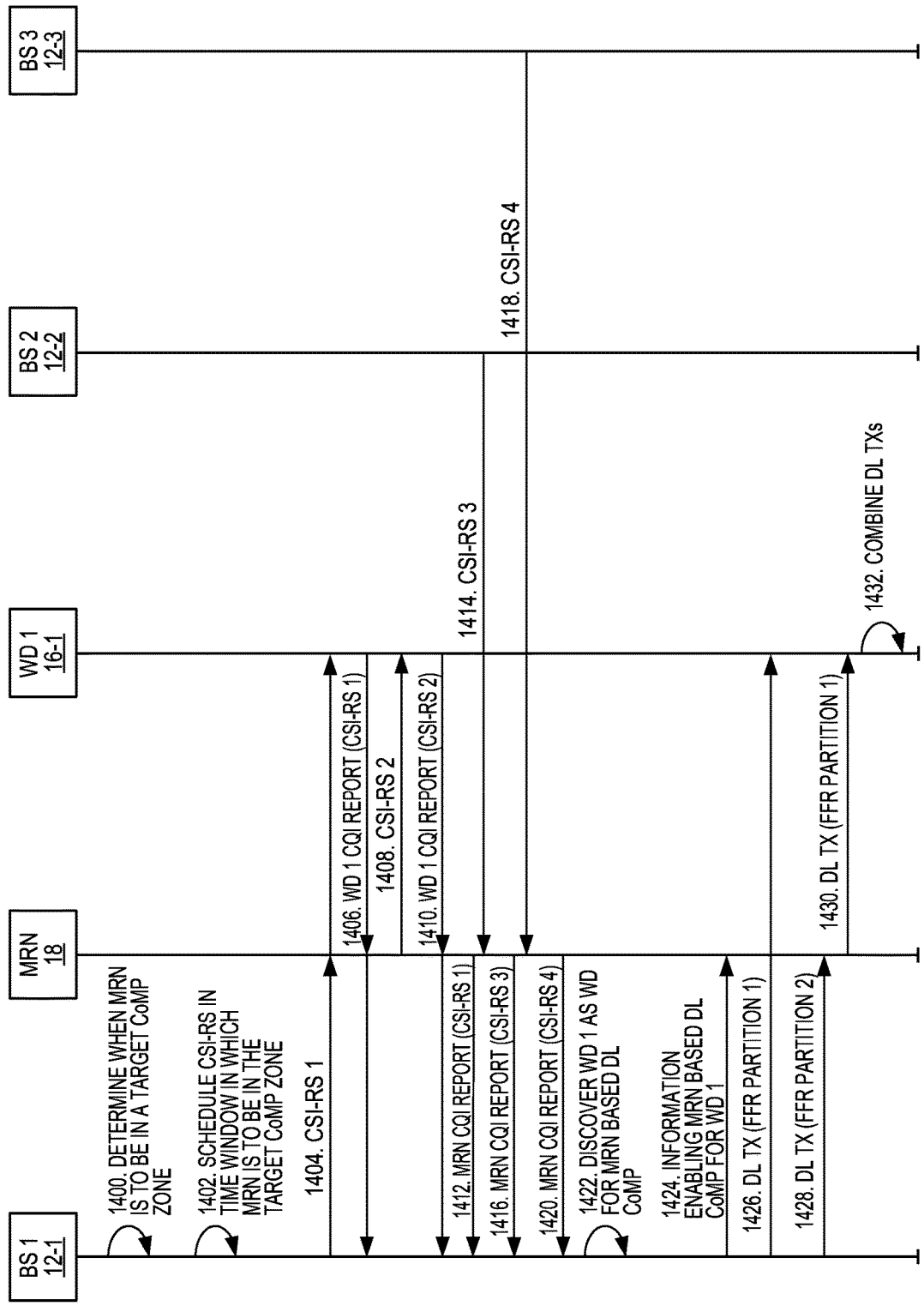
Figure 21:
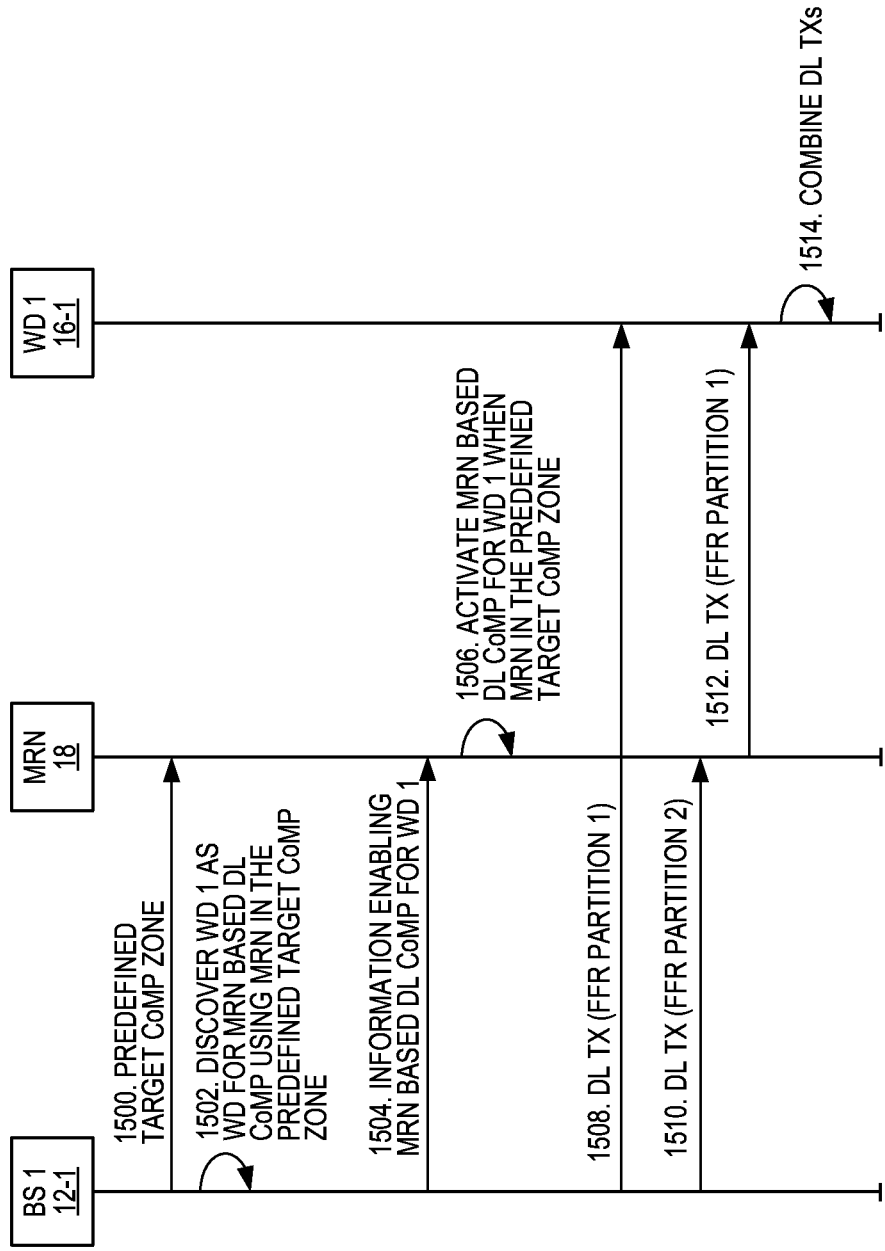
Figure 22:
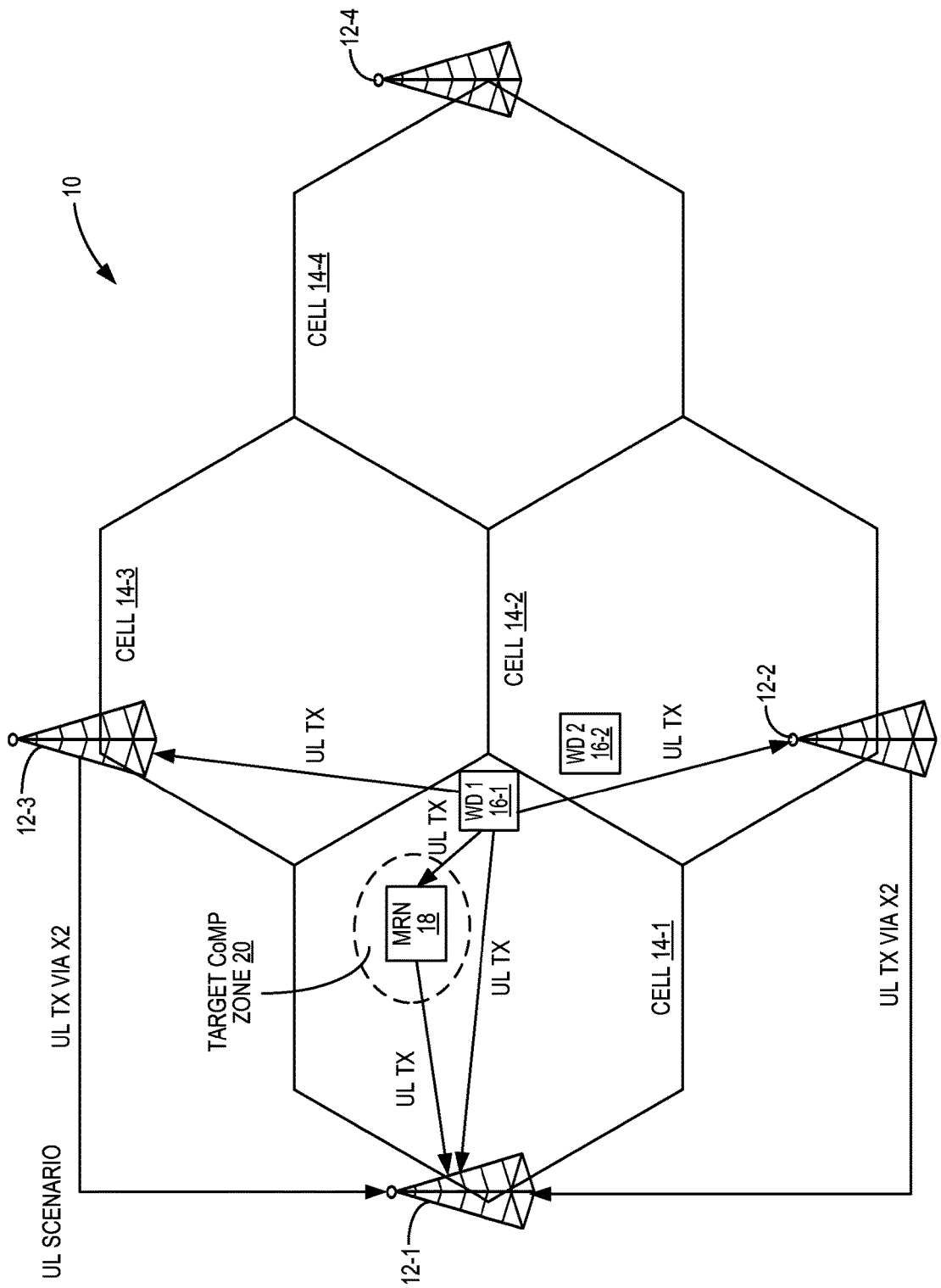
Figure 23A:
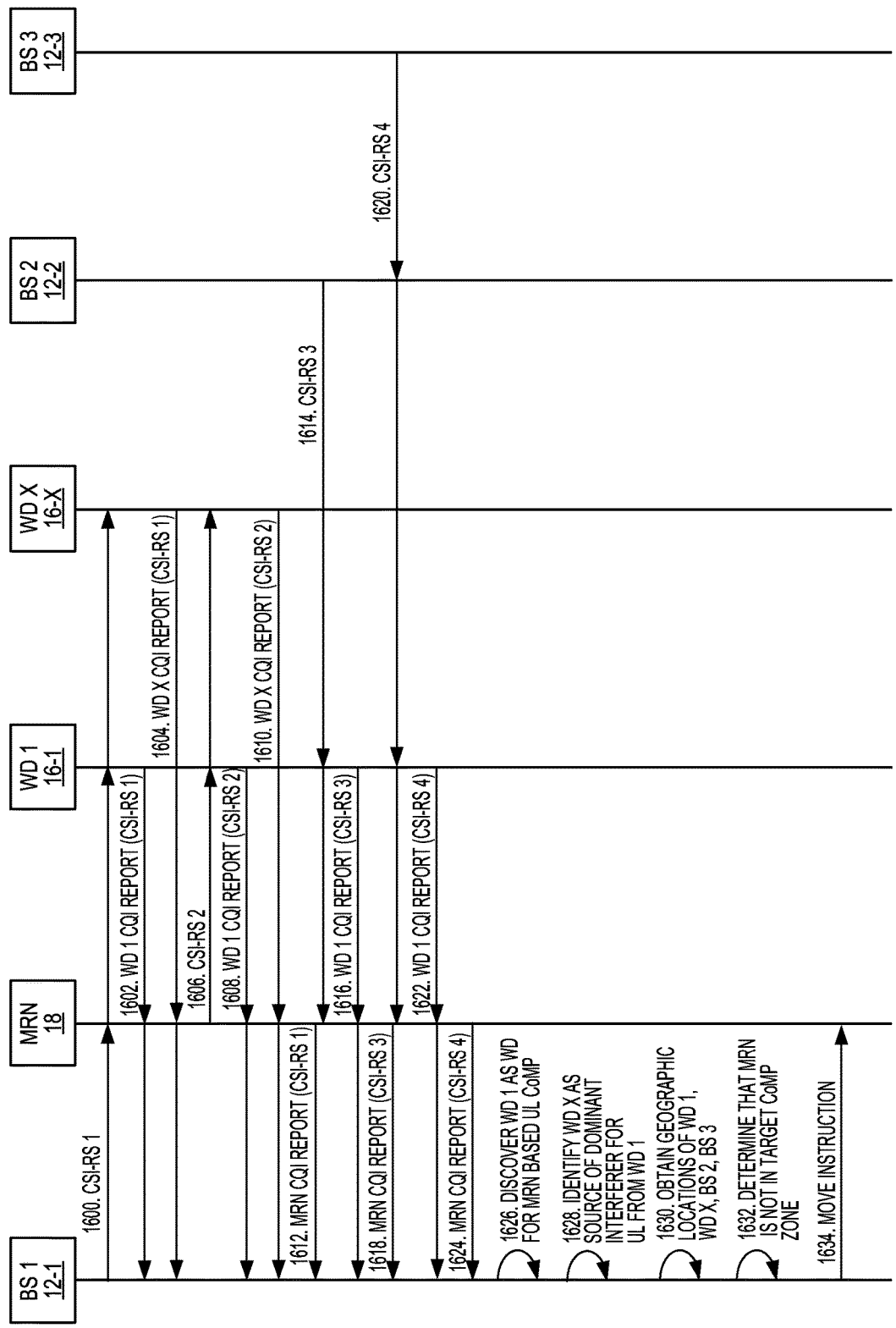
Figure 23B:
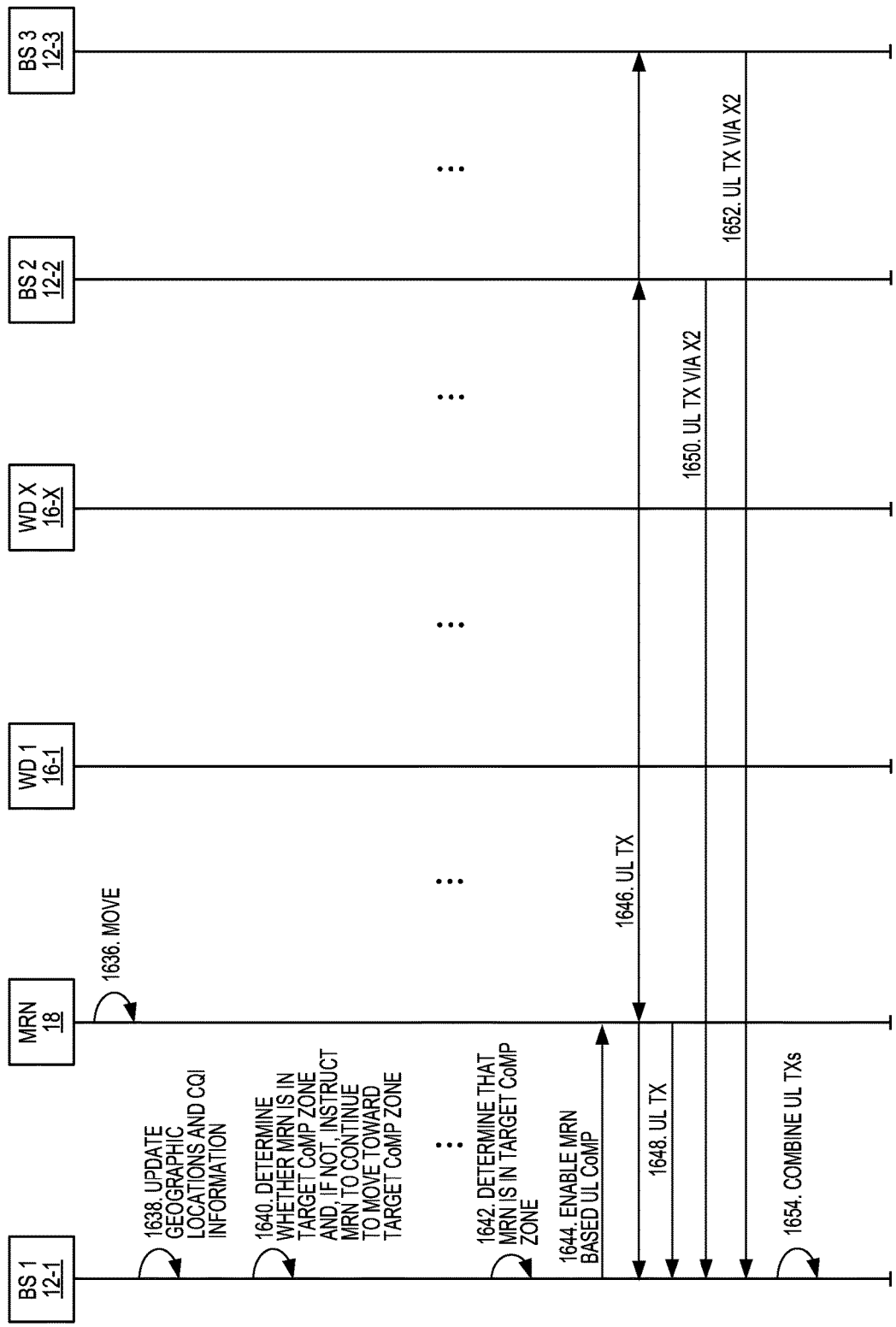
Figure 24:
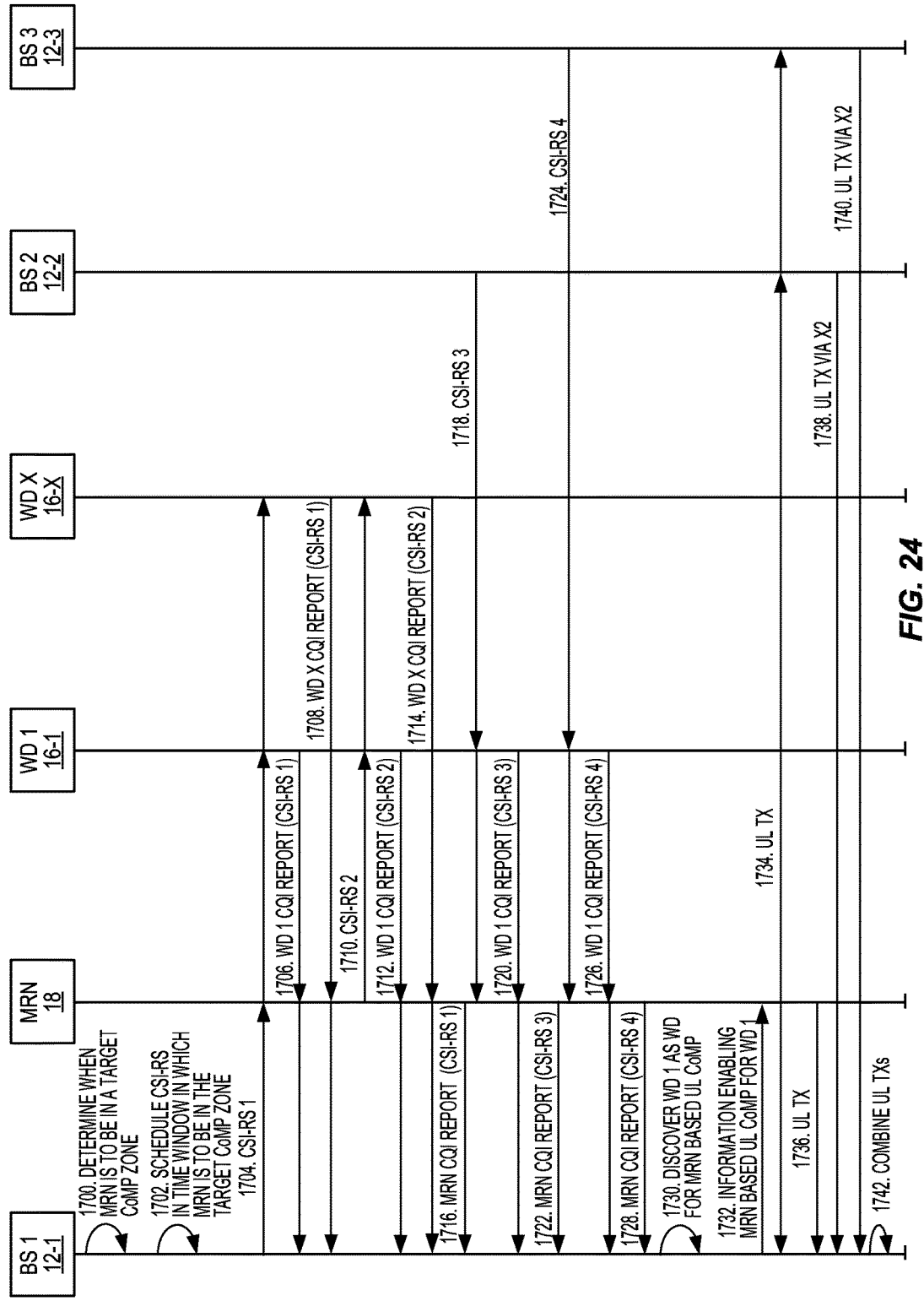
Figure 25:
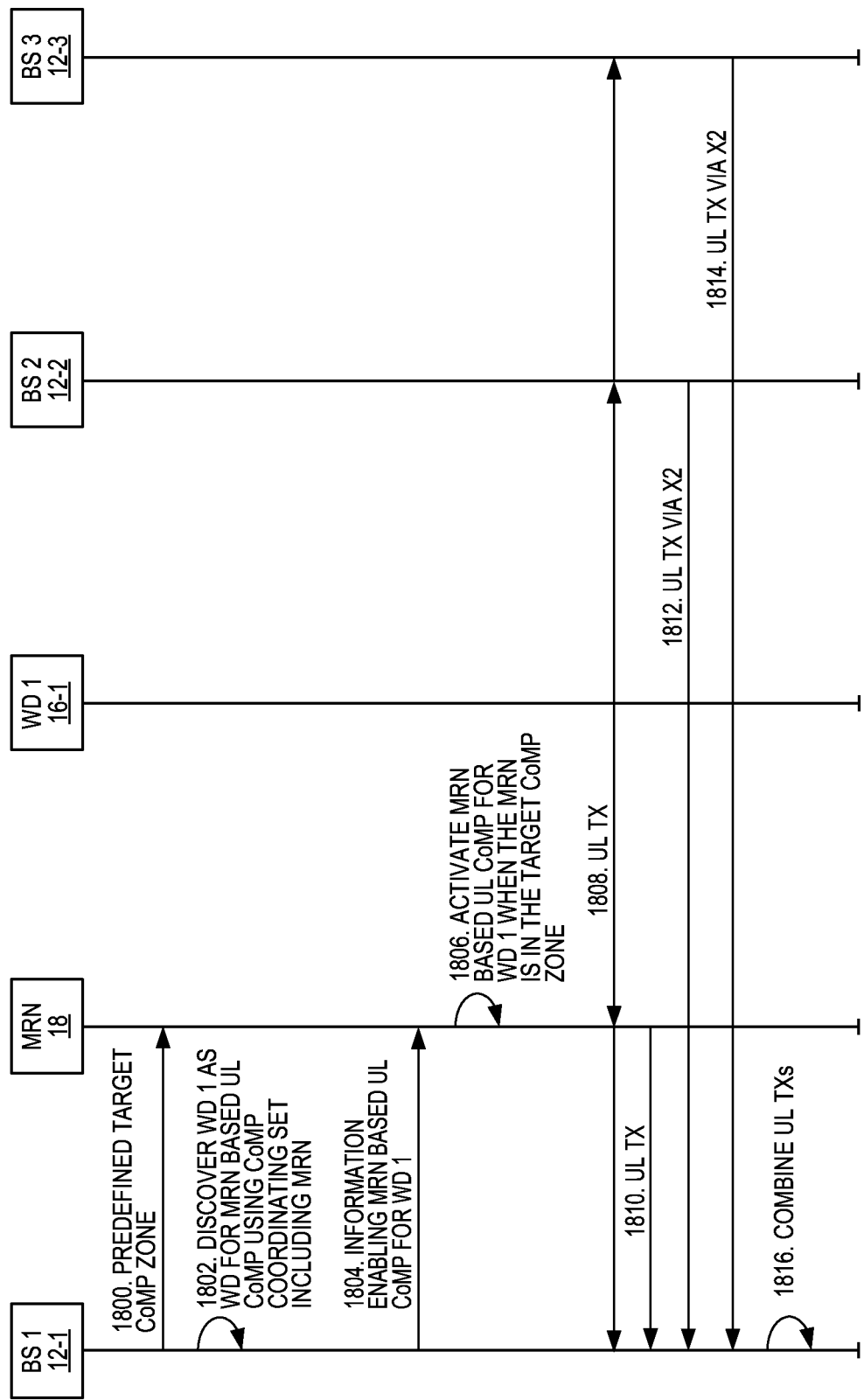
Figure 26:
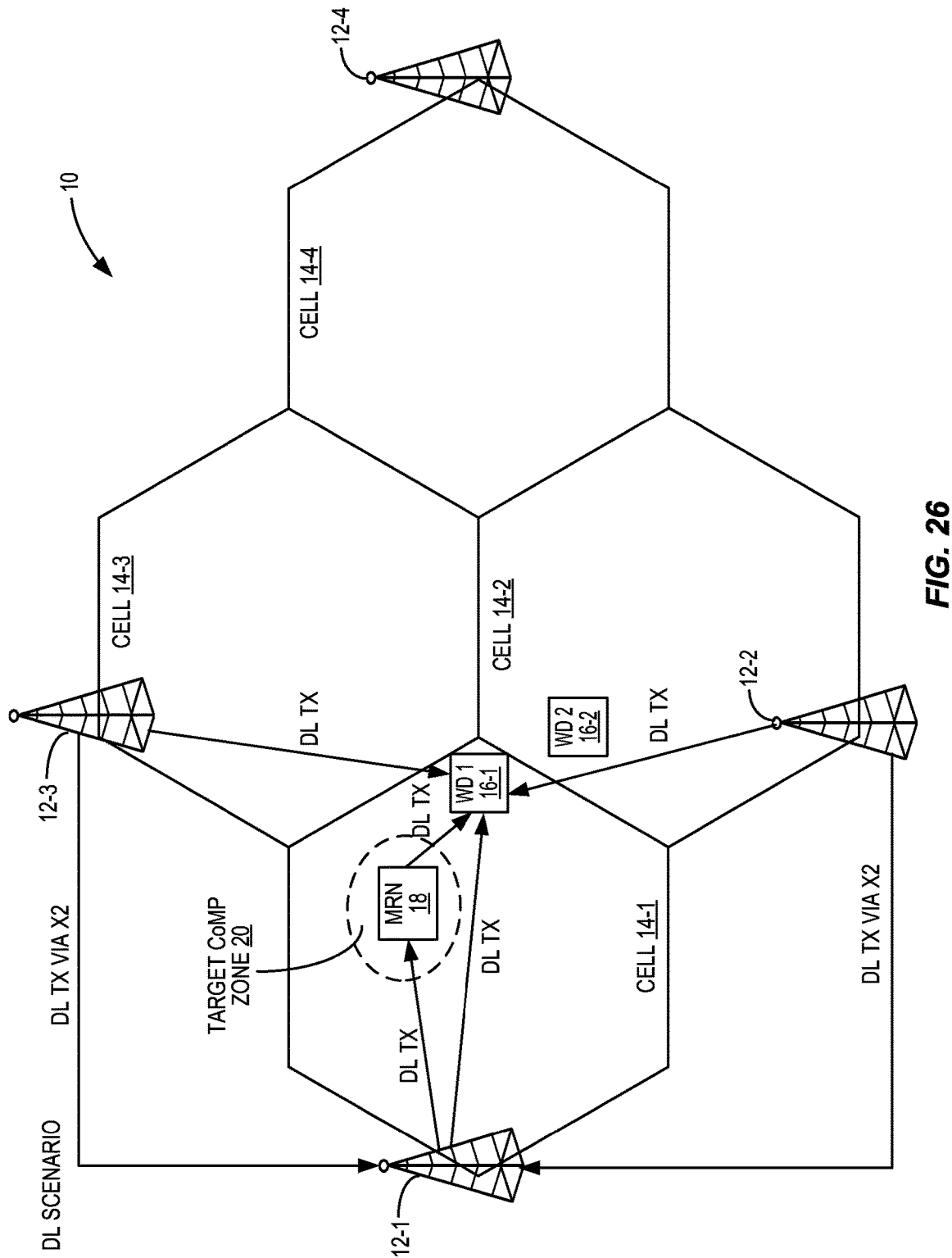
Figure 27A:
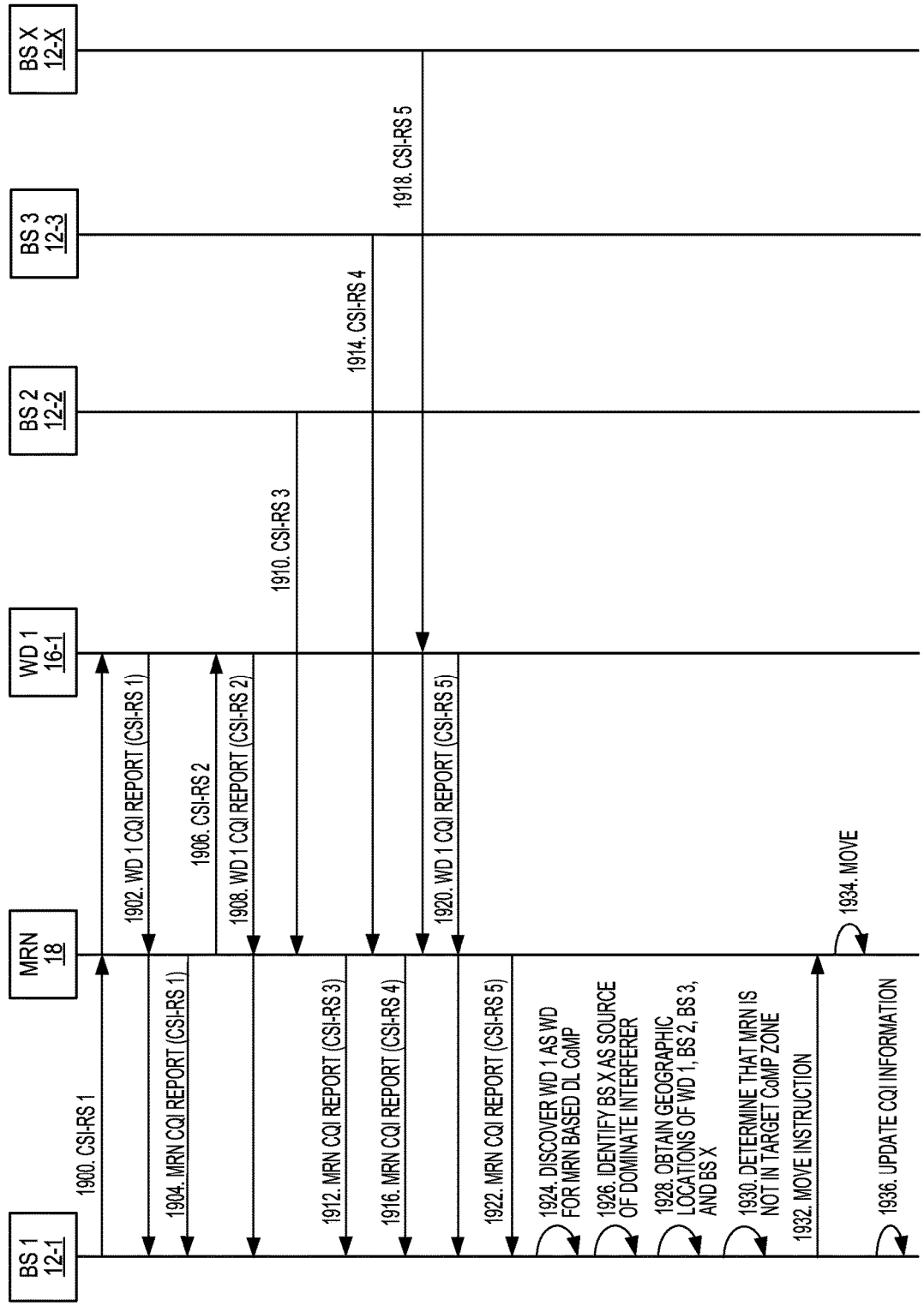
Figure 27B:
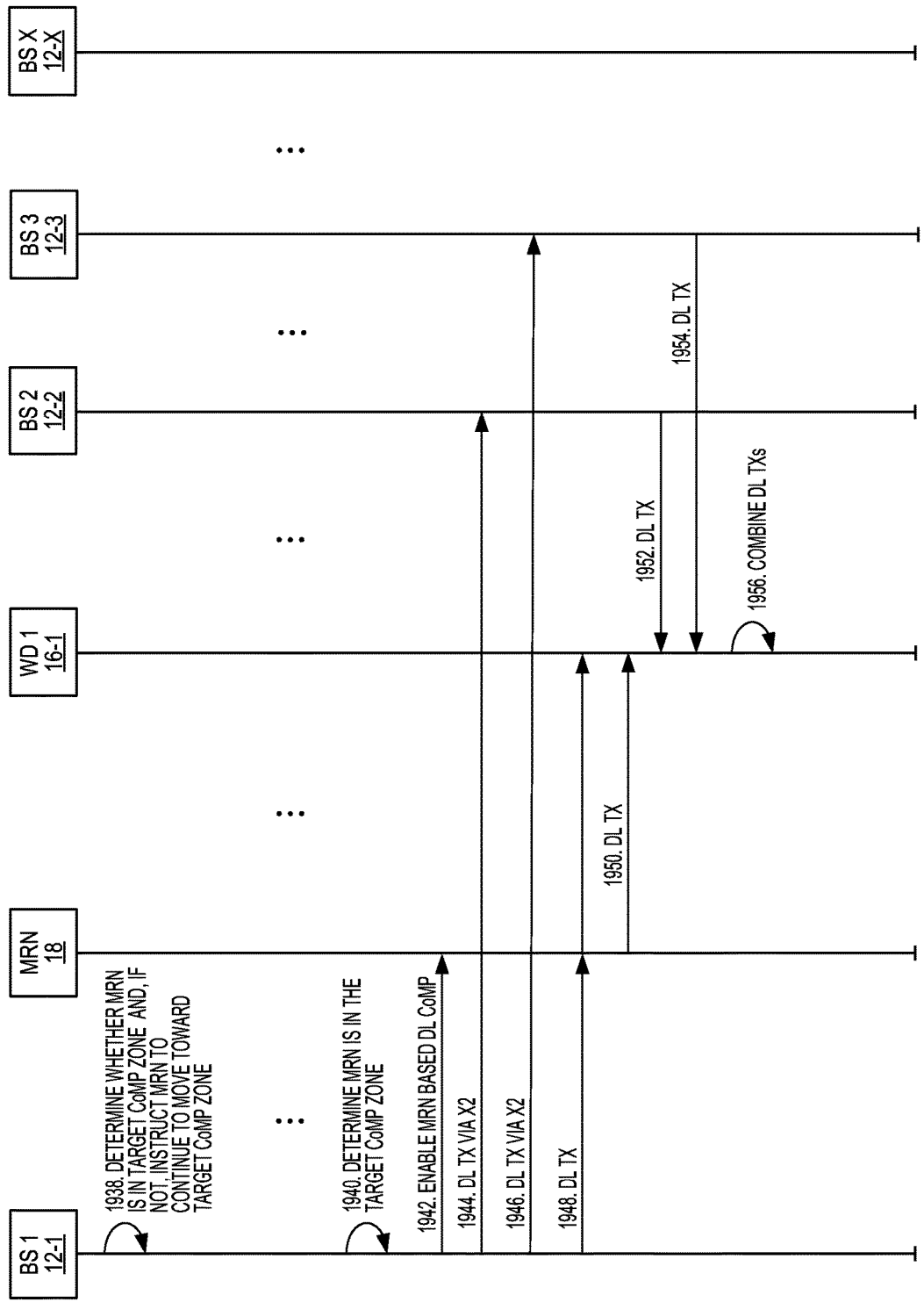
Figure 28:
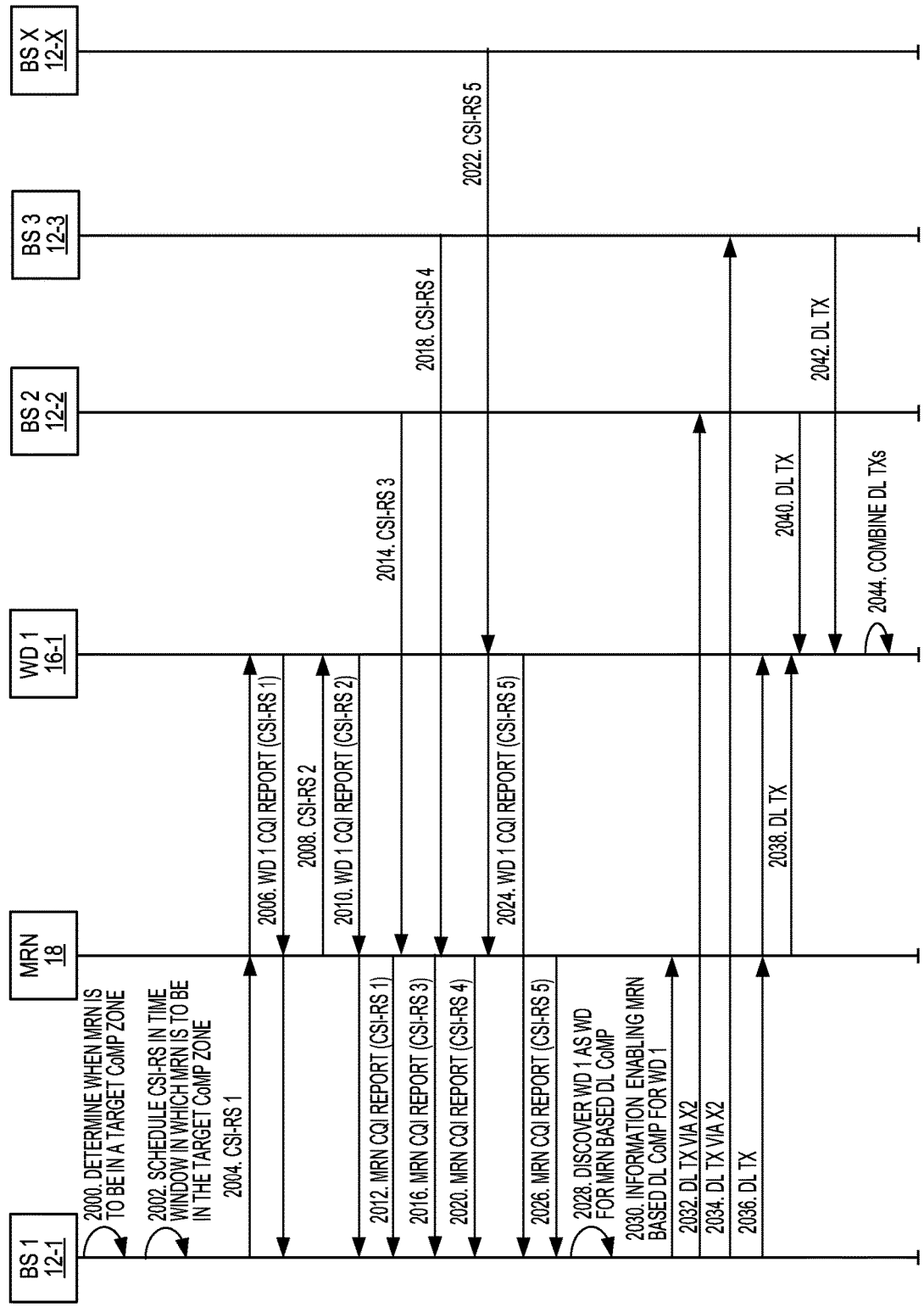
Figure 29:
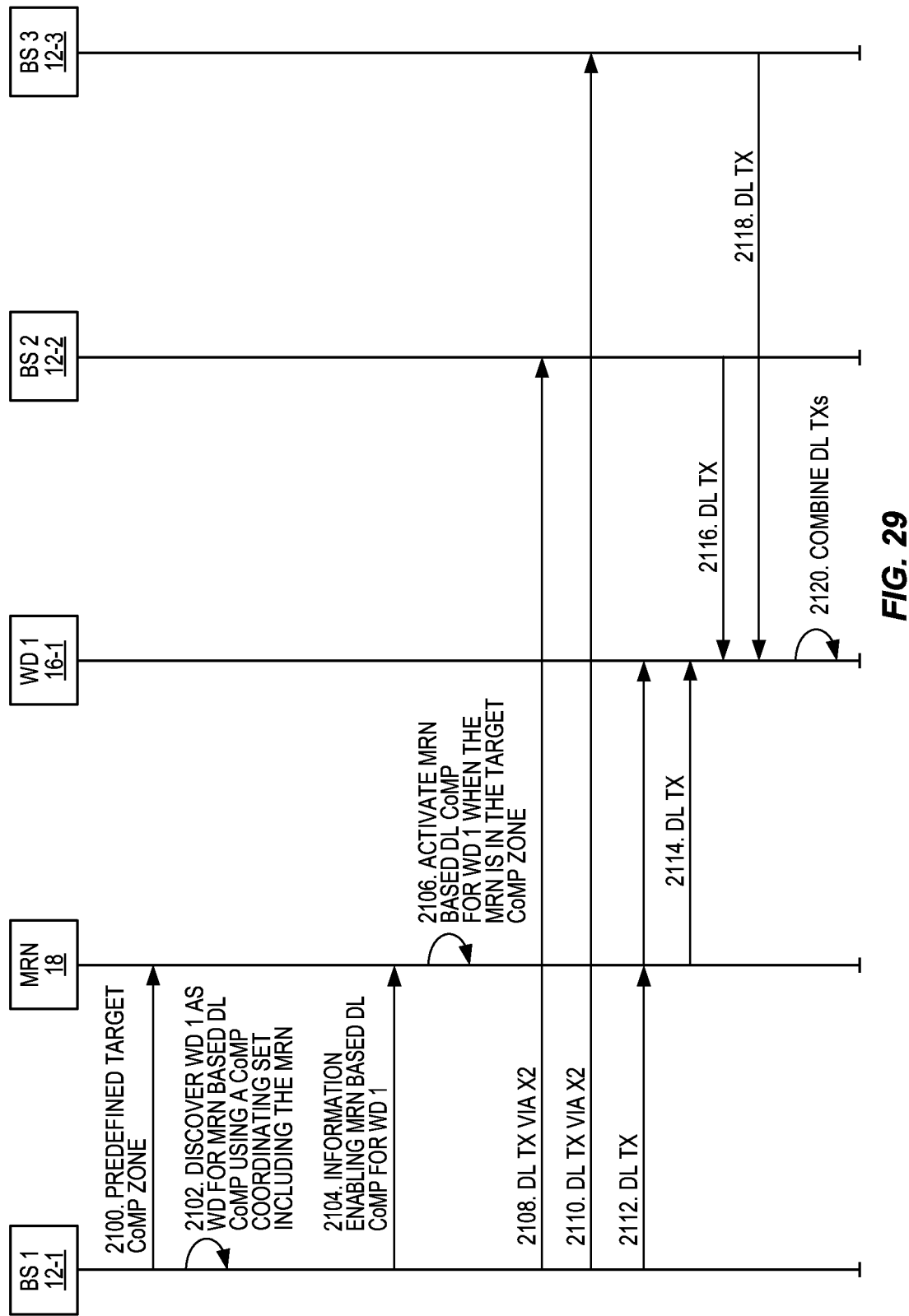
Figure 30:
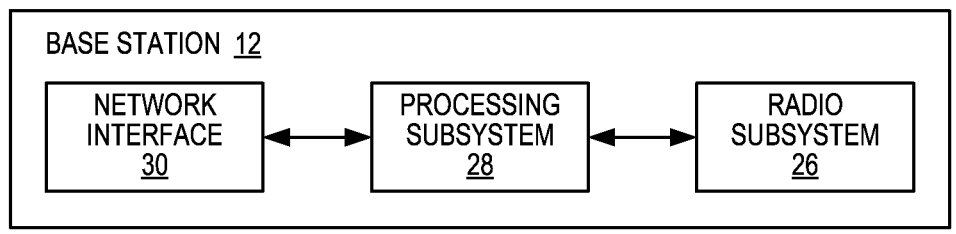
Figure 31:
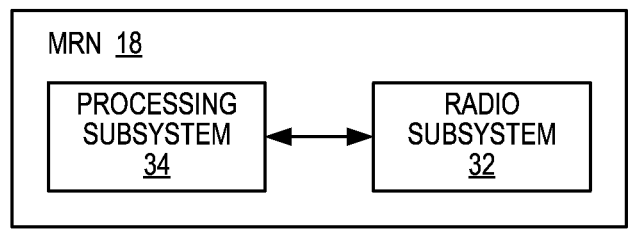
Figure 32:
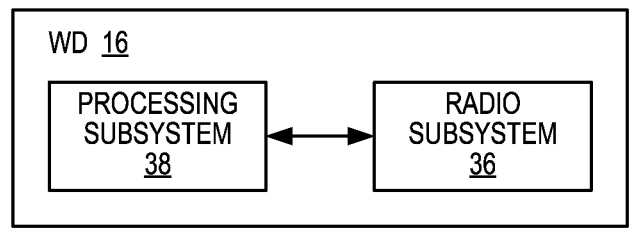

FIGS. 6A and 6B graphically illustrate an intra-base station MRN based CoMP assisted interference mitigation scheme for an uplink scenario in which the MRN moves to a target CoMP zone in which uplink interference for a desired wireless device is mitigated according to one embodiment of the present disclosure;

FIGS. 7A and 7B illustrate the operation of the cellular communications network of FIGS. 6A and 6B to provide MRN based CoMP assisted interference mitigation for an uplink scenario in which the MRN autonomously moves to a target CoMP zone in which uplink interference for a desired wireless device is mitigated according to one embodiment of the present disclosure;

FIG. 8 illustrates the operation of the cellular communications network of FIGS. 6A and 6B to provide MRN based CoMP assisted interference mitigation for an uplink scenario in which the MRN moves according to a predefined movement schedule according to one embodiment of the present disclosure;

FIG. 9 illustrates the operation of the cellular communications network of FIGS. 6A and 6B to provide MRN based CoMP assisted interference mitigation for an uplink scenario in which the MRN moves according to a predefined movement schedule according to another embodiment of the present disclosure;

FIGS. 10A and 10B graphically illustrate an intra-base station MRN based CoMP assisted interference mitigation scheme for a downlink scenario in which the MRN moves to a target CoMP zone in which downlink interference for a desired wireless device is mitigated according to one embodiment of the present disclosure;

FIGS. 11A and 11B illustrate the operation of the cellular communications network of FIGS. 10A and 10B to provide MRN based CoMP assisted interference mitigation for a downlink scenario in which the MRN autonomously moves to a target CoMP zone in which downlink interference for a desired wireless device is mitigated according to one embodiment of the present disclosure;

FIG. 12 illustrates the operation of the cellular communications network of FIGS. 10A and 10B to provide MRN based CoMP assisted interference mitigation for a downlink scenario in which the MRN moves according to a predefined movement schedule according to one embodiment of the present disclosure;

FIG. 13 illustrates the operation of the cellular communications network of FIGS. 10A and 10B to provide MRN based CoMP assisted interference mitigation for a downlink scenario in which the MRN moves according to a predefined movement schedule according to another embodiment of the present disclosure;

FIG. 14 graphically illustrates an intra-base station MRN based CoMP assisted interference mitigation scheme with Fractional Frequency Reuse (FFR) for an uplink scenario in which the MRN moves to a target CoMP zone in which uplink interference for a desired wireless device is mitigated according to one embodiment of the present disclosure;

FIG. 15 illustrates the operation of the cellular communications network of FIG. 14 to provide MRN based CoMP assisted interference mitigation with FFR for an uplink scenario in which the MRN autonomously moves to a target CoMP zone according to one embodiment of the present disclosure;

FIG. 16 illustrates the operation of the cellular communications network of FIG. 14 to provide MRN based CoMP assisted interference mitigation with FFR for an uplink scenario in which the MRN moves according to a predefined movement schedule according to one embodiment of the present disclosure;

FIG. 17 illustrates the operation of the cellular communications network of FIG. 14 to provide MRN based CoMP assisted interference mitigation with FFR for an uplink scenario in which the MRN moves according to a predefined movement schedule according to another embodiment of the present disclosure;

FIG. 18 graphically illustrates an intra-base station MRN based CoMP assisted interference mitigation scheme with FFR for a downlink scenario in which the MRN moves to a target CoMP zone in which downlink interference for a desired wireless device is mitigated according to one embodiment of the present disclosure;

FIGS. 19A and 19B illustrate the operation of the cellular communications network of FIG. 18 to provide MRN based CoMP assisted interference mitigation with FFR for a downlink scenario in which the MRN autonomously moves to a target CoMP zone according to one embodiment of the present disclosure;

FIG. 20 illustrates the operation of the cellular communications network of FIG. 18 to provide MRN based CoMP assisted interference mitigation with FFR for a downlink scenario in which the MRN moves according to a predefined movement schedule according to one embodiment of the present disclosure;

FIG. 21 illustrates the operation of the cellular communications network of FIG. 18 to provide MRN based CoMP assisted interference mitigation with FFR for a downlink scenario in which the MRN moves according to a predefined movement schedule according to another embodiment of the present disclosure;

FIG. 22 graphically illustrates an inter-base station MRN based CoMP assisted interference mitigation scheme for an uplink scenario in which the MRN moves to a target CoMP zone in which uplink interference for a desired wireless device is mitigated according to one embodiment of the present disclosure;

FIGS. 23A and 23B illustrate the operation of the cellular communications network of FIG. 22 to provide MRN based CoMP assisted interference mitigation for an uplink scenario in which the MRN autonomously moves to a target CoMP zone in which uplink interference for a desired wireless device is mitigated according to one embodiment of the present disclosure;

FIG. 24 illustrates the operation of the cellular communications network of FIG. 22 to provide MRN based CoMP assisted interference mitigation for an uplink scenario in which the MRN moves according to a predefined movement schedule according to one embodiment of the present disclosure;

FIG. 25 illustrates the operation of the cellular communications network of FIG. 22 to provide MRN based CoMP assisted interference mitigation for an uplink scenario in which the MRN moves according to a predefined movement schedule according to another embodiment of the present disclosure;

FIG. 26 graphically illustrates an inter-base station MRN based CoMP assisted interference mitigation scheme for a downlink scenario in which the MRN moves to a target CoMP zone in which downlink interference for a desired wireless device is mitigated according to one embodiment of the present disclosure;

FIGS. 27A and 27B illustrate the operation of the cellular communications network of FIG. 26 to provide MRN based CoMP assisted interference mitigation for a downlink scenario in which the MRN autonomously moves to a target CoMP zone in which downlink interference for a desired wireless device is mitigated according to one embodiment of the present disclosure;

FIG. 28 illustrates the operation of the cellular communications network of FIG. 26 to provide MRN based CoMP assisted interference mitigation for a downlink scenario in which the MRN moves according to a predefined movement schedule according to one embodiment of the present disclosure;

FIG. 29 illustrates the operation of the cellular communications network of FIG. 26 to provide MRN based CoMP assisted interference mitigation for a downlink scenario in which the MRN moves according to a predefined movement schedule according to another embodiment of the present disclosure;

FIG. 30 is a block diagram of a base station according to one embodiment of the present disclosure;

FIG. 31 is a block diagram of an MRN according to one embodiment of the present disclosure; and FIG. 32 is a block diagram of a wireless device according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to Mobile Relay Node (MRN) based Coordinated Multipoint (CoMP) operation in a cellular communications network. As discussed below in detail, in preferred embodiment, MRN based CoMP operation for a particular wireless device is provided via an MRN located in a target CoMP zone within a cell served by a serving base station of the wireless device in which interference to the wireless device is mitigated. This is particularly beneficial for wireless devices located in a cell edge area of their serving cells, which are referred to herein as cell edge wireless devices. By mitigating interference for cell edge wireless devices, throughput for cell edge wireless devices can be improved. In addition, by using an MRN for CoMP operation, the need for inter-base station communication for CoMP operation is avoided, which in turn mitigates high peak data rate and low latency requirements needed for conventional inter-base station CoMP.

Figure 1:
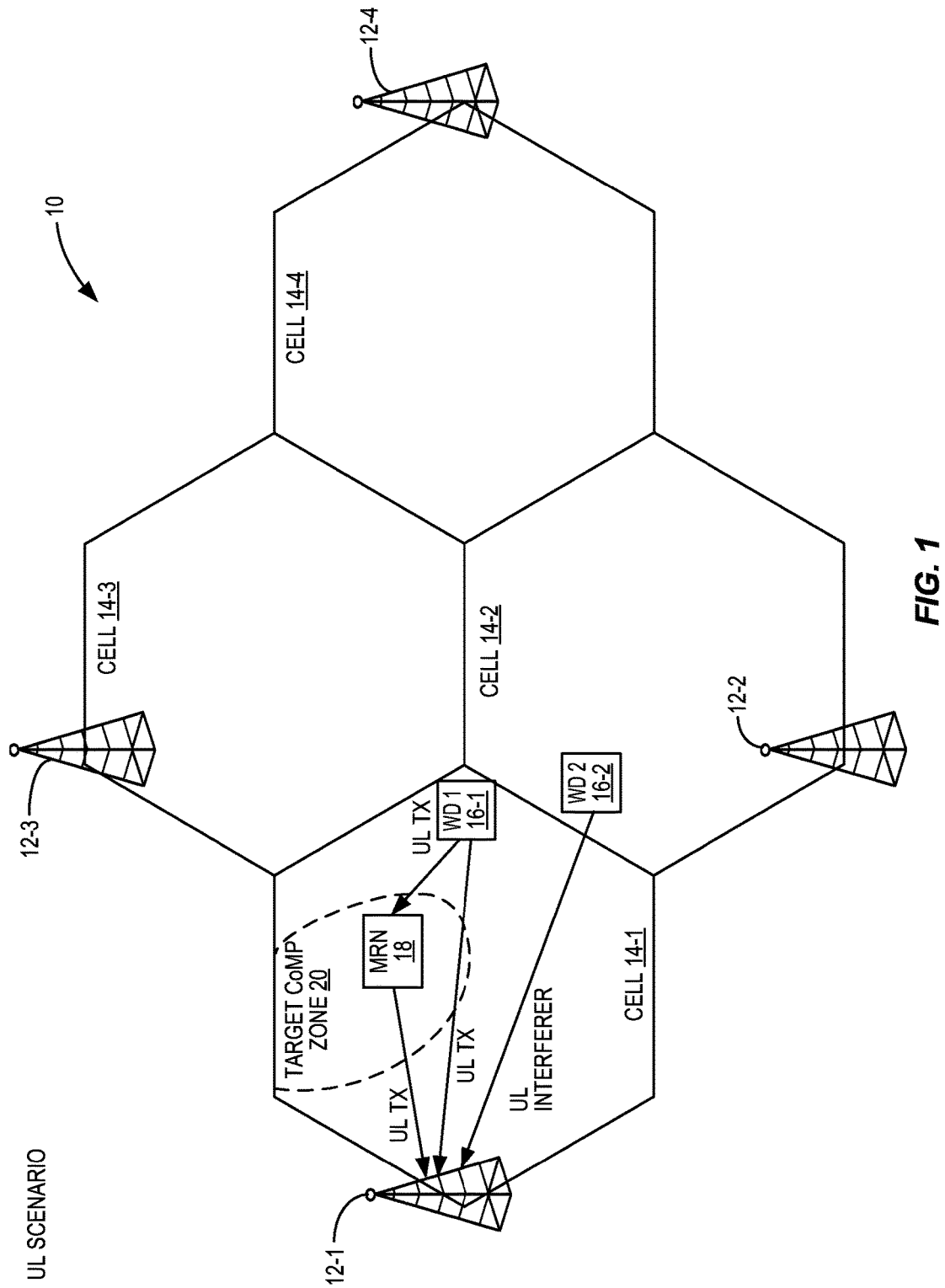
FIG. 1 illustrates a cellular communications network that provides Mobile Relay Node (MRN) based Coordinated Multipoint (CoMP) assisted interference mitigation for an uplink scenario according to one embodiment of the present disclosure.

FIG. 1 illustrates a cellular communications network 10 that provides MRN based Uplink (UL) CoMP operation according to one embodiment of the present disclosure. In one preferred embodiment, the cellular communications network 10 is a Long Term Evolution (LTE) cellular communications network. As such, LTE terminology is sometimes used throughout this description. However, unless otherwise indicated, it should be appreciated that any LTE terminology is not to be construed as to limit the present disclosure to LTE. Rather, the concepts disclosed herein can be used in any suitable cellular communications network.

As illustrated in FIG. 1, the cellular communications network 10 includes a number of base stations 12-1 through 12-4 (generally referred to herein collectively as base stations 12 and individually as base station 12) that serve corresponding cells 14-1 through 14-4 (generally referred to herein collectively as cells 14 and individually as cell 14) of the cellular communications network 10. Note that while only four base stations 12 and four cells 14 are illustrated for clarity and ease of discussion, one of ordinary skill in the art will readily appreciate that the cellular communications network 10 can include many base stations 12 and many cells 14. Further, while each of the base stations 12 is illustrated as serving only one cell 14, each base station 12 may serve one or more cells (e.g., one base station 12 may serve three cells or sectors). In one preferred embodiment, the base stations 12 are high power or macro base stations, which are referred to in LTE as enhanced Node Bs (eNBs).

A wireless device 16-1 is located in the cell 14-1 of the base station 12-1 and, as such, the base station 12-1 is referred to herein as a serving base station of the wireless device 16-1. Likewise, a wireless device 16-2 is located in the cell 14-2 of the base station 12-2 and, as such, the base station 12-2 is referred to herein as a serving base station of the wireless device 16-2. The wireless devices 16-1 and 16-2 are more generally referred to herein collectively as wireless devices 16 and individually as wireless device 16. The wireless devices 16 are generally any type of device(s) equipped with cellular network interfaces and may be referred to by different names in different types of cellular communications networks. For example, in LTE, the wireless devices 16 may be referred to as User Equipments (UEs). Further, the base stations 12-1, 12-2, and 12-3 are referred to herein as neighboring base stations and, likewise, the cells 14-1, 14-2, and 14-3 are referred to herein as neighboring cells. In contrast, since the cells 14-1 and 14-4 are not adjacent to one another, the base stations 12-1 and 12-4 are not neighboring base stations, and the cells 14-1 and 14-4 are not neighboring cells.

The wireless device 16-1 is located in a cell edge area of the cell 14-1 near the cell 14-2, and the wireless device 16-2 is located in a cell edge area of the cell 14-2 near the cell 14-1. As used herein, a cell edge area of a cell is the region within the cell nearest to a boundary of neighboring cells. Wireless devices 16 within the cell edge area are assumed to have relatively higher path loss for signals from the base station 12 of the cell and relatively lower path loss, and thus potentially greater interference, from other nearby cells. Further, the wireless devices 16-1 and 16-2 use the same uplink physical resources (time and frequency) in the respective cells 14-1 and 14-2. As such, an uplink from the wireless device 16-2 is a strong uplink interferer to the uplink from the wireless device 16-1 at the base station 12-1.

According to one embodiment of the present disclosure, MRN based UL CoMP operation is provided to mitigate the uplink interference to the uplink from the wireless device 16-1 in the cell 14-1 created by the uplink from the wireless device 16-2 in the neighboring cell 14-2. More specifically, MRN based UL CoMP operation is provided for the wireless device 16-1 using an MRN 18 positioned in a target CoMP zone 20 within the cell 14-1 of the base station 12-1. The target CoMP zone 20 is such that, by using the MRN 18 for UL CoMP for the wireless device 16-1, the uplink interference created by the uplink from the wireless device 16-2 is mitigated. In particular, the target CoMP zone 20 is such that the MRN 18 is positioned sufficiently close to the wireless device 16-1 in terms of radio distance to have a strong uplink from the wireless device 16-1 to the MRN 18 while also being sufficiently far from the wireless device 16-2 in terms of radio distance for the uplink interference from the wireless device 16-2 at the MRN 18 to be relatively weak as compared to the uplink from the wireless device 16-1 to the MRN 18.

During operation, the wireless device 16-1 transmits an uplink transmission to the base station 12-1. Using the same time and frequency resources, the wireless device 16-2 transmits an uplink transmission to the base station 12-2, which results in a strong interfering signal at the base station 12-1 for the uplink from the wireless device 16-1. The MRN 18 receives the uplink transmission transmitted by the wireless device 16-1 and re-transmits the uplink transmission to the base station 12-1 (i.e., transmits what is sometimes referred to herein as a relayed version of the uplink transmission from the wireless device 16-1). The base station 12-1 then combines the uplink transmission from the wireless device 16-1 and the re-transmission of the uplink transmission from the MRN 18 according to a desired UL CoMP combining scheme to provide a combined uplink transmission. The desired UL CoMP combining scheme can be based on any standard non-coherent or coherent combining of the uplink transmissions such as, for example, Maximum Ratio Combining (MRC), or a more sophisticated approach such as, for example, Interference Rejection Combining (IRC) in which the interference signal from the wireless device 16-2 is nulled out at the receiver of the base station 12-1. It should be noted that IRC can also be performed at the MRN 18 against the interference signal from the wireless device 16-2. It is noted here that in this scenario as in all the other scenarios described herein, the MRN 18 is aware of the uplink time and frequency resources scheduled to the wireless device 16-1 from the base station 12-1.

Figure 2:
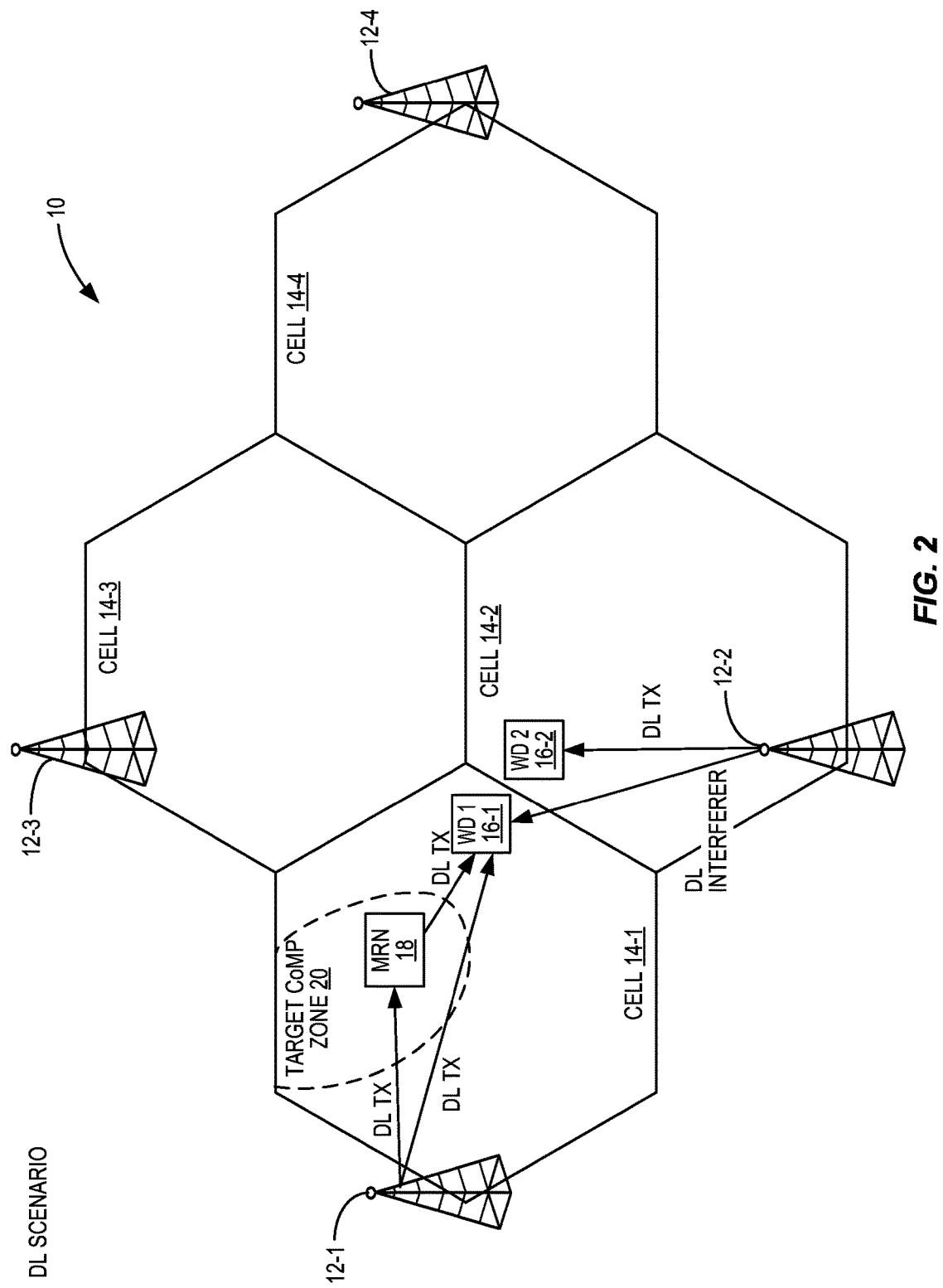
FIG. 2 illustrates a cellular communications network that provides MRN based CoMP assisted interference mitigation for a downlink scenario according to one embodiment of the present disclosure.

FIG. 2 illustrates the cellular communications network 10 for a downlink scenario according to another embodiment of the present disclosure. In this embodiment, the cellular communications network 10 provides MRN based Downlink (DL) CoMP operation. Again, the wireless device 16-1 is located in the cell edge area of the cell 14-1 near the cell 14-2, and the wireless device 16-2 is located in a cell edge area of the cell 14-2 near the cell 14-1. Further, the wireless devices 16-1 and 16-2 use the same downlink physical resources (time and frequency) in the respective cells 14-1 and 14-2. As such, a downlink from the base station 12-2 to the wireless device 16-2 causes strong downlink interference to the downlink from the base station 12-1 to the wireless device 16-1.

According to one embodiment of the present disclosure, MRN based DL CoMP operation is provided to mitigate the downlink interference to the downlink from the base station 12-1 to the wireless device 16-1 created by the downlink from the base station 12-2 to the wireless device 16-2. More specifically, MRN based DL CoMP operation is provided for the wireless device 16-1 using the MRN 18 positioned in the target CoMP zone 20 within the cell 14-1 of the base station 12-1. Notably, the target CoMP zone 20 for DL CoMP can be different than the target CoMP zone 20 for UL CoMP (FIG. 1). For DL CoMP, the target CoMP zone 20 is such that, by using the MRN 18 for DL CoMP for the wireless device 16-1, the downlink interference created by the downlink from the base station 12-2 to the wireless device 16-2 is mitigated. In particular, the target CoMP zone 20 is such that the MRN 18 is positioned sufficiently close to the wireless device 16-1 in terms of radio distance to have a strong downlink from the MRN 18 to the wireless device 16-1 while also being sufficiently far from the base station 12-2 in terms of radio distance for the downlink interference from the base station 12-2 at the MRN 18 to be relatively weak as compared to the downlink from the base station 12-1 to the MRN 18 and as compared to the downlink from the MRN 18 to the wireless device 16-1.

During operation, the base station 12-1 transmits a downlink transmission to the wireless device 16-1. Using the same time and frequency resources, the base station 12-2 transmits a downlink transmission to the wireless device 16-2, which results in a strong interfering signal for the downlink from the base station 12-1 to the wireless device 16-1. The MRN 18 receives the downlink transmission transmitted by the base station 12-1 and re-transmits the downlink transmission to the wireless device 16-1 (i.e., transmits what is sometimes referred to herein as a relayed version of the downlink transmission from the base station 12-1). Note that, in one embodiment, the same time and frequency resources are used for transmitting the downlink transmission from the base station 12-1 to both the MRN 18 and the wireless device 16-1. In case spatial separation allows it, downlink Multi-User Multiple Input and Multiple Output (MU-MIMO) techniques can be applied. In one alternative embodiment, independently of the use of downlink MU-MIMO techniques, different time and/or frequency resources can be used to transmit the downlink transmission from the base station 12-1 to the MRN 18 and from the base station 12-1 to the wireless device 16-1. The decision may depend on the scheduling policy at the base station 12-1. For the transmission from the MRN 18 to the wireless device 16-1, the same or different resources can be used as the ones used for the transmission from the base station 12-1 to the wireless device 16-1.

The wireless device 16-1 then combines the downlink transmission from the base station 12-1 and the re-transmission of the downlink transmission from the MRN 18 according to a desired DL CoMP combining scheme to provide a combined downlink transmission. The desired DL CoMP combining scheme can be based on any standard non-coherent or coherent combining of the downlink transmissions such as, for example, MRC, or a more sophisticated approach such as, for example, IRC in which the interference signal from the base station 12-2 is nulled out at the receiver of the wireless device 16-1. It should be noted that IRC can also be performed at the MRN 18 against the interference signal from the base station 12-2.

Figure 3:
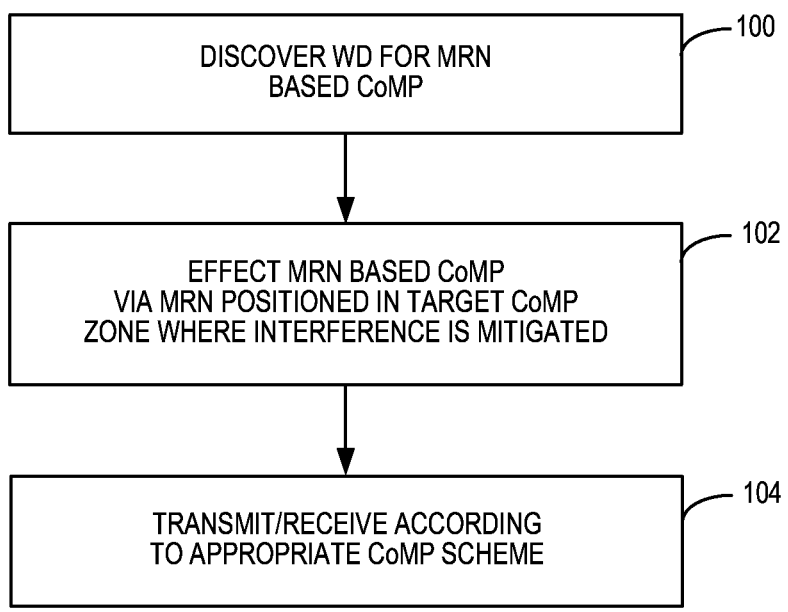
FIG. 3 is a flow chart that illustrates the operation of a base station to operate along with an MRN to provide MRN based CoMP assisted interference mitigation according to one embodiment of the present disclosure.

FIG. 3 is a flow chart that illustrates the operation of the base station 12-1 of FIGS. 1 and 2 according to one embodiment of the present disclosure. Note that while the various flow charts and diagrams described herein refer to "steps," it should be noted that, unless otherwise explicitly stated or implied by the description herein, the steps can be performed in any order. In this embodiment, the base station 12-1 discovers the wireless device (WD) 16-1 as being a wireless device for MRN based CoMP operation (step 100). The manner in which the wireless device 16-1 is discovered can vary. As one example, the wireless device 16-1 is discovered by determining that a utility metric for the wireless device 16-1 meets one or more predefined criteria (e.g., an uplink/downlink Signal to Interference plus Noise Ratio (SINR) or an uplink/downlink Signal to Leakage plus Noise Ratio (SLNR) for the wireless device 16-1 is less than a predefined threshold value).

After discovering the wireless device 16-1, the base station 12-1 effects MRN based CoMP via the MRN 18 positioned in the target CoMP zone 20 where interference to the uplink/downlink for the wireless device 16-1 is mitigated (step 102). As discussed below, there are various ways in which the base station 12-1 can effect MRN based CoMP via the MRN 18. For instance, in in one embodiment, the base station 12-1 communicates with the MRN 18 such that the MRN 18 autonomously moves to the target CoMP zone 20, as discussed below in detail. In another embodiment, the base station 12-1 has knowledge of a predefined schedule of movement of the MRN 18 and utilizes the predefined schedule to coordinate MRN based CoMP for the wireless device 16-1 when the MRN 18 is positioned in the target CoMP zone 20. Regarding the predefined schedule of movement of the MRN 18, the MRN 18 may be located on a moving vehicle (e.g., a public transportation vehicle such as a bus) where the moving vehicle moves according to a predefined schedule.

During MRN based operation, the base station 12-1 transmits or receives signals according to the appropriate MRN based CoMP scheme (step 104). For MRN based UL CoMP, the base station 12-1 receives and combines uplink transmissions from the wireless device 16-1 and the MRN 18 according to the desired UL CoMP combining scheme. For MRN based DL CoMP, the base station 12-1 transmits a downlink transmission for the wireless device 16-1, where the downlink transmission is received and re-transmitted by the MRN 18. The downlink transmissions from the base station 12-1 and the MRN 18 are received and combined by the wireless device 16-1 according to the desired DL CoMP combining scheme.

Figure 4:
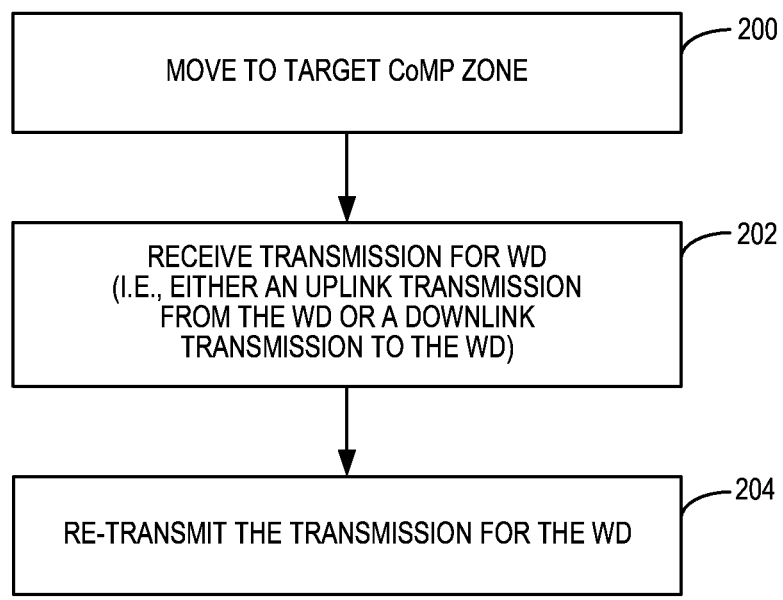
FIG. 4 is a flow chart that illustrates the operation of an MRN to operate along with a base station to provide MRN based CoMP assisted interference mitigation according to one embodiment of the present disclosure.

FIG. 4 is a flow chart that illustrates the operation of the MRN 18 of FIGS. 1 and 2 according to one embodiment of the present disclosure. First, the MRN 18 moves to the target CoMP zone 20 (step 200). As discussed below, the MRN 18 may autonomously move to the target CoMP zone 20 or move to the target CoMP zone 20 according to a predefined schedule of movement. While in the target CoMP zone 20, the MRN receives a transmission for the wireless device 16-1 (step 202). Depending on the embodiment, the transmission for the wireless device 16-1 is either an uplink transmission from the wireless device 16-1 or a downlink transmission to the wireless device 16-1. The MRN 18 then re-transmits the transmission for the wireless device 16-1 (step 204). For an uplink transmission, the MRN 18 re-transmits the uplink transmission received from the wireless device 16-1 to the base station 12-1. For a downlink transmission, the MRN 18 re-transmits the downlink transmission received from the base station 12-1 to the wireless device 16-1.

Figure 5:
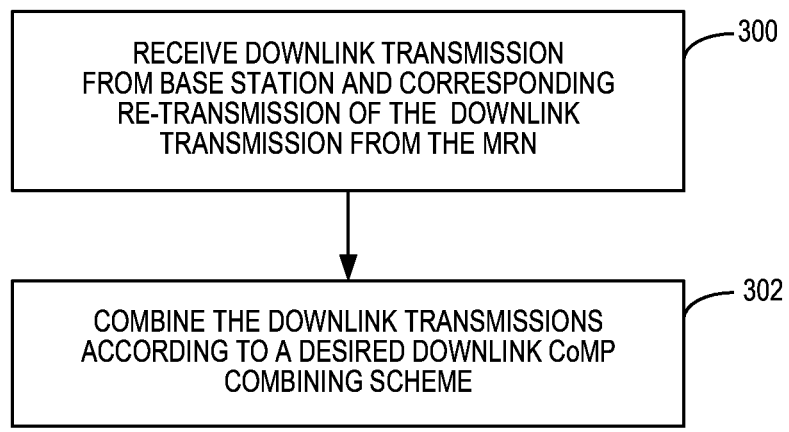
FIG. 5 is a flow chart that illustrates the operation of a wireless device to receive and combine downlink transmissions provided to the wireless device according to an MRN based downlink CoMP assisted interference mitigation scheme according to one embodiment of the present disclosure.

FIG. 5 is a flow chart that illustrates the operation of the wireless device 16-1 according to one embodiment of the present disclosure. Note that this embodiment is for the downlink scenario. For the uplink scenario, the wireless device 16-1 transmits an uplink transmission, but may also perform additional functions depending on the particular embodiment and implementation. Returning to the downlink scenario, during MRN based CoMP operation, the wireless device 16-1 receives a downlink transmission from the base station 12-1 and a corresponding re-transmission of the downlink transmission from the MRN 18 (step 300). The wireless device 16-1 then combines the downlink transmission from the base station 12-1 and the re-transmission of the downlink transmission from the MRN 18 according to the desired DL CoMP combining scheme (step 302).

FIGS. 6A and 6B graphically illustrate the operation of the cellular communications network 10 to provide MRN based UL CoMP according to one embodiment in which the MRN 18 autonomously moves to the target CoMP zone 20. Initially, as illustrated in FIG. 6A, the MRN 18 is not located in the target CoMP zone 20. Notably, the uplink signal from the wireless device 16-1 to the base station 12-1 is denoted as $S_{11,UL}$, the uplink signal from the wireless device 16-1 to the MRN 18 is denoted as $S_{1R,UL}$, the uplink signal from the wireless device 16-2 to the base station 12-2 is denoted as $S_{22,UL}$, the interfering signal received by the base station 12-1 created by the uplink from the wireless device 16-2 is denoted as $S_{21,UL}$, the interfering signal received by the MRN 18 created by the uplink from the wireless device 16-2 is denoted as $S'_{21,UL}$, and the uplink signal from the MRN 18 to the base station 12-1 is denoted as $S_{1e,UL}$.

Thereafter, the MRN 18 autonomously moves to the target CoMP zone 20 for MRN based UL CoMP for the wireless device 16-1, as illustrated in FIG. 6B. As discussed below in detail, in one embodiment, the target CoMP zone 20 is defined based on link metrics for at least some of $S_{11,UL}$, $S_{1R,UL}$, $S_{21,UL}$, $S'_{21,UL}$, $S_{22,UL}$, and $S_{1e,UL}$. These link metrics define what is referred to herein as radio distances between the corresponding nodes in the cellular communications network 10. In one embodiment, the link metrics are SINR values or SLNR values. As one particular example, for LTE, the link metrics can be Channel Quality Index (CQI) values (e.g., Reference Signal Received Power (RSRP) and/or Reference Signal Received Quality (RSRQ) values), with CQI and RSRQ to be understood as equivalent to SINR values. Thus, as an example, the link metric (e.g., SINR, SLNR, or CQI value) for the uplink $S_{11,UL}$ defines, or is indicative of, a radio distance between the wireless device 16-1 and the base station 12-1. Based on the appropriate link metrics, the MRN 18 can then autonomously move or can be instructed to autonomously move until the link metrics indicate that the MRN 18 is in the target CoMP zone 20.

FIGS. 7A and 7B illustrate the operation of the cellular communications network 10 of FIGS. 6A and 6B to provide MRN based UL CoMP for the wireless device 16-1 according to one embodiment in which the MRN 18 autonomously moves to the target CoMP zone 20. In this embodiment, the base station 12-1 and/or the MRN 18 obtain the link metrics for the various links by transmitting corresponding Channel State Information Reference Signals (CSI-RS) and, in response, receiving corresponding CQI reports. Note that while CSI-RS and CQI reports are used in this embodiment, other techniques for obtaining the link metrics can be used (e.g., Sounding Reference Signals (SRSs) on the uplink). More specifically, in this embodiment, the base station 12-1 transmits a CSI-RS (CSI-RS 1), which is received by the MRN 18 and the wireless devices 16-1 and 16-2 (step 400). Using CSI-RS 1, the wireless devices 16-1 and 16-2 generate CQI values for the corresponding links and return the CQI values to the base station 12-1 in corresponding CQI reports (steps 402 and 404).

In addition, the MRN 18 transmits a CSI-RS (CSI-RS 2), which is received by the wireless devices 16-1 and 16-2 (step 406). Using CSI-RS 2, the wireless devices 16-1 and 16-2 generate CQI values for the corresponding links between the MRN 18 and the wireless devices 16-1 and 16-2 and return the CQI values to the MRN 18 in corresponding CQI reports (steps 408 and 410). In this embodiment, the CQI reports from the wireless devices 16-1 and 16-2 may also be received by the base station 12-1. However, the present disclosure is not limited thereto. Rather, in an alternative embodiment, the CQI reports in steps 408 and 410 are received only by the MRN 18, where the MRN 18 subsequently sends the CQI reports or the CQI values from the CQI reports to the base station 12-1. Like the wireless devices 16-1 and 16-2, using CSI-RS 1, the MRN 18 generates a CQI value for the link between the MRN 18 and the base station 12-1 and then returns a corresponding CQI report to the base station 12-1 (step 412). In this embodiment, if the CQI reports of steps 408 and 410 are not received by the base station 12-1 directly from the wireless devices 16-1 and 16-2, the MRN 18 includes the corresponding CQI values in the CQI report of step 412 or provides the CQI values in addition to the CQI report of step 412.

Next, using at least some of the CQI values obtained in steps 400-412, the base station 12-1 discovers the wireless device 16-1 as a wireless device for MRN based UL CoMP (step 414). In general, in step 414, the base station 12-1 discovers the wireless device 16-1 as a wireless device that will benefit from MRN based UL CoMP. In one embodiment, the base station 12-1 utilizes the following equation for discovery of the wireless device 16-1:

$$\gamma_{1,UL} = \frac{CQI_{S_{11,UL}}}{CQI_{S_{21,UL}} + I + n} < Threshold1_{UL} \qquad (1)$$

where $CQI_{S_{11,UL}}$ is the CQI value for the link between the base station 12-1 and the wireless device 16-1, $CQI_{S_{11,UL}}$ is the CQI value for the link between the base station 12-1 and the wireless device 16-2, I is interference, n is noise, and Threshold1$_{UL}$ is a predefined threshold value. In one embodiment, Threshold1$_{UL}$ is network settable. The predefined threshold value (Threshold1$_{UL}$) is defined such that the wireless device 16-1 is discovered as a wireless device that will benefit from MRN based UL CoMP when $\gamma_{1,UL}$ falls below Threshold1$_{UL}$.

Once the wireless device 16-1 is discovered, the base station 12-1 identifies the wireless device 16-2 as a source of a dominant interferer to the uplink from the wireless device 16-1 to the base station 12-1 (step 416). While the identification of the wireless device 16-2 as the source of the dominant interferer can be performed using any suitable process, in one embodiment, the base station 12-1 obtains information from the neighboring base stations 12-2 and 12-3 that identifies wireless devices that utilize the same uplink physical resources as the wireless device 16-1 using inter-base station communication, which for LTE is X2 communication. If more than one of the neighboring cells have wireless devices that utilize the same uplink physical resources as the wireless device 16-1, the base station 12-1 may further utilize link metrics (e.g., CQI values) for links between the base station 12-1 and those wireless devices to identify the source of the dominant interferer. In particular, the wireless device (which in this example is the wireless device 16-2) being the shortest radio distance from base station 12-1 (i.e., presenting the strongest uplink interference to the base station 12-1) is identified as the source of the dominant interferer to the uplink from the wireless device 16-1.

In this embodiment, the base station 12-1 also obtains geographic locations of the wireless devices 16-1 and 16-2 (step 418). The geographic locations of the wireless devices 16-1 and 16-2 can be obtained using any suitable technique. As one example, in LTE, the base station 12-1 may obtain the geographic locations of the wireless devices 16-1 and 16-2 via an Observed Time Difference Of Arrival (OTDOA) approach using Positioning Reference Symbols (PRS). Note that step 418 is optional.

Next, based on the CQI values and/or the geographic locations of the wireless devices 16-1 and 16-2, the base station 12-1 determines whether the MRN 18 is in the target CoMP zone 20 for UL CoMP for the wireless device 16-1 (step 420). In this particular example, the base station 12-1 determines that the MRN 18 is not in the target CoMP zone 20. In this embodiment, the target CoMP zone 20 is defined based on the link metrics for $S_{1e,UL}$, $S_{1R,UL}$, $S_{21,UL}$, and $S'_{21,UL}$. More specifically, in one particular embodiment, the target CoMP zone 20 is defined by the following equations:

$$\gamma_{2,UL} = \frac{CQI_{S_{1e,UL}}}{CQI_{S_{21,UL}} + I + n} > Threshold2_{UL} \quad (2)$$

$$\gamma_{3,UL} = \frac{CQI_{S_{1R,UL}}}{CQI_{S'_{21,UL}} + I + n} > Threshold3_{UL} \quad (3)$$

where $CQI_{S_{1e,UL}}$ is the CQI value for the link between the base station 12-1 and the MRN 18, $CQI_{S_{21,UL}}$ is the CQI value for the link between the base station 12-1 and the wireless device 16-2, $CQI_{S_{1R,UL}}$ is the CQI value for the link between the wireless device 16-1 and the MRN 18, $CQI_{S'_{21,UL}}$ is the CQI value for the link between the wireless device 16-2 and the MRN 18, I is interference, n is noise, and Threshold2$_{UL}$ and Threshold3$_{UL}$ are predefined threshold values. In one embodiment, the predefined threshold values (Threshold2$_{UL}$ and Threshold3$_{UL}$) are network settable values. The predefined threshold values (Threshold2$_{UL}$ and Threshold3$_{UL}$) are defined such that, when $\gamma_{2,UL}$ is greater than Threshold2$_{UL}$ and $\gamma_{3,UL}$ is greater than Threshold3$_{UL}$, the MRN 18 is in the target CoMP zone 20. The base station 12-1 can thus determine where the MRN 18 is in relation to the target CoMP zone 20 based on the CQI values for the appropriate links obtained in steps 400-412 and, in some embodiments, the geographic locations of the wireless devices 16-1 and 16-2.

Note that, in one preferred embodiment, the predefined threshold values Threshold1$_{UL}$, Threshold2$_{UL}$, and Threshold3$_{UL}$ are network settable parameters that can be adjusted to determine the geometry of wireless devices to be selected for MRN based UL CoMP (i.e., Threshold1$_{UL}$) as well as the size of the target CoMP zone 20 (i.e., Threshold2$_{UL}$ and Threshold3$_{UL}$). When as a minimum, $\gamma_{2,UL}$>Threshold2$_{UL}$ and $\gamma_{3,UL}$>Threshold3$_{UL}$, then the MRN 18 is in a valid positioning area (i.e., the target CoMP zone 20) to support the MRN based UL CoMP for the wireless device 16-1. It should be noted that a globally optimal position of the MRN 18 can be determined by finding the position that jointly maximizes $\gamma_{2,UL}$ and $\gamma_{3,UL}$. The joint optimization can be performed by a number of well-known approaches including gradient and Least Mean Squares (LMS) search patterns with respect to the position of the MRN 18. When the globally optimal position is calculated, it will be a unique position or small number of unique positions relative to the base station 12-1, the wireless device 16-1, and the wireless device 16-2. In order to reduce the search time and complexity of the location process, Equations (2) and (3) are preferred, even though the resulting positioning can be suboptimal.

In response to determining that the MRN 18 is not in the target CoMP zone 20, the base station 12-1 sends an instruction to the MRN 18 to move toward the target CoMP zone 20 (step 422). For instance, the base station 12-1 may instruct the MRN 18 to move to a particular geographic location or in a particular direction that, based on the link metrics and, in some embodiments, the geographic locations of the wireless devices 16-1 and 16-2, the base station 12-1 believes to be in or closer to the target CoMP zone 20 or in a particular direction that the base station 12-1 believes to be in the direction of the target CoMP zone 20. More specifically, since the target CoMP zone 20 is defined based on the link metrics, the base station 12-1 may not be able to determine the exact location or boundaries of the target CoMP zone 20. In this case, the base station 12-1 may use any suitable search algorithm to select the location or direction in which the MRN 18 is to move in order to search the cell 14-1 for the target CoMP zone 20 based on the current link metric values and, in some embodiments, the current geographic locations of the wireless devices 16-1 and 16-2. The search algorithm may be, for example, a search algorithm that searches the cell 14-1 using a grid search pattern, a random search, a circular search centered on the base station 12-1, a circular search centered on the wireless device 16-1, or the like. The geographic locations of the wireless devices 16-1 and 16-2 may be used to reduce the search area and time needed for the search based on, for example, a pre-calculated lookup table.

In response to receiving the instruction to move, the MRN 18 moves according to the instruction (step 424). The MRN 18 moves autonomously using any suitable movement mechanism. As an example, the MRN 18 may be affixed to a device that is capable of movement (e.g., a balloon or aircraft) where the MRN 18 is able to control the movement of the device according to the instruction from the base station 12-1. In this embodiment, sometime thereafter, the base station 12-1 updates the CQI information, or values, for the appropriate links and, in some embodiments, the geographic locations of the wireless devices 16-1 and 16-2 (step 426). The CQI information can be updated using a procedure that is the same as or similar to the procedure of steps 400-412. The geographic locations of the wireless devices 16-1 and 16-2 can be updated using a process that is the same as or similar to that of step 418. The base station 12-1 then determines whether the MRN 18 is now in the target CoMP zone 20 and, if not, instructs the MRN 18 to continue to move toward the target CoMP zone 20 (step 428). The process of steps 426 and 428 continues until the base station 12-1 determines that the MRN 18 is in the target CoMP zone 20 (step 430). Once the base station 12-1 determines that the MRN 18 is in the target CoMP zone 20, the base station 12-1 sends an instruction to the MRN 18 to enable MRN based UL CoMP for the wireless device 16-1 (step 432).

After enabling MRN based UL CoMP for the wireless device 16-1 at the MRN 18, the wireless device 16-1 transmits an uplink transmission to the base station 12-1 (step 434). The MRN 18 receives the uplink transmission from the wireless device 16-1 and re-transmits the uplink transmission to the base station 12-1 (step 436). In this embodiment, the MRN 18 re-transmits the uplink transmission using uplink physical resources allocated for a wireless backhaul from the MRN 18 to the base station 12-1 (i.e., the re-transmission of the uplink transmission from the MRN 18 to the base station 12-1 uses different or similar physical resources than those used for the uplink transmission from the wireless device 16-1 to the base station 12-1). The base station 12-1 then combines the uplink transmission received from the wireless device 16-1 in step 434 and the re-transmission of the uplink transmission received from the MRN 18 in step 436 using the desired UL CoMP combining scheme (e.g., MRC or IRC) to provide a combined uplink transmission (step 438). The base station 12-1 then decodes the combined uplink transmission.

It should be noted that, for Hybrid Automatic Repeat Request (HARQ) as employed in LTE, the combining of step 438 will occur as a part of each step of the HARQ process being employed. Thus, if the combined uplink transmission is not successfully decoded in the first HARQ interval, a NACK is transmitted by the base station 12-1. The NACK will be received at the wireless device 16-1 and the MRN 18, both of which will then transmit the second redundancy version of the corresponding uplink transmission. The HARQ process will continue in this manner until the combined uplink transmission is successfully decoded at the base station 12-1 or the maximum number of HARQ transmission intervals has been reached.

Before proceeding, it should be noted that while the base station 12-1 determines whether the MRN 18 is located in the target CoMP zone 20 and instructs the MRN 18 to move accordingly in the embodiment of FIGS. 7A and 7B, the present disclosure is not limited thereto. In one alternative embodiment, the link metrics are provided to the MRN 18, and the MRN 18 determines whether the MRN 18 is in the target CoMP zone 20. If not, the MRN 18 autonomously moves to the target CoMP zone 20 using, for example, a suitable search algorithm.

It should also be noted that while, in the example above, the wireless device 16-1 is discovered and the target CoMP zone 20 is defined based on Equations (1)-(3), the present disclosure is not limited thereto. In addition to or as an alternative to the metrics in Equations (1)-(3), other possible metrics can be employed to define the target CoMP zone 20 in order to minimize interference. For example, the target CoMP zone 20 may be defined by maximizing a metric of the form $w_1 \times SINR_1 + w_2 \times SINR_2$, in which $SINR_1$ is the SINR for $S_{1R,UL}$ from the wireless device 16-1 to the MRN 18, $SINR_2$ is the SINR for $S_{1e,UL}$ from the MRN 18 to the base station 12-1, and $w_1$ and $w_2$ are weights selected by, for example, the network (e.g., the base station 12-1 or the MRN 18) or network operator. It should be noted that positioning the MRN 18 such that $SINR_2$ is maximized ensures that the radio distance between the MRN 18 and the wireless device 16-2 (i.e., the source of the dominant uplink interferer) is greater than the radio distance between the MRN 18 and the wireless device 16-1. The choice of the weights $w_1$ and $w_2$ depends on whether both $S_{11,UL}$ and an aggregation of $S_{1R,UL}$ and $S_{1e,UL}$ are employed at the base station 12-1 to decode the desired signal. If both are employed, the base station 12-1 can use UL CoMP combining to combine the two received signals or possibly utilize spatial multiplexing of the uplink signal from the wireless device 16-1 between the $S_{11,UL}$ and the $S_{1R,UL}$ paths. If the signal $S_{11,UL}$ is too weak (e.g., the SINR is below the predefined threshold value (Threshold1$_{UL}$)) to constructively contribute to a CoMP type signal, the base station 12-1 may chose to ignore it and only decode the uplink transmission for the wireless device 16-1 received from the MRN 18. Additional factors influencing the choice of $w_1$ and $w_2$ include the ability to have different levels of link adaptation (i.e., the choice of modulation and coding) on $S_{1R,UL}$ and $S_{1e,UL}$ due to differences in link budget on the two paths, but also due to the fact that the MRN 18 may be serving more than one wireless device 16 and, as such, the link $S_{1e,UL}$ may need to be weighted to ensure an adequate SINR to accommodate a higher throughput than that required just for $S_{1R,UL}$. In this same scenario of weak signal $S_{11,UL}$, there can be cases in which the primary goal is to minimize energy consumed within the wireless device 16-1. In this case, maximizing the weighted sum of $SINR_1$ and $SINR_2$ might not be the primary goal. Simply maximizing $SINR_2$ may be sufficient along with achieving $SINR_1$ above a given threshold.

Furthermore, in addition to employing a weighted SINR metric, one may also chose to employ a weighted SLNR metric in which the leakage interference from the MRN 18 to base stations 12 serving other cells 14 is taken into consideration when optimizing the signal power level and/or position of the MRN 18. The SLNR can be obtained through exchange of inter-base station messages (e.g., X2 messages) between the base station 12-1 and base stations 12 serving other cells 14.

FIG. 8 illustrates the operation of the cellular communications network 10 of FIGS. 6A and 6B to provide MRN based UL CoMP for the wireless device 16-1 according to one embodiment in which the MRN 18 moves according to a predefined movement schedule. In this embodiment, the base station 12-1 obtains link metrics for the various links only when the MRN 18 is to be located in the target CoMP zone 20 according to the predefined movement schedule for the MRN 18. First, the base station 12-1 determines when the MRN 18 is to be in the target CoMP zone 20 based on the predefined schedule of movement for the MRN 18 (step 500). For example, the MRN 18 may be located on a bus that has a predefined schedule of movement. The schedule of movement of the bus can therefore be used as the predefined schedule of movement for the MRN 18.

In order to determine when the MRN 18 is to be in the target CoMP zone 20, the base station 12-1 determines a geographical area that corresponds to the target CoMP zone 20. The base station 12-1 may do so using historical information. For example, the process of FIGS. 7A and 7B may have previously been performed a number of times for one or more wireless devices 16. Based on information gathered during those iterations of the process of FIGS. 7A and 7B, the base station 12-1 can determine a geographical area that is frequently a target CoMP zone for MRN based UL CoMP. This geographical area can then be used by the base station 12-1 as the target CoMP zone 20. Then, by comparing the predefined schedule of movement for the MRN 18 and the geographical area corresponding to the target CoMP zone 20, the base station 12-1 determines when the MRN 18 is to be in the target CoMP zone 20.

Next, the base station 12-1 schedules transmission of CSI-RS in a time window during which the MRN 18 is scheduled to be in the target CoMP zone 20 (step 502). The base station 12-1 then transmits a CSI-RS (CSI-RS 1) as scheduled, where CSI-RS 1 is received by the MRN 18 and the wireless devices 16-1 and 16-2 (step 504). Using CSI-RS 1, the wireless devices 16-1 and 16-2 generate CQI values for the corresponding links and then return the CQI values to the base station 12-1 in corresponding CQI reports (steps 506 and 508). In addition, the MRN 18 transmits a CSI-RS (CSI-RS 2) to the wireless devices 16-1 and 16-2 (step 510). Using CSI-RS 2, the wireless devices 16-1 and 16-2 generate CQI values for the corresponding links between the MRN 18 and the wireless devices 16-1 and 16-2 and then return the CQI values to the MRN 18 in corresponding CQI reports (steps 512 and 514). In this embodiment, the CQI reports from the wireless devices 16-1 and 16-2 may also be received by the base station 12-1. However, the present disclosure is not limited thereto. Rather, in an alternative embodiment, the CQI reports in steps 512 and 514 are received only by the MRN 18, where the MRN 18 subsequently sends the CQI reports or the CQI values from the CQI reports to the base station 12-1. Like the wireless devices 16-1 and 16-2, using CSI-RS 1, the MRN 18 generates a CQI value for the link between the MRN 18 and the base station 12-1 and then returns a corresponding CQI report to the base station 12-1 (step 516). In this embodiment, if the CQI reports of steps 512 and 514 are not received by the base station 12-1 directly from the wireless devices 16-1 and 16-2, the MRN 18 includes the corresponding CQI values in the CQI report of step 516 or provides the CQI values in addition to the CQI report of step 516.

Next, using at least some of the CQI values obtained in steps 504-516, the base station 12-1 discovers the wireless device 16-1 as a wireless device for MRN based UL CoMP (step 518). More specifically, in one embodiment, the base station 12-1 discovers the wireless device 16-1 based on Equation (1) above. In addition, the base station 12-1 may utilize the other link metrics (e.g., utilize Equations (2) and (3) above) as part of the discovery process to ensure discovery of a wireless device for which the target CoMP zone 20 is in fact the target CoMP zone for the wireless device.

Once the wireless device 16-1 is discovered, the base station 12-1 provides information to the MRN 18 that enables or instructs the MRN 18 to provide MRN based UL CoMP operation for the wireless device 16-1 (step 520). In one embodiment, this information can include information that specifically identifies the wireless device 16-1 and/or the uplink physical resources to be used by the wireless device 16-1. Sometime thereafter, the wireless device 16-1 transmits an uplink transmission to the base station 12-1 (step 522). The MRN 18 receives the uplink transmission from the wireless device 16-1 and re-transmits the uplink transmission to the base station 12-1 (step 524).

The base station 12-1 then combines the uplink transmission received from the wireless device 16-1 in step 522 and the re-transmission of the uplink transmission received from the MRN 18 in step 524 using the desired UL CoMP combining scheme (e.g., MRC or IRC) to provide a combined uplink transmission (step 526). The base station 12-1 then decodes the combined uplink transmission. It should be noted that, for HARQ as employed in LTE, the combining of step 526 will occur as a part of each step of the HARQ process being employed. Thus, if the combined uplink transmission is not successfully decoded in the first HARQ interval, a NACK is transmitted by the base station 12-1. The NACK will be received at the wireless device 16-1 and the MRN 18, both of which will then transmit the second redundancy version of the corresponding uplink transmission. The HARQ process will continue in this manner until the combined uplink transmission is successfully decoded at the base station 12-1 or the maximum number of HARQ transmission intervals has been reached.

FIG. 9 illustrates the operation of the cellular communications network 10 of FIGS. 6A and 6B to provide MRN based UL CoMP for the wireless device 16-1 according to another embodiment in which the MRN 18 moves according to a predefined movement schedule. In this embodiment, the base station 12-1 provides geographical information to the MRN 18 that defines the target CoMP zone 20 and then MRN based UL CoMP operation is activated at the MRN 18 when the MRN 18 is positioned in the target CoMP zone 20 according to an actual measurement of the geographic location of the MRN 18 or the predefined movement schedule of the MRN 18. As illustrated, the base station 12-1 provides information to the MRN 18 that defines the target CoMP zone 20 (step 600). In this embodiment, the information that defines the target CoMP zone 20 is geographical information (e.g., a latitude and longitude coordinate pair and a radius that defines the target CoMP zone 20 as a circular geographic area, multiple latitude and longitude pairs that define edges of a polygon that define the target CoMP zone 20 as a polygonal geographic area, or the like).

The base station 12-1 also discovers the wireless device 16-1 as a wireless device for MRN based UL CoMP using the MRN 18 when the MRN 18 is positioned in the target CoMP zone 20 (step 602). In this embodiment, the wireless device 16-1 discovered in step 602 is a wireless device that will benefit from MRN based UL CoMP when the MRN 18 is positioned in the target CoMP zone 20. In one particular embodiment, the wireless device 16-1 is a wireless device that is at a fixed location, where the fixed location is such that Equations (1), (2), and (3) above are satisfied. In another particular embodiment, the wireless device 16-1 is a mobile device that is opportunistically selected by the base station 12-1 such that Equations (1), (2), and (3) above are satisfied.

Once the wireless device 16-1 is discovered, the base station 12-1 provides information to the MRN 18 that enables or instructs the MRN 18 to provide MRN based UL CoMP operation for the wireless device 16-1 when the MRN 18 is located in the target CoMP zone 20 (step 604). In one embodiment, this information includes information that specifically identifies the wireless device 16-1 and/or the uplink physical resources to be used by the wireless device 16-1. Thereafter, when the MRN 18 determines that the MRN 18 is positioned in the target CoMP zone 20, the MRN 18 activates MRN based UL CoMP for the wireless device 16-1 (step 606). Depending on the particular embodiment, the MRN 18 determines that it is in the target CoMP zone 20 by, for example, determining the actual geographic location of the MRN 18 and comparing it to the geographic area defining the target CoMP zone 20 or determining when the MRN 18 is scheduled to be in the target CoMP zone 20 according to the predefined movement schedule for the MRN 18.

Note that, in an alternative embodiment, as an alternative to steps 600, 604, and 606, the base station 12-1 may use the predefined schedule of movement for the MRN 18 to determine when the MRN 18 is scheduled to be positioned in the target CoMP zone 20. Then, either prior to or when the MRN 18 is scheduled to be positioned in the target CoMP zone 20, the base station 12-1 instructs the MRN 18 to activate MRN based UL CoMP for the wireless device 16-1. This instruction may define a time window in which the MRN 18 is to keep MRN based UL CoMP activated for the wireless device 16-1 (e.g., a time window that the MRN 18 is scheduled to be in the target CoMP zone 20). Alternatively, the base station 12-1 may instruct the MRN 18 to deactivate MRN based UL CoMP at the appropriate time (i.e., at the time or shortly after the time that the MRN 18 is scheduled to leave the target CoMP zone 20).

Once MRN based UL CoMP is activated, the wireless device 16-1 transmits an uplink transmission to the base station 12-1 (step 608). The MRN 18 receives the uplink transmission from the wireless device 16-1 and re-transmits the uplink transmission to the base station 12-1 (step 610). The base station 12-1 then combines the uplink transmission received from the wireless device 16-1 in step 608 and the re-transmission of the uplink transmission received from the MRN 18 in step 610 using the desired UL CoMP combining scheme (e.g., MRC or IRC) to provide a combined uplink transmission (step 612). The base station 12-1 then decodes the combined uplink transmission. It should be noted that, for HARQ as employed in LTE, the combining of step 612 will occur as a part of each step of the HARQ process being employed. Thus, if the combined uplink transmission is not successfully decoded in the first HARQ interval, a NACK is transmitted by the base station 12-1. The NACK will be received at the wireless device 16-1 and the MRN 18, both of which will then transmit the second redundancy version of the corresponding uplink transmission. The HARQ process will continue in this manner until the combined uplink transmission is successfully decoded at the base station 12-1 or the maximum number of HARQ transmission intervals has been reached.

While FIGS. 6A, 6B, and 7-9 illustrate embodiments in which the MRN 18 autonomously moves to the target CoMP zone 20 for MRN based UL CoMP, FIGS. 10A, 10B, and 11-13 illustrate embodiments in which the MRN 18 autonomously moves to the target CoMP zone 20 for MRN based DL CoMP. In this regard, FIGS. 10A and 10B graphically illustrate the operation of the cellular communications network 10 to provide MRN based DL CoMP according to one embodiment in which the MRN 18 autonomously moves to the target CoMP zone 20. Initially, as illustrated in FIG. 10A, the MRN 18 is not located in the target CoMP zone 20. Notably, the downlink signal from the base station 12-1 to the wireless device 16-1 is denoted as $S_{11,DL}$, the downlink signal from the base station 12-1 to the MRN 18 is denoted as $S_{1e,DL}$, the downlink from the MRN 18 to the wireless device 16-1 is denoted as $S_{1R,DL}$, the downlink from the base station 12-2 to the wireless device 16-2 is denoted as $S_{22,DL}$, the interfering signal received by the wireless device 16-1 created by the downlink from the base station 12-2 to the wireless device 16-2 is denoted as $S_{21,DL}$, and the interfering signal received by the MRN 18 created by the downlink from the base station 12-2 to the wireless device 16-2 is denoted as $S'_{21,DL}$.

Thereafter, the MRN 18 autonomously moves to the target CoMP zone 20 for MRN based DL CoMP for the wireless device 16-1, as illustrated in FIG. 10B. As discussed below in detail, in one embodiment, the target CoMP zone 20 is defined based on link metrics for at least some of $S_{11,DL}$, $S_{1R,DL}$, $S_{21,DL}$, $S'_{21,DL}$, $S_{22,DL}$, and $S_{1e,DL}$. These link metrics define what is referred to herein as radio distances between the corresponding nodes in the cellular communications network 10. In one embodiment, the link metrics are SINR values or SLNR values. As one particular example, for LTE, the link metrics can be CQI values, which can be understood as SINR values. Thus, as an example, the link metric (e.g., SINR, SLNR, or CQI value) for the downlink $S_{11,DL}$ defines, or is indicative of, a radio distance between the base station 12-1 and the wireless device 16-1. Based on the appropriate link metrics, the MRN 18 can then autonomously move or can be instructed to move until the link metrics indicate that the MRN 18 is in the target CoMP zone 20.

FIGS. 11A and 11B illustrate the operation of the cellular communications network 10 of FIGS. 10A and 10B to provide MRN based DL CoMP for the wireless device 16-1 according to one embodiment in which the MRN 18 autonomously moves to the target CoMP zone 20. The embodiment of FIGS. 11A and 11B is similar to that of FIGS. 7A and 7B but for the downlink scenario rather than the uplink scenario. In this embodiment, the base station 12-1 and/or the MRN 18 obtain the link metrics for the various links by transmitting corresponding CSI-RSs and, in response, receiving corresponding CQI reports. Note that while CSI-RS and CQI reports are used in this embodiment, other techniques for obtaining the link metrics can be used (e.g., SRSs on the uplink). More specifically, in this embodiment, the base station 12-1 transmits a CSI-RS (CSI-RS 1), which is received by the MRN 18 and the wireless device 16-1 (step 700). Using CSI-RS 1, the wireless device 16-1 generates a CQI value for the link between the base station 12-1 and the wireless device 16-1 and returns the CQI value to the base station 12-1 in a corresponding CQI report (step 702).

In addition, the MRN 18 transmits a CSI-RS (CSI-RS 2), which is received by the wireless device 16-1 (step 704). Using CSI-RS 2, the wireless device 16-1 generates a CQI value for the link between the MRN 18 and the wireless device 16-1 and then returns the CQI value to the MRN 18 in a corresponding CQI report (step 706). In this embodiment, the CQI report from the wireless device 16-1 for CSI-RS 2 may also be received by the base station 12-1. However, the present disclosure is not limited thereto. Rather, in an alternative embodiment, the CQI report in step 706 is received only by the MRN 18, where the MRN 18 subsequently sends the CQI report or the CQI value from the CQI report to the base station 12-1. Like the wireless device 16-1, using CSI-RS 1, the MRN 18 generates a CQI value for the link between the MRN 18 and the base station 12-1 and then returns a corresponding CQI report to the base station 12-1 (step 708). In this embodiment, if the CQI report of step 706 is not received by the base station 12-1 directly from the wireless device 16-1, the MRN 18 includes the corresponding CQI value in the CQI report of step 708 or provides the CQI value in addition to the CQI report of step 708.

The base station 12-2 also transmits as CSI-RS (CSI-RS 3), which is received by the wireless device 16-1 and the MRN 18 (step 710). Using CSI-RS 3, the wireless device 16-1 generates a CQI value for the link between the base station 12-2 and the wireless device 16-1 and returns the CQI value to the base station 12-1 in a corresponding CQI report (step 712). Likewise, using CSI-RS 3, the MRN 18 generates a CQI value for the link between the MRN 18 and the base station 12-2 and then returns a corresponding CQI report to the base station 12-1 (step 714).

Next, using at least some of the CQI values obtained in steps 700-714, the base station 12-1 discovers the wireless device 16-1 as a wireless device for MRN based DL CoMP (step 716). In general, in step 716, the base station 12-1 discovers the wireless device 16-1 as a wireless device that will benefit from MRN based DL CoMP. In one embodiment, the base station 12-1 utilizes the following equation for discovery of the wireless device 16-1:

$$\gamma_{1,DL} = \frac{CQI_{S_{11,DL}}}{CQI_{S_{21,DL}} + I + n} < Threshold1_{DL} \quad (4)$$

where $CQI_{S_{11,DL}}$ is the CQI value for the link between the base station 12-1 and the wireless device 16-1, $CQI_{S_{21,DL}}$ is the CQI value for the link between the base station 12-2 and the wireless device 16-1, I is interference, n is noise, and $Threshold1_{DL}$ is a predefined threshold value. In one embodiment, $Threshold1_{DL}$ is network settable. The predefined threshold value ($Threshold1_{DL}$) is defined such that the wireless device 16-1 is discovered as a wireless device that will benefit from MRN based DL CoMP when $\gamma_{1,DL}$ falls below $Threshold1_{DL}$.

Once the wireless device 16-1 is discovered, the base station 12-1 identifies the base station 12-2 as a source of a dominant interferer to the downlink from the base station 12-1 to the wireless device 16-1 (step 718). While the identification of the base station 12-2 as the source of the dominant interferer can be performed using any suitable process, in one embodiment, the base station 12-1 receives reports on the signal strength at pilot symbols received from the strongest cells. Thus, the base station 12-1 is aware of the neighboring base station 12-2 with the shortest radio distance to the wireless device 16-1. In addition, the base station 12-1 can combine this information with information on scheduling decisions of the strongest neighboring base stations so as to estimate with higher accuracy the base station 12-2 as the source of the dominant interferer.

In this embodiment, the base station 12-1 also obtains geographic locations of the wireless device 16-1 and the base station 12-2 (step 720). The geographic locations of the wireless device 16-1 and the base station 12-2 can be obtained using any suitable technique. As one example, in LTE, the base station 12-1 may obtain the geographic location of the wireless device 16-1 via an OTDOA approach using PRS. The geographic location of the base station 12-2 may be predetermined and known to the cellular communications network 10. Note that step 720 is optional.

Next, based on the CQI values and/or the geographic locations of the wireless device 16-1 and the base station 12-2, the base station 12-1 determines whether the MRN 18 is in the target CoMP zone 20 for DL CoMP for the wireless device 16-1 (step 722). In this particular example, the base station 12-1 determines that the MRN 18 is not in the target CoMP zone 20. In this embodiment, the target CoMP zone 20 is defined based on the link metrics for $S_{1e,DL}$, $S_{1R,DL}$, $S_{21,DL}$, and $S'_{21,DL}$. More specifically, in one particular embodiment, the target CoMP zone 20 is defined by the following equations:

$$\gamma_{2,DL} = \frac{CQI_{S_{1e,DL}}}{CQI_{S'_{21,DL}} + I + n} > Threshold2_{DL} \quad (5)$$

$$\gamma_{3,DL} = \frac{CQI_{S_{1R,DL}}}{CQI_{S_{21,DL}} + I + n} > Threshold3_{DL} \quad (6)$$

where $CQI_{S_{1e,DL}}$ is the CQI value for the link between the base station 12-1 and the MRN 18, $CQI_{S_{21,DL}}$ is the CQI value for the link between the base station 12-2 and the MRN 18, $CQI_{S_{21',DL}}$ is the CQI value for the link between the MRN 18 and the wireless device 16-1, $CQI_{S_{21,DL}}$ is the CQI value for the link between the base station 12-2 and the wireless device 16-1, I is interference, n is noise, and $Threshold2_{DL}$ and $Threshold3_{DL}$ are predefined threshold values. In one embodiment, the predefined threshold values ($Threshold2_{DL}$ and $Threshold3_{DL}$) are network settable values. The predefined threshold values ($Threshold2_{DL}$ and $Threshold3_{DL}$) are defined such that, when Y is greater than $Threshold2_{DL}$ and $\gamma_{3,DL}$ is greater than $Threshold3_{DL}$, the MRN 18 is in the target CoMP zone 20 for MRN based DL CoMP operation for the wireless device 16-1. The base station 12-1 can thus determine where the MRN 18 is in relation to the target CoMP zone 20 based on the CQI values for the appropriate links obtained in steps 700-714 and, in some embodiments, the geographic locations of the wireless device 16-1 and the base station 12-2.

Note that, in one preferred embodiment, the predefined threshold values $Threshold1_{DL}$, $Threshold2_{DL}$, and $Threshold3_{DL}$ are network settable parameters that can be adjusted to determine the geometry of wireless devices to be selected for MRN based DL CoMP (i.e., $Threshold1_{DL}$) as well as the size of the target CoMP zone 20 (i.e., $Threshold2_{DL}$ and $Threshold3_{DL}$). When as a minimum, $\gamma_{2,DL} > Threshold2_{DL}$ and $\gamma_{3,DL} > Threshold3_{DL}$, then the MRN 18 is in a valid positioning area (i.e., the target CoMP zone 20) to support the MRN based DL CoMP for the wireless device 16-1. It should be noted that a globally optimal position of the MRN 18 can be determined by finding the position that jointly maximizes $\gamma_{2,DL}$ and $\gamma_{3,DL}$. The joint optimization can be performed by a number of well-known approaches including gradient and LMS search patterns with respect to the position of the MRN 18. When the globally optimal position is calculated, it will be a unique position or small number of unique positions relative to the base station 12-1, the wireless device 16-1, and the base station 12-2. In order to reduce the search time and complexity of the location process, Equations (5) and (6) are preferred, even though the resulting positioning can be suboptimal.

In response to determining that the MRN 18 is not in the target CoMP zone 20, the base station 12-1 sends an instruction to the MRN 18 to move toward the target CoMP zone 20 (step 724). For instance, based on the link metrics and, in some embodiments, the geographic locations of the wireless device 16-1 and the base station 12-2, the base station 12-1 may instruct the MRN 18 to move to a particular geographic location that the base station 12-1 believes to be in or closer to the target CoMP zone 20 or in a particular direction that the base station 12-1 believes to be in the direction of the target CoMP zone 20. More specifically, since the target CoMP zone 20 is defined based on the link metrics, the base station 12-1 may not be able to determine the exact location or boundaries of the target CoMP zone 20. In this case, the base station 12-1 may use any suitable search algorithm to select the location or direction in which the MRN 18 is to move in order to search the cell 14-1 for the target CoMP zone 20 based on the current link metric values and, in some embodiments, the current geographic locations of the wireless device 16-1 and the base station 12-2. The search algorithm may be, for example, a search algorithm that searches the cell 14-1 using a grid search pattern, a random search, a circular search centered on the base station 12-1, a circular search centered on the wireless device 16-1, or the like. The geographic locations of the wireless device 16-1 and the base station 12-2 may be used to reduce the search area and time needed for the search based on, for example, a pre-calculated lookup table.

In response to receiving the instruction to move, the MRN 18 moves according to the instruction (step 726). The MRN 18 moves autonomously using any suitable movement mechanism. As an example, the MRN 18 may be affixed to a device that is capable of movement (e.g., a balloon or aircraft) where the MRN 18 is able to control the movement of the device according to the instruction from the base station 12-1. In this embodiment, sometime thereafter, the base station 12-1 updates the CQI information, or values, for the appropriate links and, in some embodiments, the geographic location of the wireless device 16-1 (step 728). The CQI information can be updated using a procedure that is the same as or similar to the procedure of steps 700-714. The geographic location of the wireless device 16-1 can be updated using a process that is the same as or similar to that of step 720. The base station 12-1 then determines whether the MRN 18 is now in the target CoMP zone 20 and, if not, instructs the MRN 18 to continue to move toward the target CoMP zone 20 (step 730). The process of steps 728 and 730 continues until the base station 12-1 determines that the MRN 18 is in the target CoMP zone 20 (step 732). Once the base station 12-1 determines that the MRN 18 is in the target CoMP zone 20, the base station 12-1 then sends an instruction to the MRN 18 to enable MRN based DL CoMP for the wireless device 16-1 (step 734).

After enabling MRN based DL CoMP for the wireless device 16-1 at the MRN 18, the base station 12-1 transmits a downlink transmission to the wireless device 16-1 (step 736). The MRN 18 receives the downlink transmission from the base station 12-1 and re-transmits the downlink transmission to the wireless device 16-1 (step 738). In one embodiment, the resources used for the downlink transmission from the base station 12-1 to the MRN 18 are the same as those used for the downlink transmission from the base station 12-1 to the wireless device 16-1. In another embodiment, the resources used for the downlink transmission from the base station 12-1 to the MRN 18 are different than those used for the downlink transmission from the base station 12-1 to the wireless device 16-1. In this embodiment, the MRN 18 re-transmits the downlink transmission using the same downlink physical resources as used by the base station 12-1 in the downlink transmission in step 736. In another embodiment, the MRN 18 re-transmits the downlink transmission using different, or separate, resources where the wireless device 16-1 is enabled to combine downlink transmissions arriving at different frequency and time resources. The wireless device 16-1 then combines the downlink transmission received from the base station 12-1 in step 736 and the re-transmission of the downlink transmission received from the MRN 18 in step 738 using the desired DL CoMP combining scheme (e.g., MRC or IRC) to provide a combined downlink transmission (step 740). The wireless device 16-1 then decodes the combined downlink transmission. As described above for the uplink scenario, HARQ may be utilized for the downlink as well.

Before proceeding, it should be noted that while the base station 12-1 determines whether the MRN 18 is located in the target CoMP zone 20 and instructs the MRN 18 to move accordingly in the embodiment of FIGS. 11A and 11B, the present disclosure is not limited thereto. In one alternative embodiment, the link metrics are provided to the MRN 18, and the MRN 18 determines whether the MRN 18 is in the target CoMP zone 20. If not, the MRN 18 autonomously moves to the target CoMP zone 20 using, for example, a suitable search algorithm.

It should also be noted that while, in the example above, the wireless device 16-1 is discovered and the target CoMP zone 20 is defined based on Equations (4)-(6), the present disclosure is not limited thereto. In addition to or as an alternative to the metrics in Equations (4)-(6), other possible metrics can be employed to define the target CoMP zone 20 in order to minimize interference (e.g., SINR and/or SLNR). It should also be noted that, if the signal $S_{11,DL}$ is too weak (e.g., SINR below predefined threshold value $Threshold1_{DL}$) to constructively contribute to a CoMP type signal, the wireless device 16-1 may chose to ignore it and only decode the downlink transmission for the wireless device 16-1 received from the MRN 18.

FIG. 12 illustrates the operation of the cellular communications network 10 of FIGS. 10A and 10B to provide MRN based DL CoMP for the wireless device 16-1 according to one embodiment in which the MRN 18 moves according to a predefined movement schedule. In this embodiment, the base station 12-1 obtains link metrics for the various links only when the MRN 18 is to be located in the target CoMP zone 20 according to the predefined movement schedule for the MRN 18. The embodiment of FIG. 12 is similar to that of FIG. 8 but for the downlink scenario rather than the uplink scenario.

First, the base station 12-1 determines when the MRN 18 is to be in the target CoMP zone 20 based on the predefined schedule of movement for the MRN 18 (step 800). For example, the MRN 18 may be located on a bus that has a predefined schedule of movement. The schedule of movement of the bus can therefore be used as the predefined schedule of movement for the MRN 18. In order to determine when the MRN 18 is to be in the target CoMP zone 20, the base station 12-1 determines a geographical area that corresponds to the target CoMP zone 20. The base station 12-1 may do so using historical information. For example, the process of FIGS. 11A and 11B may have previously been performed a number of times for one or more wireless devices 16. Based on information gathered during those iterations of the process of FIGS. 11A and 11B, the base station 12-1 can determine a geographical area that is frequently a target CoMP zone for MRN based DL CoMP. This geographical area can then be used by the base station 12-1 as the target CoMP zone 20. Then, by comparing the predefined schedule of movement for the MRN 18 and the geographical area corresponding to the target CoMP zone 20, the base station 12-1 determines when the MRN 18 is to be in the target CoMP zone 20.

Next, the base station 12-1 schedules transmission of CSI-RS in a time window during which the MRN 18 is scheduled to be in the target CoMP zone 20 (step 802). The base station 12-1 then transmits a CSI-RS (CSI-RS 1) as scheduled, where CSI-RS 1 is received by the MRN 18 and the wireless device 16-1 as scheduled (step 804). Using CSI-RS 1, the wireless device 16-1 generates a CQI value for the link between the base station 12-1 and then returns the CQI value to the base station 12-1 in a corresponding CQI report (step 806). In addition, the MRN 18 transmits a CSI-RS (CSI-RS 2), which is received by the wireless device 16-1 (step 808). Using CSI-RS 2, the wireless device 16-1 generates a CQI value for the link between the MRN 18 and then returns the CQI value to the MRN 18 in a corresponding CQI report (step 810). In this embodiment, the CQI report from the wireless device 16-1 may also be received by the base station 12-1. However, the present disclosure is not limited thereto. Rather, in an alternative embodiment, the CQI report in step 810 is received only by the MRN 18, where the MRN 18 subsequently sends the CQI report or the CQI value from the CQI report to the base station 12-1. Like the wireless device 16-1, using CSI-RS 1, the MRN 18 generates a CQI value for the link between the MRN 18 and the base station 12-1 and then returns a corresponding CQI report to the base station 12-1 (step 812). In this embodiment, if the CQI report of step 810 is not received by the base station 12-1 directly from the wireless device 16-1, the MRN 18 includes the corresponding CQI value in the CQI report of step 812 or provides the CQI value in addition to the CQI report of step 812. The base station 12-2 also transmits a CSI-RS (CSI-RS 3), which is received by the wireless device 16-1 and the MRN 18 (step 814). Using CSI-RS 3, the wireless device 16-1 and the MRN 18 generate CQI values for the corresponding links and then return corresponding CQI reports to the base station 12-1 (steps 816 and 818).

Next, using at least some of the CQI values obtained in steps 804-818, the base station 12-1 discovers the wireless device 16-1 as a wireless device for MRN based DL CoMP (step 820). More specifically, in one embodiment, the base station 12-1 discovers the wireless device 16-1 based on Equation (4) above. In addition, the base station 12-1 may utilize the other link metrics (e.g., utilize Equations (5) and (6) above) as part of the discovery process to ensure discovery of a wireless device for which the target CoMP zone 20 is in fact the target CoMP zone for the wireless device.

Once the wireless device 16-1 is discovered, the base station 12-1 provides information to the MRN 18 that enables or instructs the MRN 18 to provide MRN based DL CoMP operation for the wireless device 16-1 (step 822). In one embodiment, this information includes information that specifically identifies the wireless device 16-1 and/or the downlink physical resources to be used for the downlink to the wireless device 16-1. Sometime thereafter, the base station 12-1 transmits a downlink transmission to the wireless device 16-1 (step 824). The MRN 18 receives the downlink transmission from the base station 12-1 and re-transmits the downlink transmission to the wireless device 16-1 (step 826). The wireless device 16-1 then combines the downlink transmission received from the base station 12-1 in step 824 and the re-transmission of the downlink transmission received from the MRN 18 in step 826 using the desired DL CoMP combining scheme (e.g., MRC or IRC) to provide a combined downlink transmission (step 828). The base station 12-1 then attempts to decode the combined downlink transmission. It should be noted that, as discussed above for the uplink scenario, HARQ may be utilized for the downlink.

FIG. 13 illustrates the operation of the cellular communications network 10 of FIGS. 10A and 10B to provide MRN based DL CoMP for the wireless device 16-1 according to another embodiment in which the MRN 18 moves according to a predefined movement schedule. This embodiment is similar to that of FIG. 9 but for the downlink scenario rather than the uplink scenario. In this embodiment, the base station 12-1 provides geographical information to the MRN 18 that defines the target CoMP zone 20 and then MRN based DL CoMP operation is activated at the MRN 18 when the MRN 18 is positioned in the target CoMP zone 20 according to an actual measurement of the geographic location of the MRN 18 or the predefined movement schedule of the MRN 18. As illustrated, the base station 12-1 provides information to the MRN 18 that defines the target CoMP zone 20 (step 900). In this embodiment, the information that defines the target CoMP zone 20 is geographical information (e.g., a latitude and longitude coordinate pair and a radius that defines the target CoMP zone 20 as a circular geographic area, multiple latitude and longitude pairs that define edges of a polygon that define the target CoMP zone 20 as a polygonal geographic area, or the like).

The base station 12-1 also discovers the wireless device 16-1 as a wireless device for MRN based DL CoMP using the MRN 18 when the MRN 18 is positioned in the target CoMP zone 20 (step 902). In this embodiment, the wireless device 16-1 discovered in step 902 is a wireless device that will benefit from MRN based DL CoMP when the MRN 18 is positioned in the target CoMP zone 20. In one particular embodiment, the wireless device 16-1 is a wireless device that is at a fixed location, where the fixed location is such that Equations (4), (5), and (6) above are satisfied. In another particular embodiment, the wireless device 16-1 is a mobile device that is opportunistically selected by the base station 12-1 such that Equations (4), (5), and (6) above are satisfied.

Once the wireless device 16-1 is discovered, the base station 12-1 provides information to the MRN 18 that enables or instructs the MRN 18 to provide MRN based DL CoMP operation for the wireless device 16-1 when the MRN 18 is located in the target CoMP zone 20 (step 904). In one embodiment, this information includes information that specifically identifies the wireless device 16-1 and/or the downlink physical resources to be used for the downlink from the base station 12-1 to the wireless device 16-1. Thereafter, when the MRN 18 determines that the MRN 18 is positioned in the target CoMP zone 20, the MRN 18 activates MRN based DL CoMP for the wireless device 16-1 (step 906). Depending on the particular embodiment, the MRN 18 determines that it is in the target CoMP zone 20 by, for example, determining the actual geographic location of the MRN 18 and comparing it to the geographic area defining the target CoMP zone 20 or determining when the MRN 18 is scheduled to be in the target CoMP zone 20 according to the predefined movement schedule for the MRN 18.

Note that, in an alternative embodiment, as an alternative to steps 900, 904, and 906, the base station 12-1 may use the predefined schedule of movement for the MRN 18 to determine when the MRN 18 is scheduled to be positioned in the target CoMP zone 20. Then, either prior to or when the MRN 18 is scheduled to be positioned in the target CoMP zone 20, the base station 12-1 instructs the MRN 18 to activate MRN based DL CoMP for the wireless device 16-1. This instruction may define a time window in which the MRN 18 is to keep MRN based DL CoMP activated for the wireless device 16-1 (e.g., a time window that the MRN 18 is scheduled to be in the target CoMP zone 20). Alternatively, the base station 12-1 may instruct the MRN 18 to deactivate MRN based DL CoMP at the appropriate time (i.e., at the time or shortly after the time that the MRN 18 is scheduled to leave the target CoMP zone 20).

Once MRN based DL CoMP is activated, the base station 12-1 transmits a downlink transmission to the wireless device 16-1 (step 908). The MRN 18 receives the downlink transmission from the base station 12-1 and re-transmits the downlink transmission to the wireless device 16-1 (step 910). The wireless device 16-1 then combines the downlink transmission received from the base station 12-1 in step 908 and the re-transmission of the downlink transmission received from the MRN 18 in step 910 using the desired DL CoMP combining scheme (e.g., MRC or IRC) to provide a combined downlink transmission (step 912). As discussed above for the uplink scenario, HARQ may be used for the downlink.

FIGS. 6A, 6B, 7A, 7B, 8, 9, 10A, 10B, 11A, 11B, 12, and 13 focus on embodiments of the cellular communications network 10 with a frequency reuse factor of 1 (N=1) (i.e., all frequencies in the uplink/downlink system bandwidth are used by all of the cells 14). FIGS. 14-18, 19A, 19B, 20, and 21 illustrate similar embodiments of the cellular communications network 10 but where Fractional Frequency Reuse (FFR) is used such that different FFR partitions of the system bandwidth are allocated to cell edge wireless devices 16 in neighboring cells 14. In this regard, FIG. 14 illustrates the cellular communications network 10 that provides intra-base station MRN based UL CoMP with FFR for cell edge wireless devices 16 according to one embodiment of the present disclosure. In this embodiment, the uplink system bandwidth is partitioned into multiple FFR frequency partitions, namely, a first FFR frequency partition allocated for wireless devices (such as the wireless device 16-1) located in a cell edge area 22-1 of the cell 14-1, a second FFR frequency partition allocated for wireless devices (such as the wireless device 16-2) located in a cell edge area 22-2 of the cell 14-2, a third FFR frequency partition allocated for wireless devices (such as the wireless device 16-3) located in a cell edge area 22-3 of the cell 14-3, and a fourth FFR partition allocated for a backhaul link between MRNs (such as the MRN 18) and their corresponding base stations 12. In this manner, cell edge wireless devices 16 in neighboring cells 14 utilize different uplink frequency resources. Wireless devices located in cell center areas 24 of the cells 14 can use any frequency resources in the uplink system bandwidth.

FFR partitioning mitigates interference between cell edge wireless devices 16 in neighboring cells 14. As such, the wireless device 16-1 will no longer suffer from a strong uplink interferer from the wireless device 16-2 since the wireless devices 16-1 and 16-2 use uplink resources in different FFR frequency partitions. Thus, in this embodiment, rather than mitigating the uplink interference from the wireless device 16-2 as done in some of the embodiments discussed above, the target CoMP zone 20 can be defined to mitigate other types of interference, as discussed below in detail.

During MRN based UL CoMP operation, the wireless device 16-1, which is located in the cell edge area 22-1, transmits an uplink transmission using the FFR partition (FFR Partition 1) allocated to the cell edge area 22-1. The MRN 18 receives the uplink transmission from the wireless device 16-1 and re-transmits the uplink transmission using, in this example, the FFR partition (FFR Partition 2) allocated to the cell edge area 22-2. By using a different FFR partition for the re-transmission from the MRN 18 to the base station 12-1, self-interference to the re-transmission of the uplink transmission from the MRN 18 to the base station 12-1 resulting from the uplink transmission from the wireless device 16-1 to the base station 12-1 is avoided. Further, the target CoMP zone 20 is such that the radio distance between the base station 12-1 and the MRN 18 is relatively small as compared to the radio distance between the base station 12-1 and the wireless device 16-2 in the cell edge area 22-2, which is the wireless device 16 in the cell edge area 22 to which FFR partition used by the MRN 18 (FFR Partition 2) is allocated and that uses the same uplink physical resources as the MRN 18. By doing so, the uplink interference to the uplink transmission from the MRN 18 to the base station 12-1 created by the uplink from the wireless device 16-2 to the base station 12-2 is relatively weak as compared to the strength of the uplink transmission from the MRN 18 to the base station 12-1.

FIG. 15 illustrates the operation of the cellular communications network 10 of FIG. 14 to provide MRN based UL CoMP for the wireless device 16-1 according to one embodiment in which the MRN 18 autonomously moves to the target CoMP zone 20. In this embodiment, the base station 12-1 and/or the MRN 18 obtain the link metrics for the various links by transmitting corresponding CSI-RSs and, in response, receiving corresponding CQI reports. Note that while CSI-RS and CQI reports are used in this embodiment, other techniques for obtaining the link metrics can be used (e.g., SRS on the uplink). More specifically, in this embodiment, the base station 12-1 transmits a CSI-RS (CSI-RS 1), which is received by the MRN 18, the wireless device 16-1, the wireless device 16-2 in the cell edge area 22-2 of the cell 14-2, and the wireless device 16-3 in the cell edge area 22-3 of the cell 14-3 (step 1000). Using CSI-RS 1, the wireless devices 16-1, 16-2, and 16-3 generate CQI values for the corresponding links and then return the CQI values to the base station 12-1 in corresponding CQI reports (steps 1002-1006).

In addition, the MRN 18 transmits a CSI-RS (CSI-RS 2), which is received by the wireless devices 16-1, 16-2, and 16-3 (step 1008). Using CSI-RS 2, the wireless devices 16-1, 16-2, and 16-3 generate CQI values for the corresponding links between the MRN 18 and the wireless devices 16-1, 16-2, and 16-3 and then return the CQI values to the MRN 18 in corresponding CQI reports (steps 1010-1014). In this embodiment, the CQI reports from the wireless devices 16-1, 16-2, and 16-3 may also be received by the base station 12-1. However, the present disclosure is not limited thereto. Rather, in an alternative embodiment, the CQI reports in steps 1010-1014 are received only by the MRN 18, where the MRN 18 subsequently sends the CQI reports or the CQI values from the CQI reports to the base station 12-1. Like the wireless devices 16-1, 16-2, and 16-3, using CSI-RS 1, the MRN 18 generates a CQI value for the link between the MRN 18 and the base station 12-1 and then returns a corresponding CQI report to the base station 12-1 (step 1016). In this embodiment, if the CQI reports of steps 1010-1014 are not received by the base station 12-1 directly from the wireless devices 16-1, 16-2, and 16-3, the MRN 18 includes the corresponding CQI values in the CQI report of step 1016 or provides the CQI values in addition to the CQI report of step 1016. Note that while link metrics are obtained for many different links in this example (and other examples described herein), in some embodiments, not all of the link metrics may be needed, in which case there may be no need to obtain the unused link metrics.

Next, using at least some of the CQI values obtained in steps 1000-1016, the base station 12-1 discovers the wireless device 16-1 as a wireless device for MRN based UL CoMP (step 1018). In general, in step 1018, the base station 12-1 discovers the wireless device 16-1 as a wireless device that will benefit from MRN based UL CoMP. In contrast to the embodiments discussed above where the wireless device 16-1 was discovered based on Equation (1), since uplink interference to the uplink of the wireless device 16-1 has been eliminated or substantially mitigated via FFR, discovery of the wireless device 16-1 in this embodiment is based on throughput improvement. Specifically, the wireless device 16-1 is a wireless device for which throughput would most be improved by MRN based UL CoMP. In one embodiment, the wireless device 16-1 is a wireless device having a small radio distance to the MRN 18 (e.g., a wireless device having a SINR with respect to the MRN 18 that is greater than a predefined threshold). If multiple wireless devices 16 meet this criterion, then any suitable criteria may be used to select one or more of those wireless devices 16 for MRN based UL CoMP. For example, the wireless device 16 with the lowest transmission power level is selected. In this example, the wireless device 16-1 is discovered, or selected, for MRN based UL CoMP.

In this embodiment, the base station 12-1 also obtains geographic locations of the wireless devices 16-1, 16-2, and 16-3 (step 1020). The geographic locations of the wireless devices 16-1, 16-2, and 16-3 can be obtained using any suitable technique. As one example, in LTE, the base station 12-1 may obtain the geographic locations of the wireless devices 16-1, 16-2, and 16-3 via an OTDOA approach using PRS. Note that step 1020 is optional.

Next, based on at least some of the CQI values and/or at least some of the geographic locations of the wireless devices 16-1, 16-2, and 16-3, the base station 12-1 determines whether the MRN 18 is in the target CoMP zone 20 for UL CoMP for the wireless device 16-1 (step 1022). In this particular example, the base station 12-1 determines that the MRN 18 is not in the target CoMP zone 20. In this embodiment, the target CoMP zone 20 is defined based on the link metrics for $S_{1e,UL}$ and $S_{21,UL}$. More specifically, in one particular embodiment, the target CoMP zone 20 is defined by the following equations:

$$\gamma_{2,UL} = \frac{CQI_{S_{1e,UL}}}{CQI_{S_{21,UL}} + I + n} > Threshold2_{UL} \qquad (7)$$

$$\gamma_{3,UL} = \frac{CQI_{S_{1R,UL}}}{CQI_{S_{11,UL}} + I + n} > Threshold3_{UL} \qquad (8)$$

where $CQI_{S_{1e,UL}}$ is the CQI value for the link between the MRN 18 and the base station 12-1, $CQI_{S_{21,UL}}$ is the CQI value for the link between the wireless device 16-2 and the base station 12-1 in the cell edge area 22-2 that uses the same uplink physical resources in the FFR frequency partition (FFR Partition 2) to be used by the MRN 18 for the re-transmission of the uplink transmission from the wireless device 16-1 (discussed below), $CQI_{S_{1R,UL}}$ is the CQI value for the link between the wireless device 16-1 and the MRN 18, $CQI_{S_{1R,UL}}$ is the CQI value for the link between the wireless device 16-1 and the base station 12-1, and $Threshold2_{UL}$ and $Threshold3_{UL}$ are predefined threshold values. In one embodiment, the predefined threshold values ($Threshold2_{UL}$ and $Threshold3_{UL}$) are network settable values.

Note that Equation (7) minimizes the uplink interference to the uplink from the MRN 18 to the base station 12-1 created by the uplink from the wireless device 16-2 to the base station 12-2 using the same physical resources. Equation (8) is optional and ensures that the radio distance between the MRN 18 and the base station 12-1 is less than that between the wireless device 16-1 and the base station 12-1. The predefined threshold values ($Threshold2_{UL}$ and $Threshold3_{UL}$) are defined such that, when $\gamma_{2,UL}$ is greater than $Threshold2_{UL}$ and $\gamma_{3,UL}$ is greater than $Threshold3_{UL}$, the MRN 18 is in the target CoMP zone 20. The base station 12-1 can thus determine where the MRN 18 is in relation to the target CoMP zone 20 based on the CQI values for the appropriate links obtained in steps 1000-1014 and, in some embodiments, the geographic locations of the wireless devices 16-1, 16-2, and 16-3.

It should also be noted that the CQI value(s) and/or the geographic location of the wireless device 16-3 may be used together with the CQI value(s) and/or geographic location of the wireless device 16-2 to determine which FFR partition to use for the uplink from the MRN 18 to the base station 12-1. For instance, the target CoMP zone 20 may be defined based on Equation (7) and a modified Equation (7) for the CQI value for the link between the wireless device 16-3 and the base station 12-1. The target CoMP zone 20 may then be defined such that, if Equation (7) is satisfied, then the MRN 18 is in the target CoMP zone 20 and is to use FFR Partition 2 for the uplink from the MRN 18 to the base station 12-1. Conversely, if modified Equation (7) is satisfied, then the MRN 18 is in the target CoMP zone 20 and is to use FFR partition 3 for the uplink from the MRN 18 to the base station 12-1.

From this point, the process proceeds substantially as described above with respect to FIGS. 7A and 7B. Specifically, in response to determining that the MRN 18 is not in the target CoMP zone 20, the base station 12-1 sends an instruction to the MRN 18 to move toward the target CoMP zone 20 in the manner described above (step 1024). The MRN 18 then moves according to the instruction (step 1026). In this embodiment, sometime thereafter, the base station 12-1 updates the CQI information, or values, for the appropriate links and, in some embodiments, the geographic locations of the wireless devices 16-1, 16-2, and 16-3 (step 1028). The base station 12-1 then determines whether the MRN 18 is now in the target CoMP zone 20 and, if not, instructs the MRN 18 to continue to move toward the target CoMP zone 20 (step 1030). The process of steps 1028 and 1030 continues until the base station 12-1 determines that the MRN 18 is in the target CoMP zone 20 (step 1032). In response, the base station 12-1 then sends an instruction to the MRN 18 to enable MRN based UL CoMP for the wireless device 16-1 (step 1034).

After enabling MRN based UL CoMP for the wireless device 16-1 at the MRN 18, the wireless device 16-1 transmits an uplink transmission to the base station 12-1 using an uplink physical resource in FFR Partition 1 (step 1036). The MRN 18 receives the uplink transmission from the wireless device 16-1 and re-transmits the uplink transmission to the base station 12-1 using an uplink physical resource in FFR Partition 2 (step 1038). The base station 12-1 then combines the uplink transmission received from the wireless device 16-1 in step 1036 and the re-transmission of the uplink transmission received from the MRN 18 in step 1038 using the desired UL CoMP combining scheme (e.g., MRC or IRC) to provide a combined uplink transmission (step 1040). The base station 12-1 then decodes the combined uplink transmission. As discussed above, HARQ may be utilized for the uplink transmission.

Before proceeding, it should be noted that while the base station 12-1 determines whether the MRN 18 is located in the target CoMP zone 20 and instructs the MRN 18 to move accordingly in the embodiment of FIG. 15, the present disclosure is not limited thereto. In one alternative embodiment, the link metrics are provided to the MRN 18 and the MRN 18 determines whether the MRN 18 is in the target CoMP zone 20. If not, the MRN 18 autonomously moves to the target CoMP zone 20 using, for example, a suitable search algorithm.

It should also be noted that while, in the example above, the wireless device 16-1 is discovered and the target CoMP zone 20 is defined based on Equations (1), (7), and (8), the present disclosure is not limited thereto. In addition to or as an alternative to the metrics in Equations (1), (7), and (8), other possible metrics can be employed to define the target CoMP zone 20 in order to minimize interference (e.g., SINR and/or SLNR). It should also be noted that, if the signal $S_{11,UL}$ is too weak (e.g., the SINR is below the predefined threshold value $Threshold1_{UL}$) to constructively contribute to a CoMP type signal, the base station 12-1 may chose to ignore it and only decode the uplink transmission for the wireless device 16-1 received from the MRN 18.

FIG. 16 illustrates the operation of the cellular communications network 10 of FIG. 14 to provide MRN based UL CoMP for the wireless device 16-1 according to one embodiment in which the MRN 18 moves according to a predefined movement schedule. This embodiment is similar to that of FIG. 8 but where different FFR partitions are used as discussed above with respect to FIG. 14. In this embodiment, the base station 12-1 obtains link metrics for the various links only when the MRN 18 is to be located in the target CoMP zone 20 according to the predefined movement schedule for the MRN 18. First, the base station 12-1 determines when the MRN 18 is to be in the target CoMP zone 20 based on the predefined schedule of movement for the MRN 18 (step 1100). Next, the base station 12-1 schedules transmission of CSI-RS in a time window during which the MRN 18 is scheduled to be in the target CoMP zone 20 (step 1102). The base station 12-1 then transmits a CSI-RS (CSI-RS 1), which is received by the MRN 18, the wireless device 16-1, the wireless device 16-2, and the wireless device 16-3 as scheduled (step 1104). Using CSI-RS 1, the wireless devices 16-1, 16-2, and 16-3 generate CQI values for the corresponding links and then return the CQI values to the base station 12-1 in corresponding CQI reports (steps 1106-1110).

In addition, the MRN 18 transmits a CSI-RS (CSI-RS 2), which is received by the wireless devices 16-1, 16-2, and 16-3 (step 1112). Using CSI-RS 2, the wireless devices 16-1, 16-2, and 16-3 generate CQI values for the corresponding links between the MRN 18 and the wireless devices 16-1, 16-2, and 16-3 and then return the CQI values to the MRN 18 in corresponding CQI reports (steps 1114-1118). In this embodiment, the CQI reports from the wireless devices 16-1, 16-2, and 16-3 may also be received by the base station 12-1. However, the present disclosure is not limited thereto. Rather, in an alternative embodiment, the CQI reports in steps 1114-1118 are received only by the MRN 18, where the MRN 18 subsequently sends the CQI reports or the CQI values from the CQI reports to the base station 12-1. Like the wireless devices 16-1, 16-2, and 16-3, using CSI-RS 1, the MRN 18 generates a CQI value for the link between the MRN 18 and the base station 12-1 and then returns a corresponding CQI report to the base station 12-1 (step 1120). In this embodiment, if the CQI reports of steps 1114-1118 are not received by the base station 12-1 directly from the wireless devices 16-1, 16-2, and 16-3, the MRN 18 includes the corresponding CQI values in the CQI report of step 1120 or provides the CQI values in addition to the CQI report of step 1120.

Next, using at least some of the CQI values obtained in steps 1104-1120, the base station 12-1 discovers the wireless device 16-1 as a wireless device for MRN based UL CoMP (step 1122). In general, in step 1122, the base station 12-1 discovers the wireless device 16-1 as a wireless device that will benefit from MRN based UL CoMP when the MRN 18 is located in the target CoMP zone 20. In contrast to some of the embodiments discussed above where the wireless device 16-1 was discovered based on Equation (1), since uplink interference to the uplink of the wireless device 16-1 has been eliminated or substantially mitigated via FFR, discovery of the wireless device 16-1 in this embodiment is based on throughput improvement. Specifically, the wireless device 16-1 is a wireless device for which throughput would most be improved by MRN based UL CoMP. In one embodiment, the wireless device 16-1 is a wireless device having a small radio distance to the MRN 18 (e.g., a wireless device having a SINR with respect to the MRN 18 that is greater than a predefined threshold value). If multiple wireless devices 16 meet this criterion, then any suitable criteria may be used to select one or more of those wireless devices 16 for MRN based UL CoMP.

Once the wireless device 16-1 is discovered, the base station 12-1 provides information to the MRN 18 that enables or instructs the MRN 18 to provide MRN based UL CoMP operation for the wireless device 16-1 (step 1124). In one embodiment, this information can includes information that specifically identifies the wireless device 16-1 and/or the uplink physical resources to be used by the wireless device 16-1. Sometime thereafter, the wireless device 16-1 transmits an uplink transmission to the base station 12-1 using uplink physical resources in FFR Partition 1 (step 1126). The MRN 18 receives the uplink transmission from the wireless device 16-1 and re-transmits the uplink transmission to the base station 12-1 using uplink physical resources in FFR Partition 2 (step 1128). The base station 12-1 then combines the uplink transmission received from the wireless device 16-1 in step 1126 and the re-transmission of the uplink transmission received from the MRN 18 in step 1128 using the desired UL CoMP combining scheme (e.g., MRC or IRC) to provide a combined uplink transmission (step 1130). The base station 12-1 then decodes the combined uplink transmission. As discussed above, HARQ can be utilized for the uplink.

FIG. 17 illustrates the operation of the cellular communications network 10 of FIG. 14 to provide MRN based UL CoMP for the wireless device 16-1 according to another embodiment in which the MRN 18 moves according to a predefined movement schedule. This embodiment is substantially the same as that of FIG. 9 but where FFR frequency partitions are used as discussed above with respect to FIG. 14. As illustrated, the base station 12-1 provides information to the MRN 18 that defines the target CoMP zone 20 (step 1200). In this embodiment, the information that defines the target CoMP zone 20 is geographical information (e.g., a latitude and longitude coordinate pair and a radius that defines the target CoMP zone 20 as a circular geographic area, multiple latitude and longitude pairs that define edges of a polygon that define the target CoMP zone 20 as a polygonal geographic area, or the like).

The base station 12-1 also discovers the wireless device 16-1 as a wireless device for MRN based UL CoMP using the MRN 18 when the MRN 18 is positioned in the target CoMP zone 20 (step 1202). In this embodiment, the wireless device 16-1 discovered in step 1202 is a wireless device that will benefit from MRN based UL CoMP when the MRN 18 is positioned in the target CoMP zone 20. In one particular embodiment, the wireless device 16-1 is a wireless device that is at a fixed location, where the fixed location is such that throughput for the wireless device 16-1 is improved via MRN based UL CoMP when the MRN 18 is in the target CoMP zone 20 (e.g., the radio distance between the wireless device 16-1 at the fixed location and the MRN 18 when in the target CoMP zone 20 is small). In another particular embodiment, the wireless device 16-1 is a mobile device that is opportunistically selected by the base station 12-1 such that MRN based UL CoMP via the MRN 18 when in the target CoMP zone 20 is substantially improved.

Once the wireless device 16-1 is discovered, the base station 12-1 provides information to the MRN 18 that enables or instructs the MRN 18 to provide MRN based UL CoMP operation for the wireless device 16-1 when the MRN 18 is located in the target CoMP zone 20 (step 1204). In one embodiment, this information includes information that specifically identifies the wireless device 16-1 and/or the uplink physical resources to be used by the wireless device 16-1. Thereafter, when the MRN 18 determines that the MRN 18 is positioned in the target CoMP zone 20, the MRN 18 activates MRN based UL CoMP for the wireless device 16-1 (step 1206). Depending on the particular embodiment, the MRN 18 determines that it is in the target CoMP zone 20 by, for example, determining the actual geographic location of the MRN 18 and comparing it to the geographic area defining the target CoMP zone 20 or determining when the MRN 18 is scheduled to be in the target CoMP zone 20 according to the predefined movement schedule for the MRN 18.

Note that, in an alternative embodiment, as an alternative to steps 1200, 1204, and 1206, the base station 12-1 may use the predefined schedule of movement for the MRN 18 to determine when the MRN 18 is scheduled to be positioned in the target CoMP zone 20. Then, either prior to or when the MRN 18 is scheduled to be positioned in the target CoMP zone 20, the base station 12-1 instructs the MRN 18 to activate MRN based UL CoMP for the wireless device 16-1. This instruction may define a time window in which the MRN 18 is to keep MRN based UL CoMP activated for the wireless device 16-1 (e.g., a time window that the MRN 18 is scheduled to be in the target CoMP zone 20). Alternatively, the base station 12-1 may instruct the MRN 18 to deactivate MRN based UL CoMP at the appropriate time (i.e., at the time or shortly after the time that the MRN 18 is scheduled to leave the target CoMP zone 20).

Once MRN based UL CoMP is activated, the wireless device 16-1 transmits an uplink transmission to the base station 12-1 using uplink physical resources in FFR Partition 1 (step 1208). The MRN 18 receives the uplink transmission from the wireless device 16-1 and re-transmits the uplink transmission to the base station 12-1 using uplink physical resources in FFR Partition 2 (step 1210). The base station 12-1 then combines the uplink transmission received from the wireless device 16-1 in step 1208 and the re-transmission of the uplink transmission received from the MRN 18 in step 1210 using the desired UL CoMP combining scheme (e.g., MRC or IRC) to provide a combined uplink transmission (step 1212). The base station 12-1 then decodes the combined uplink transmission. Again, HARQ for the uplink may be used.

FIG. 18 illustrates the cellular communications network 10 that provides intra-base station MRN based DL CoMP with FFR for cell edge wireless devices 16 according to one embodiment of the present disclosure. In this embodiment, the downlink system bandwidth is partitioned into multiple FFR frequency partitions, namely, a first FFR frequency partition allocated for wireless devices (such as the wireless device 16-1) located in the cell edge area 22-1 of the cell 14-1, a second FFR frequency partition allocated for wireless devices (such as the wireless device 16-2) located in the cell edge area 22-2 of the cell 14-2, a third FFR frequency partition allocated for wireless devices located in the cell edge area 22-3 of the cell 14-3, and a fourth FFR partition allocated for a backhaul link between MRNs (such as the MRN 18) and their corresponding base stations 12. In this manner, cell edge wireless devices 16 in neighboring cells 14 utilize different downlink frequency resources. Wireless devices located in the cell center areas 24 of the cells 14 can use any frequency resources in the downlink system bandwidth.

FFR partitioning for the downlink mitigates downlink interference to cell edge wireless devices 16 resulting from downlinks to cell edge wireless devices 16 in neighboring cells 14. As such, the wireless device 16-1 will no longer suffer from a strong downlink interferer from the base station 12-2 resulting from the downlink from the base station 12-2 to the wireless device 16-2. Thus, in this embodiment, rather than mitigating the downlink interference resulting from the downlink from the base station 12-2 to the wireless device 16-2 as done in some of the embodiments discussed above, the target CoMP zone 20 can be defined to mitigate other types of interference, as discussed below in detail.

During MRN based DL CoMP operation, the base station 12-1 transmits a downlink transmission to the wireless device 16-1, which is located in the cell edge area 22-1, using the FFR partition (FFR Partition 1) allocated to the cell edge area 22-1. In addition, the base station 12-1 transmits the downlink transmission to the MRN 18 using the FFR partition (FFR Partition 2) allocated to the cell edge area 22-2 that is furthest from the MRN 18 in terms of radio distance. The MRN 18 receives the downlink transmission from the base station 12-1 and re-transmits the downlink transmission using the FFR partition (FFR Partition 1) allocated to the cell edge area 22-1. By using a different FFR partition for the downlink transmission to the MRN 18, self-interference to the downlink transmission to the MRN 18 resulting from the downlink transmission from the base station 12-1 to the wireless device 16-1 is avoided. Further, the target CoMP zone 20 is such that the radio distance between the MRN 18 and the base station 12-1 is relatively small as compared to the radio distance between the base station 12-2 and the MRN 18. By doing so, downlink interference to the downlink transmission from the base station 12-1 to the MRN 18 created by a downlink transmission from the base station 12-2 to the cell edge wireless device 16-2, which in this case uses the same physical resources in the FFR partition used for the downlink to the MRN 18 (FFR Partition 2), is relatively weak as compared to the strength of the downlink transmission from the base station 12-1 to the MRN 18.

FIGS. 19A and 19B illustrate the operation of the cellular communications network 10 of FIG. 18 to provide MRN based DL CoMP for the wireless device 16-1 according to one embodiment in which the MRN 18 autonomously moves to the target CoMP zone 20. In this embodiment, the base station 12-1 and/or the MRN 18 obtain the link metrics for the various links by transmitting corresponding CSI-RSs and, in response, receiving corresponding CQI reports. Note that while CSI-RS and CQI reports are used in this embodiment, other techniques for obtaining the link metrics can be used (e.g., SRS on the uplink). More specifically, in this embodiment, the base station 12-1 transmits a CSI-RS (CSI-RS 1), which is received by the MRN 18 and the wireless device 16-1 (step 1300). Using CSI-RS 1, the wireless device 16-1 generates a CQI value for the corresponding link and then returns the CQI value to the base station 12-1 in a corresponding CQI report (step 1302).

In addition, the MRN 18 transmits a CSI-RS (CSI-RS 2), which is received by the wireless device 16-1 (step 1304). Using CSI-RS 2, the wireless device 16-1 generates a CQI value for the corresponding link between the MRN 18 and the wireless device 16-1 and then returns the CQI value to the MRN 18 in a corresponding CQI report (step 1306). In this embodiment, the CQI report from the wireless device 16-1 may also be received by the base station 12-1. However, the present disclosure is not limited thereto. Rather, in an alternative embodiment, the CQI report in step 1306 is received only by the MRN 18, where the MRN 18 subsequently sends the CQI report or the CQI value from the CQI report to the base station 12-1. Like the wireless device 16-1, using CSI-RS 1, the MRN 18 generates a CQI value for the link between the MRN 18 and the base station 12-1 and then returns a corresponding CQI report to the base station 12-1 (step 1308). In this embodiment, if the CQI report of step 1306 is not received by the base station 12-1 directly from the wireless device 16-1, the MRN 18 includes the corresponding CQI values in the CQI report of step 1308 or provides the CQI value in addition to the CQI report of step 1308.

In addition, the base station 12-2 transmits a CSI-RS (CSI-RS 3), which is received by the MRN 18 (step 1310). Using CSI-RS 3, the MRN 18 generates a CQI value for the corresponding link between the MRN 18 and then sends the CQI value to the base station 12-1 in a corresponding CQI report (step 1312). Alternatively, the MRN 18 may return the CQI report to the base station 12-2, which then sends the CQI report or the CQI value from the CQI report to the base station 12-1 via inter-base station communication. Likewise, the base station 12-3 transmits a CSI-RS (CSI-RS 4), which is received by the MRN 18 (step 1314). Using CSI-RS 4, the MRN 18 generates a CQI value for the corresponding link between the MRN 18 and then sends the CQI value to the base station 12-1 in a corresponding CQI report (step 1316). Alternatively, the MRN 18 may return the CQI report to the base station 12-3, which then sends the CQI report or the CQI value from the CQI report to the base station 12-1 via inter-base station communication. Note that while link metrics are obtained for many different links in this example (and other examples described herein), in some embodiments, not all of the link metrics may be needed, in which case there may be no need to obtain the unused link metrics.

Next, using at least some of the CQI values obtained in steps 1300-1316, the base station 12-1 discovers the wireless device 16-1 as a wireless device for MRN based DL CoMP (step 1318). In general, in step 1318, the base station 12-1 discovers the wireless device 16-1 as a wireless device that will benefit from MRN based DL CoMP. In contrast to the embodiments discussed above where the wireless device 16-1 was discovered based on Equation (4), since downlink interference to the downlink of the wireless device 16-1 has been eliminated or substantially mitigated via FFR, discovery of the wireless device 16-1 in this embodiment is based on throughput improvement. Specifically, the wireless device 16-1 is a wireless device for which throughput would most be improved by MRN based DL CoMP. In one embodiment, the wireless device 16-1 is a wireless device having a small radio distance to the MRN 18 (e.g., a wireless device having a SINR with respect to the MRN 18 that is greater than a predefined threshold value). If multiple wireless devices 16 meet this criterion, then any suitable criteria may be used to select one or more of those wireless devices 16 for MRN based DL CoMP.

In this embodiment, the base station 12-1 also obtains geographic locations of the wireless device 16-1 and the base stations 12-2 and 12-3 (step 1320). The geographic locations of the wireless device 16-1 and the base stations 12-2 and 12-3 can be obtained using any suitable technique(s). As one example, in LTE, the base station 12-1 may obtain the geographic location of the wireless device 16-1 via an OTDOA approach using PRS. The geographic locations of the base stations 12-2 and 12-3 may be predetermined and known to the cellular communications network 10. Note that step 1320 is optional.

Next, based on at least some of the CQI values and/or at least some of the geographic locations of the wireless device 16-1 and the base stations 12-2 and 12-3, the base station 12-1 determines whether the MRN 18 is in the target CoMP zone 20 for MRN base DL CoMP for the wireless device 16-1 (step 1322). In this particular example, the base station 12-1 determines that the MRN 18 is not in the target CoMP zone 20. In this embodiment, the target CoMP zone 20 is defined based on the link metrics for $S_{1e,DL}$ and $S'_{21,DL}$. More specifically, in one particular embodiment, the target CoMP zone 20 is defined by the following equations:

$$\gamma_{2,DL} = \frac{CQI_{S_{1e,DL}}}{CQI_{S'_{21,DL}} + I + n} > Threshold2_{DL} \tag{9}$$

$$\gamma_{3,DL} = \frac{CQI_{S_{1R,DL}}}{CQI_{S_{11,DL}} + I + n} > Threshold3_{DL} \tag{10}$$

where $CQI_{S_{1e,DL}}$ is the CQI value for the link between the base station 12-1 and the MRN 18, $CQI_{S'_{21,DL}}$ is the CQI value for the link between the base station 12-2 and the MRN 18, $CQI_{S_{1R,DL}}$ is the CQI value for the link between the MRN 18 and the wireless device 16-1, $CQI_{S_{11,DL}}$ is the CQI value for the link between the base station 12-1 and the wireless device 16-1, and Threshold2$_{DL}$ and Threshold3$_{DL}$ are predefined threshold values. In one embodiment, the predefined threshold values (Threshold2$_{DL}$ and Threshold3$_{DL}$) are network settable values.

Note that Equation (9) minimizes the downlink interference to the downlink from the base station 12-1 to the MRN 18 created by the downlink from the base station 12-2 to the wireless device 16-2 using the same physical resources in FFR Partition 2. Equation (10) is optional and ensures that the radio distance between the MRN 18 and the base station 12-1 is less than that between the wireless device 16-1 and the base station 12-1. The predefined threshold values (Threshold2$_{DL}$ and Threshold3$_{DL}$) are defined such that, when $\gamma_{2,DL}$ is greater than Threshold2$_{DL}$ and $\gamma_{3,DL}$ is greater than Threshold3$_{DL}$, the MRN 18 is in the target CoMP zone 20. The base station 12-1 can thus determine where the MRN 18 is in relation to the target CoMP zone 20 based on the CQI values for the appropriate links obtained in steps 1300-1316 and, in some embodiments, the geographic locations of the wireless device 16-1 and the base stations 12-2 and 12-3.

It should also be noted that the CQI value(s) and/or the geographic location of the base station 12-2 may be used together with the CQI value(s) and/or geographic location of the base station 12-2 to determine which FFR partition to use for the downlink from the base station 12-2 to the MRN 18. For instance, the target CoMP zone 20 may be defined based on Equation (9) and a modified Equation (9) for the CQI value for the link between the MRN 18 and the base station 12-3. The target CoMP zone 20 may then be defined such that, if Equation (9) is satisfied, then the MRN 18 is in the target CoMP zone 20 and the downlink from the base station 12-1 to the MRN 18 is to use FFR Partition 2. Conversely, if modified Equation (9) is satisfied, then the MRN 18 is in the target CoMP zone 20 and the downlink from the base station 12-1 to the MRN 18 is to use FFR partition 3.

From this point, the process proceeds substantially as described above with respect to FIGS. 11A and 11B. Specifically, in response to determining that the MRN 18 is not in the target CoMP zone 20, the base station 12-1 sends an instruction to the MRN 18 to move toward the target CoMP zone 20 in the manner described above (step 1324). The MRN 18 then moves according to the instruction (step 1326). In this embodiment, sometime thereafter, the base station 12-1 updates the CQI information, or values, for the appropriate links and, in some embodiments, the geographic location of the wireless device 16-1 (step 1328). The base station 12-1 then determines whether the MRN 18 is now in the target CoMP zone 20 and, if not, instructs the MRN 18 to continue to move toward the target CoMP zone 20 (step 1330). The process of steps 1328 and 1330 continues until the base station 12-1 determines that the MRN 18 is in the target CoMP zone 20 (step 1332). In response, the base station 12-1 then sends an instruction to the MRN 18 to enable MRN based DL CoMP for the wireless device 16-1 (step 1334).

After enabling MRN based DL CoMP for the wireless device 16-1 at the MRN 18, the base station 12-1 transmits a downlink transmission to the wireless device 16-1 using FFR Partition 1 (step 1336). In addition, the base station 12-1 transmits the downlink transmission for the wireless device 16-1 to the MRN 18 using FFR Partition 2 (step 1338). The MRN 18 receives the downlink transmission from the base station 12-1 and re-transmits the downlink transmission to the wireless device 16-1 using FFR Partition 1 (step 1340). The wireless device 16-1 then combines the downlink transmission received from the base station 12-1 in step 1336 and the re-transmission of the downlink transmission received from the MRN 18 in step 1340 using the desired DL CoMP combining scheme (e.g., MRC or IRC) to provide a combined downlink transmission (step 1342). The wireless device 16-1 then decodes the combined downlink transmission. As described above for the uplink scenario, HARQ may be utilized for the downlink as well.

Before proceeding, it should be noted that while the base station 12-1 determines whether the MRN 18 is located in the target CoMP zone 20 and instructs the MRN 18 to move accordingly in the embodiment of FIGS. 19A and 19B, the present disclosure is not limited thereto. In one alternative embodiment, the link metrics are provided to the MRN 18, and the MRN 18 determines whether the MRN 18 is in the target CoMP zone 20. If not, the MRN 18 autonomously moves to the target CoMP zone 20 using, for example, a suitable search algorithm.

It should also be noted that while, in the example above, the wireless device 16-1 is discovered and the target CoMP zone 20 is defined based on Equations (4), (9), and (10), the present disclosure is not limited thereto. In addition to or as an alternative to the metrics in Equations (4), (9), and (10), other possible metrics can be employed to define the target CoMP zone 20 in order to minimize interference (e.g., SINR and/or SLNR). It should also be noted that, if the signal $S_{11,DL}$ is too weak (e.g., the SINR is below the predefined threshold value $Threshold1_{DL}$ to constructively contribute to a CoMP type signal, the wireless device 16-1 may chose to ignore it and only decode the downlink transmission for the wireless device 16-1 received from the MRN 18.

FIG. 20 illustrates the operation of the cellular communications network 10 of FIG. 18 to provide MRN based DL CoMP for the wireless device 16-1 according to one embodiment in which the MRN 18 moves according to a predefined movement schedule. This embodiment is similar to that of FIG. 12 but where different FFR partitions are used as discussed above with respect to FIG. 18. In this embodiment, the base station 12-1 obtains link metrics for the various links only when the MRN 18 is to be located in the target CoMP zone 20 according to the predefined movement schedule for the MRN 18. First, the base station 12-1 determines when the MRN 18 is to be in the target CoMP zone 20 based on the predefined schedule of movement for the MRN 18 (step 1400). Next, the base station 12-1 schedules transmission of CSI-RS in a time window during which the MRN 18 is scheduled to be in the target CoMP zone 20 (step 1402). The base station 12-1 then transmits a CSI-RS (CSI-RS 1) as scheduled, which is received by the MRN 18 and the wireless device 16-1 (step 1404). Using CSI-RS 1, the wireless device 16-1 generates a CQI value for the corresponding link and then returns the CQI value to the base station 12-1 in a corresponding CQI report (step 1406).

In addition, the MRN 18 transmits a CSI-RS (CSI-RS 2), which is received by the wireless device 16-1 (step 1408). Using CSI-RS 2, the wireless device 16-1 generates a CQI value for the corresponding link between the MRN 18 and the wireless device 16-1 and then returns the CQI value to the MRN 18 in a corresponding CQI report (step 1410). In this embodiment, the CQI report from the wireless device 16-1 may also be received by the base station 12-1. However, the present disclosure is not limited thereto. Rather, in an alternative embodiment, the CQI report in step 1410 is received only by the MRN 18, where the MRN 18 subsequently sends the CQI report or the CQI value from the CQI report to the base station 12-1. Like the wireless device 16-1, using CSI-RS 1, the MRN 18 generates a CQI value for the link between the MRN 18 and the base station 12-1 and then returns a corresponding CQI report to the base station 12-1 (step 1412). In this embodiment, if the CQI report of step 1410 is not received by the base station 12-1 directly from the wireless device 16-1, the MRN 18 includes the corresponding CQI values in the CQI report of step 1412 or provides the CQI value in addition to the CQI report of step 1412.

In addition, the base station 12-2 transmits a CSI-RS (CSI-RS 3), which is received by the MRN 18 (step 1414). Using CSI-RS 3, the MRN 18 generates a CQI value for the corresponding link between the MRN 18 and then sends the CQI value to the base station 12-1 in a corresponding CQI report (step 1416). Alternatively, the MRN 18 may return the CQI report to the base station 12-2, which then sends the CQI report or the CQI value from the CQI report to the base station 12-1 via inter-base station communication. Likewise, the base station 12-3 transmits a CSI-RS (CSI-RS 4), which is received by the MRN 18 (step 1418). Using CSI-RS 4, the MRN 18 generates a CQI value for the corresponding link between the MRN 18 and then sends the CQI value to the base station 12-1 in a corresponding CQI report (step 1420). Alternatively, the MRN 18 may return the CQI report to the base station 12-3, which then sends the CQI report or the CQI value from the CQI report to the base station 12-1 via inter-base station communication. Note that while link metrics are obtained for many different links in this example (and other examples described herein), in some embodiments, not all of the link metrics may be needed, in which case there may be no need to obtain the unused link metrics.

Next, using at least some of the CQI values obtained in steps 1404-1420, the base station 12-1 discovers the wireless device 16-1 as a wireless device for MRN based DL CoMP (step 1422). In general, in step 1422, the base station 12-1 discovers the wireless device 16-1 as a wireless device that will benefit from MRN based DL CoMP when the MRN 18 is located in the target CoMP zone 20. In contrast to some of the embodiments discussed above where the wireless device 16-1 was discovered based on Equation (4), since downlink interference to the downlink of the wireless device 16-1 has been eliminated or substantially mitigated via FFR, discovery of the wireless device 16-1 in this embodiment is based on throughput improvement. Specifically, the wireless device 16-1 is a wireless device for which throughput would most be improved by MRN based DL CoMP. In one embodiment, the wireless device 16-1 is a wireless device having a small radio distance to the MRN 18 (e.g., a wireless device having a SINR with respect to the MRN 18 that is greater than a predefined threshold value). If multiple wireless devices 16 meet this criterion, then any suitable criteria may be used to select one or more of those wireless devices 16 for MRN based DL CoMP.

Once the wireless device 16-1 is discovered, the base station 12-1 provides information to the MRN 18 that enables or instructs the MRN 18 to provide MRN based DL CoMP operation for the wireless device 16-1 (step 1424). In one embodiment, this information can include information that specifically identifies the wireless device 16-1 and/or the downlink physical resources to be used by the wireless device 16-1. Sometime thereafter, the base station 12-1 transmits a downlink transmission to the wireless device 16-1 using FFR Partition 1 (step 1426). In addition, the base station 12-1 transmits the downlink transmission for the wireless device 16-1 to the MRN 18 using FFR Partition 2 (step 1428). The MRN 18 receives the downlink transmission from the base station 12-1 and re-transmits the downlink transmission to the wireless device 16-1 using FFR Partition 1 (step 1430). The base station 12-1 then combines the downlink transmission received from the base station 12-1 in step 1426 and the re-transmission of the downlink transmission received from the MRN 18 in step 1430 using the desired DL CoMP combining scheme (e.g., MRC or IRC) to provide a combined downlink transmission (step 1432). The wireless device 16-1 then decodes the combined downlink transmission. As described above for the uplink scenario, HARQ may be utilized for the downlink as well.

FIG. 21 illustrates the operation of the cellular communications network 10 of FIG. 18 to provide MRN based DL CoMP for the wireless device 16-1 according to another embodiment in which the MRN 18 moves according to a predefined movement schedule. This embodiment is substantially the same as that of FIG. 13 but where FFR frequency partitions are used as discussed above with respect to FIG. 18. As illustrated, the base station 12-1 provides information to the MRN 18 that defines the target CoMP zone 20 (step 1500). In this embodiment, the information that defines the target CoMP zone 20 is geographical information (e.g., a latitude and longitude coordinate pair and a radius that defines the target CoMP zone 20 as a circular geographic area, multiple latitude and longitude pairs that define edges of a polygon that define the target CoMP zone 20 as a polygonal geographic area, or the like).

The base station 12-1 also discovers the wireless device 16-1 as a wireless device for MRN based DL CoMP using the MRN 18 when the MRN 18 is positioned in the target CoMP zone 20 (step 1502). In this embodiment, the wireless device 16-1 discovered in step 1502 is a wireless device that will benefit from MRN based DL CoMP when the MRN 18 is positioned in the target CoMP zone 20. In one particular embodiment, the wireless device 16-1 is a wireless device that is at a fixed location, where the fixed location is such that throughput for the wireless device 16-1 is improved via MRN based DL CoMP when the MRN 18 is in the target CoMP zone 20 (e.g., the radio distance between the wireless device 16-1 at the fixed location and the MRN 18 when in the target CoMP zone 20 is small). In another particular embodiment, the wireless device 16-1 is a mobile device that is opportunistically selected by the base station 12-1 such that MRN based DL CoMP via the MRN 18 when in the target CoMP zone 20 is substantially improved.

Once the wireless device 16-1 is discovered, the base station 12-1 provides information to the MRN 18 that enables or instructs the MRN 18 to provide MRN based DL CoMP operation for the wireless device 16-1 when the MRN 18 is located in the target CoMP zone 20 (step 1504). In one embodiment, this information includes information that specifically identifies the wireless device 16-1 and/or the downlink physical resources to be used by the wireless device 16-1. Thereafter, when the MRN 18 determines that the MRN 18 is positioned in the target CoMP zone 20, the MRN 18 activates MRN based DL CoMP for the wireless device 16-1 (step 1506). Depending on the particular embodiment, the MRN 18 determines that it is in the target CoMP zone 20 by, for example, determining the actual geographic location of the MRN 18 and comparing it to the geographic area defining the target CoMP zone 20 or determining when the MRN 18 is scheduled to be in the target CoMP zone 20 according to the predefined movement schedule for the MRN 18.

Note that, in an alternative embodiment, as an alternative to steps 1500, 1504, and 1506, the base station 12-1 may use the predefined schedule of movement for the MRN 18 to determine when the MRN 18 is scheduled to be positioned in the target CoMP zone 20. Then, either prior to or when the MRN 18 is scheduled to be positioned in the target CoMP zone 20, the base station 12-1 instructs the MRN 18 to activate MRN based DL CoMP for the wireless device 16-1. This instruction may define a time window in which the MRN 18 is to keep MRN based DL CoMP activated for the wireless device 16-1 (e.g., a time window that the MRN 18 is scheduled to be in the target CoMP zone 20). Alternatively, the base station 12-1 may instruct the MRN 18 to deactivate MRN based DL CoMP at the appropriate time (i.e., at the time or shortly after the time that the MRN 18 is scheduled to leave the target CoMP zone 20).

Once MRN based DL CoMP is activated, the base station 12-1 transmits a downlink transmission to the wireless device 16-1 using FFR Partition 1 (step 1508). In addition, the base station 12-1 transmits the downlink transmission for the wireless device 16-1 to the MRN 18 using FFR Partition 2 (step 1510). The MRN 18 receives the downlink transmission from the base station 12-1 and re-transmits the downlink transmission to the wireless device 16-1 using FFR Partition 1 (step 1512). The base station 12-1 then combines the downlink transmission received from the base station 12-1 in step 1508 and the re-transmission of the downlink transmission received from the MRN 18 in step

1512 using the desired DL CoMP combining scheme (e.g., MRC or IRC) to provide a combined downlink transmission (step 1514). The wireless device 16-1 then decodes the combined downlink transmission. As described above for the uplink scenario, HARQ may be utilized for the downlink as well.

Thus far, the embodiments described herein have focused on intra-base station MRN based CoMP. FIGS. 22, 23A, 23B, 24-26, 27A, 27B, 28, and 29 illustrate various embodiments of the cellular communications network 10 that provide inter-base station MRN based CoMP. In this regard, FIG. 22 illustrates an embodiment of the cellular communications network 10 that provides inter-base station MRN based UL CoMP. In general, in this example, a coordinating set for UL CoMP for the wireless device 16-1 includes the base stations 12-2 and 12-3 in addition to the MRN 18. In this embodiment, the wireless device 16-1 transmits an uplink transmission. As with the embodiment of FIGS. 6A and 6B, the MRN 18 receives an uplink transmission from the wireless device 16-1 and re-transmits the uplink transmission to the base station 12-1. In this embodiment, the base stations 12-2 and 12-3 are also members of the UL CoMP coordinating set and, as such, the base stations 12-2 and 12-3 receive the uplink transmission from the wireless device 16-1 and re-transmit the uplink transmission to the base station 12-1 via inter-base station communication (e.g., X2 communication for LTE). The base station 12-1 combines the uplink transmission from the wireless device 16-1, the uplink transmission from the MRN 18, and the uplink transmissions from the base stations 12-2 and 12-3 received via inter-base station communication according to a desired UL CoMP combining scheme to thereby provide a combined uplink transmission.

In this embodiment, the target CoMP zone 20 is defined such that, when the MRN 18 is in the target CoMP zone 20: (1) the uplink transmission from the wireless device 16-1 to the MRN 18 is relatively strong as compared to a dominant uplink interferer at the MRN 18 resulting from an uplink transmission from a wireless device 16 (if any) in a neighboring cell 14 using the same uplink physical resources, (2) the uplink transmission from the MRN 18 to the base station 12-1 is relatively strong as compared to the dominant uplink interferer as seen at the base station 12-1, and (3) interference at the base stations 12-2 and 12-3 resulting from the uplink transmission from the MRN 18 is mitigated.

FIGS. 23A and 23B illustrate the operation of the cellular communications network 10 of FIG. 22 to provide inter-base station MRN based UL CoMP for the wireless device 16-1 according to one embodiment in which the MRN 18 autonomously moves to the target CoMP zone 20. In this embodiment, the base station 12-1 and/or the MRN 18 obtain the link metrics for the various links by transmitting corresponding CSI-RSs and, in response, receiving corresponding CQI reports. Note that while CSI-RS and CQI reports are used in this embodiment, other techniques for obtaining the link metrics can be used (e.g., SRS on the uplink). More specifically, in this embodiment, the base station 12-1 transmits a CSI-RS (CSI-RS 1), which is received by the MRN 18, the wireless device 16-1, and a wireless device 16-X (step 1600). The wireless device 16-X is a wireless device in a neighboring cell 14 of the base station 12-1 that is a source of a dominant uplink interferer for the uplink from the wireless device 16-1. Note that wireless devices 16 in the cells 14-2 and 14-3 are not the source of the dominant uplink interferer since the base stations 12-2 and 12-3 are in the UL CoMP coordinating set.

Using CSI-RS 1, the wireless devices 16-1 and 16-X generate CQI values for the corresponding links and then return the CQI values to the base station 12-1 in corresponding CQI reports (steps 1602 and 1604). In addition, the MRN 18 transmits a CSI-RS (CSI-RS 2), which is received by the wireless devices 16-1 and 16-X (step 1606). Using CSI-RS 2, the wireless devices 16-1 and 16-X generate CQI values for the corresponding links between the MRN 18 and the wireless devices 16-1 and 16-X and then return the CQI values to the MRN 18 in corresponding CQI reports (steps 1608 and 1610). In this embodiment, the CQI reports from the wireless devices 16-1 and 16-X may also be received by the base station 12-1. However, the present disclosure is not limited thereto. Rather, in an alternative embodiment, the CQI reports in steps 1608 and 1610 are received only by the MRN 18, where the MRN 18 subsequently sends the CQI reports or the CQI values from the CQI reports to the base station 12-1. Like the wireless devices 16-1 and 16-X, using CSI-RS 1, the MRN 18 generates a CQI value for the link between the MRN 18 and the base station 12-1 and then returns a corresponding CQI report to the base station 12-1 (step 1612). In this embodiment, if the CQI reports of steps 1608 and 1610 are not received by the base station 12-1 directly from the wireless devices 16-1 and 16-X, the MRN 18 includes the corresponding CQI values in the CQI report of step 1612 or provides the CQI values in addition to the CQI report of step 1612.

In addition, the base station 12-2 serving the cell 14-2, which is part of the UL CoMP coordinating set, transmits a CSI-RS (CSI-RS 3), which is received by the wireless device 16-1 and the MRN 18 (step 1614). Using CSI-RS 3, the wireless device 16-1 and the MRN 18 generate CQI values for the corresponding links to the base station 12-2 and then send the CQI values to the base station 12-1 in corresponding CQI reports (steps 1616 and 1618). Alternatively, the CQI reports may be returned to the base station 12-2, and the base station 12-2 sends the CQI reports or the CQI values from the CQI reports to the base station 12-1 via inter-base station communication. Likewise, the base station 12-3 serving the cell 14-3, which is part of the UL CoMP coordinating set, transmits a CSI-RS (CSI-RS 4), which is received by the wireless device 16-1 and the MRN 18 (step 1620). Using CSI-RS 4, the wireless device 16-1 and the MRN 18 generate CQI values for the corresponding links to the base station 12-3 and then send the CQI values to the base station 12-1 in corresponding CQI reports (steps 1622 and 1624). Alternatively, the CQI reports may be returned to the base station 12-3, and the base station 12-3 sends the CQI reports or the CQI values from the CQI reports to the base station 12-1 via inter-base station communication.

Next, using at least some of the CQI values obtained in steps 1600-1624, the base station 12-1 discovers the wireless device 16-1 as a wireless device for MRN based UL CoMP (step 1626). In general, in step 1626, the base station 12-1 discovers the wireless device 16-1 as a wireless device that will benefit from MRN based UL CoMP. In one embodiment, the base station 12-1 utilizes Equation (1) above for discovery of the wireless device 16-1. Once the wireless device 16-1 is discovered, the base station 12-1 identifies the wireless device 16-X as a source of a dominant interferer to the uplink from the wireless device 16-1 to the base station 12-1 in the manner described above (step 1628). In this embodiment, the base station 12-1 also obtains geographic locations of the wireless devices 16-1 and 16-X and the base stations 12-2 and 12-3 (step 1630). The geographic locations of the wireless devices 16-1 and 16-X can be obtained using any suitable technique such as, for example, an OTDOA approach using PRS. Note that step 1630 is optional.

Next, based on at least some of the CQI values and/or at least some of the geographic locations of the wireless devices 16-1 and 16-X and the base stations 12-2 and 12-3, the base station 12-1 determines whether the MRN 18 is in the target CoMP zone 20 for UL CoMP for the wireless device 16-1 (step 1632). In this particular example, the base station 12-1 determines that the MRN 18 is not in the target CoMP zone 20. In this embodiment, the target CoMP zone 20 is defined based on the link metrics for $S_{1e,UL}$, $S_{1R,UL}$, $S_{X1,UL}$ (interfering signal from the wireless device 16-X to the base station 12-1), $S'_{X1,UL}$ (interfering signal from the wireless device 16-X to the MRN 18), $S_{12,UL}$ (uplink signal from the wireless device 16-1 to the base station 12-2), $S_{13,UL}$ (uplink signal from the wireless device 16-1 to the base station 12-3), $S_{2e,UL}$ (self-interfering signal from the MRN 18 to the base station 12-2), and $S_{3e,UL}$ (self-interfering signal from the MRN 18 to the base station 12-3).

In general, the target CoMP zone 20 is defined based on the link metrics such that: (1) the radio distance between the source of the dominant uplink interferer, i.e., the wireless device 16-X, and the base station 12-1 is relatively large as compared to the radio distance between the MRN 18 and the base station 12-1, (2) the radio distance between the source of the dominant uplink interferer, i.e., the wireless device 16-X, and the MRN 18 is relatively large as compared to the radio distance between the wireless device 16-1 and the MRN 18, (3) and the radio distances between the base stations 12-2 and 12-3 in the UL CoMP coordinating set and the MRN 18 are relatively large as compared to the radio distances between the base stations 12-2 and 12-3 and the wireless device 16-1. In other words, the target CoMP zone 20 is defined based on the link metrics such that: (1) the dominant uplink interferer seen at the base station 12-1 is relatively weak as compared to the uplink signal from the MRN 18, (2) the dominant uplink interferer seen at the MRN 18 is relatively weak as compared to the uplink signal from the wireless device 16-1, and (3) the self-interference seen at the base stations 12-2 and 12-3 resulting from the uplink signal from the MRN 18 is relatively weak as compared to the uplink signal from the wireless device 16-1.

More specifically, in one particular embodiment, the target CoMP zone 20 is defined by the following equations:

$$\gamma_{2,UL} = \frac{CQI_{S_{1e,UL}}}{CQI_{S_{X1,UL}} + I + n} > Threshold2_{UL} \tag{11}$$

$$\gamma_{3,UL} = \frac{CQI_{S_{1R,UL}}}{CQI_{S'_{X1,UL}} + I + n} > Threshold3_{UL} \tag{12}$$

$$\gamma_{4,UL} = \frac{CQI_{S_{12,UL}}}{CQI_{S_{2e,UL}} + I + n} > Threshold4_{UL} \tag{13}$$

$$\gamma_{5,UL} = \frac{CQI_{S_{13,UL}}}{CQI_{S_{3e,UL}} + I + n} > Threshold5_{UL} \tag{14}$$

where $CQI_{S_{1e,UL}}$ is the CQI value for the link between the MRN 18 and the base station 12-1, $CQI_{S_{X1,UL}}$ is the CQI value for the link between the wireless device 16-X and the base station 12-1, $CQI_{S_{1R,UL}}$ is the CQI value for the link between the wireless device 16-1 and the MRN 18, $CQI_{S'_{X1,UL}}$ is the CQI value for the link between the wireless device 16-X and the MRN 18, $CQI_{S'_{12,UL}}$ is the CQI value for the link between the wireless device 16-1 and the base station 12-2, $CQI_{S_{2e,UL}}$ is the CQI value for the link between the MRN 18 and the base station 12-2, $CQI_{S_{13,UL}}$ is the CQI value for the link between the wireless device 16-1 and the base station 12-3, $CQI_{S_{3e,UL}}$ is the CQI value for the link between the MRN 18 and the base station 12-3, I is interference, n is noise, and $Threshold2_{UL}$, $Threshold3_{UL}$, $Threshold4_{UL}$, and $Threshold5_{UL}$ are predefined threshold values. In one embodiment, the predefined threshold values ($Threshold2_{UL}$, $Threshold3_{UL}$, $Threshold4_{UL}$, and $Threshold5_{UL}$) are network settable values. The predefined threshold values ($Threshold2_{UL}$, $Threshold3_{UL}$, $Threshold4_{UL}$, and $Threshold5_{UL}$) are defined such that, when $\gamma_{2,UL}$ is greater than $Threshold2_{UL}$, $\gamma_{3,UL}$ is greater than $Threshold3_{UL}$, is greater than $Threshold4_{UL}$, and $\gamma_{5,UL}$ is greater than $Threshold5_{UL}$, the MRN 18 is in the target CoMP zone 20. The base station 12-1 can thus determine where the MRN 18 is in relation to the target CoMP zone 20 based on the CQI values for the appropriate links obtained in steps 1600-1624 and, in some embodiments, the geographic locations of the wireless devices 16-1 and 16-X and the base stations 12-2 and 12-3.

From this point, the process proceeds in much the same manner as that in embodiment of FIGS. 7A and 7B. In response to determining that the MRN 18 is not in the target CoMP zone 20, the base station 12-1 sends an instruction to the MRN 18 to move toward the target CoMP zone 20 (step 1634). In response to receiving the instruction to move, the MRN 18 moves according to the instruction (step 1636). In this embodiment, sometime thereafter, the base station 12-1 updates the CQI information, or values, for the appropriate links and, in some embodiments, the geographic locations of the wireless devices 16-1 and 16-X (step 1638). The base station 12-1 then determines whether the MRN 18 is now in the target CoMP zone 20 and, if not, instructs the MRN 18 to continue to move toward the target CoMP zone 20 (step 1640). The process of steps 1638 and 1640 continues until the base station 12-1 determines that the MRN 18 is in the target CoMP zone 20 (step 1642). In response, the base station 12-1 then sends an instruction to the MRN 18 to enable MRN based UL CoMP for the wireless device 16-1 (step 1644).

After enabling MRN based UL CoMP for the wireless device 16-1 at the MRN 18, the wireless device 16-1 transmits an uplink transmission to the base station 12-1 (step 1646). The MRN 18 receives the uplink transmission from the wireless device 16-1 and re-transmits the uplink transmission to the base station 12-1 (step 1648). In addition, in this embodiment, the base stations 12-2 and 12-3 receive the uplink transmission from the wireless device 16-1 and re-transmit the uplink transmission to the base station 12-1 via inter-base station, e.g., X2, communication (steps 1650 and 1652). The base station 12-1 then combines the uplink transmission received from the wireless device 16-1 in step 1646, the re-transmission of the uplink transmission received from the MRN 18 in step 1648, and the uplink transmissions received from the base stations 12-2 and 12-3 in steps 1650 and 1652 using the desired UL CoMP combining scheme (e.g., MRC or IRC) to provide a combined uplink transmission (step 1654). The base station 12-1 then decodes the combined uplink transmission. HARQ may be utilized for the uplink.

Note that, in one particular embodiment, the base station 12-1 first combines the uplink transmission received from the wireless device 16-1 in step 1646 and the re-transmission of the uplink transmission received from the MRN 18 in step 1648. If the base station 12-1 is then able to successfully decode the resulting combined uplink transmission, the base station 12-1 does not need the uplink transmissions from the base stations 12-2 and 12-3 and, therefore, can ignore those uplink transmissions. This reduces processing requirements for UL CoMP combining as well as eliminates latency issues resulting from inter-base station communication. In addition, the base station 12-1 may cause the base stations 12-2 and 12-3 to not send the uplink transmission when the uplink transmissions from the base stations 12-2 and 12-3 are not needed for successful decoding, which in turn reduces bandwidth requirements for inter-base station communication.

It should be noted that while the base station 12-1 determines whether the MRN 18 is located in the target CoMP zone 20 and instructs the MRN 18 to move accordingly in the embodiment of FIGS. 23A and 23B, the present disclosure is not limited thereto. In one alternative embodiment, the link metrics are provided to the MRN 18, and the MRN 18 determines whether the MRN 18 is in the target CoMP zone 20. If not, the MRN 18 autonomously moves to the target CoMP zone 20 using, for example, a suitable search algorithm.

It should also be noted that while, in the example above, the wireless device 16-1 is discovered and the target CoMP zone 20 is defined based on Equations (1) and (11)-(14), the present disclosure is not limited thereto. In addition to or as an alternative to the metrics in Equations (1) and (11)-(14), other possible metrics can be employed to define the target CoMP zone 20 in order to minimize interference (e.g., SINR and/or SLNR). It should also be noted that, if the signal $S_{11,UL}$ is too weak (e.g., the SINR is below predefined threshold value $Threshold1_{UL}$) to constructively contribute to a CoMP type signal, the base station 12-1 may chose to ignore it and only decode the uplink transmission for the wireless device 16-1 received from the MRN 18.

FIG. 24 illustrates the operation of the cellular communications network 10 of FIG. 22 to provide inter-base station MRN based UL CoMP for the wireless device 16-1 according to one embodiment in which the MRN 18 moves according to a predefined movement schedule. In this embodiment, the base station 12-1 obtains link metrics for the various links only when the MRN 18 is to be located in the target CoMP zone 20 according to the predefined movement schedule for the MRN 18. First, the base station 12-1 determines when the MRN 18 is to be in the target CoMP zone 20 based on the predefined schedule of movement for the MRN 18 (step 1700). For example, the MRN 18 may be located on a bus that has a predefined schedule of movement. The schedule of movement of the bus can therefore be used as the predefined schedule of movement for the MRN 18. Further, using historical information, the base station 12-1 determines a geographical area that corresponds to the target CoMP zone 20. For example, the process of FIGS. 23A and 23B may have previously been performed a number of times for one or more wireless devices 16. Based on information gathered during those iterations of the process of FIGS. 23A and 23B, the base station 12-1 can determine a geographical area that is frequently a target CoMP zone for MRN based UL CoMP. This geographical area can then be used by the base station 12-1 as the target CoMP zone 20. Then, by comparing the predefined schedule of movement for the MRN 18 and the geographical area corresponding to the target CoMP zone 20, the base station 12-1 determines when the MRN 18 is to be in the target CoMP zone 20.

Next, the base station 12-1 schedules transmission of CSI-RS in a time window during which the MRN 18 is scheduled to be in the target CoMP zone 20 (step 1702). The base station 12-1 then transmits a CSI-RS (CSI-RS 1) as scheduled, where CSI-RS 1 is received by the MRN 18, the wireless device 16-1, and the wireless device 16-X (step 1704). Again, the wireless device 16-X is the source of the dominant uplink interferer for the uplink from the wireless device 16-1 and is not a wireless device 16 in the cells 14-2 and 14-3 served by the base stations 12-2 and 12-3 which are members of the UL CoMP coordinated set. Using CSI-RS 1, the wireless devices 16-1 and 16-X generate CQI values for the corresponding links and then return the CQI values to the base station 12-1 in corresponding CQI reports (steps 1706 and 1708).

In addition, the MRN 18 transmits a CSI-RS (CSI-RS 2), which is received by the wireless devices 16-1 and 16-X (step 1710). Using CSI-RS 2, the wireless devices 16-1 and 16-X generate CQI values for the corresponding links between the MRN 18 and the wireless devices 16-1 and 16-X and then return the CQI values to the MRN 18 in corresponding CQI reports (steps 1712 and 1714). In this embodiment, the CQI reports from the wireless devices 16-1 and 16-X may also be received by the base station 12-1. However, the present disclosure is not limited thereto. Rather, in an alternative embodiment, the CQI reports in steps 1712 and 1714 are received only by the MRN 18, where the MRN 18 subsequently sends the CQI reports or the CQI values from the CQI reports to the base station 12-1. Like the wireless devices 16-1 and 16-X, using CSI-RS 1, the MRN 18 generates a CQI value for the link between the MRN 18 and the base station 12-1 and then returns a corresponding CQI report to the base station 12-1 (step 1716). In this embodiment, if the CQI reports of steps 1712 and 1714 are not received by the base station 12-1 directly from the wireless devices 16-1 and 16-X, the MRN 18 includes the corresponding CQI values in the CQI report of step 1716 or provides the CQI values in addition to the CQI report of step 1716.

In addition, the base station 12-2, which is part of the UL CoMP coordinating set, transmits a CSI-RS (CSI-RS 3), which is received by the wireless device 16-1 and the MRN 18 (step 1718). Using CSI-RS 3, the wireless device 16-1 and the MRN 18 generate CQI values for the corresponding links to the base station 12-2 and then send the CQI values to the base station 12-1 in corresponding CQI reports (steps 1720 and 1722). Alternatively, the CQI reports may be returned to the base station 12-2, where the base station 12-2 sends the CQI reports or the CQI values from the CQI reports to the base station 12-1 via inter-base station communication. Likewise, the base station 12-3, which is part of the UL CoMP coordinating set, transmits a CSI-RS (CSI-RS 4), which is received by the wireless device 16-1 and the MRN 18 (step 1724). Using CSI-RS 4, the wireless device 16-1 and the MRN 18 generate CQI values for the corresponding links to the base station 12-3 and then send the CQI values to the base station 12-1 in corresponding CQI reports (steps 1726 and 1728). Alternatively, the CQI reports may be returned to the base station 12-3, where the base station 12-3 sends the CQI reports or the CQI values from the CQI reports to the base station 12-1 via inter-base station communication.

Next, using at least some of the CQI values obtained in steps 1704-1728, the base station 12-1 discovers the wireless device 16-1 as a wireless device for MRN based UL CoMP (step 1730). More specifically, in one embodiment, the base station 12-1 discovers the wireless device 16-1 based on Equation (1) above. In addition, the base station 12-1 may utilize the other link metrics (e.g., utilize Equations (11)-(14) above) as part of the discovery process to ensure discovery of a wireless device for which the target CoMP zone 20 is in fact the target CoMP zone for the wireless device.

Once the wireless device 16-1 is discovered, the base station 12-1 provides information to the MRN 18 that enables or instructs the MRN 18 to provide MRN based UL CoMP operation for the wireless device 16-1 (step 1732). In one embodiment, this information can includes information that specifically identifies the wireless device 16-1 and/or the uplink physical resources to be used by the wireless device 16-1. Sometime thereafter, the wireless device 16-1 transmits an uplink transmission to the base station 12-1 (step 1734). The MRN 18 receives the uplink transmission from the wireless device 16-1 and re-transmits the uplink transmission to the base station 12-1 (step 1736). In addition, in this embodiment, the base stations 12-2 and 12-3 receive the uplink transmission from the wireless device 16-1 and re-transmit the uplink transmission to the base station 12-1 via inter-base station, e.g., X2, communication (steps 1738 and 1740). The base station 12-1 then combines the uplink transmission received from the wireless device 16-1 in step 1734, the re-transmission of the uplink transmission received from the MRN 18 in step 1736, and the uplink transmissions received from the base stations 12-2 and 12-3 in steps 1738 and 1740 using the desired UL CoMP combining scheme (e.g., MRC or IRC) to provide a combined uplink transmission (step 1742). The base station 12-1 then decodes the combined uplink transmission. HARQ may be used for the uplink.

Note that, in one particular embodiment, the base station 12-1 first combines the uplink transmission received from the wireless device 16-1 in step 1734 and the re-transmission of the uplink transmission received from the MRN 18 in step 1736. If the base station 12-1 is then able to successfully decode the resulting combined uplink transmission, the base station 12-1 does not need the uplink transmissions from the base stations 12-2 and 12-3 and, therefore, can ignore those uplink transmissions. This reduces processing requirements for UL CoMP combining as well as eliminates latency issues resulting from inter-base station communication. In addition, the base station 12-1 may cause the base stations 12-2 and 12-3 to not send the uplink transmission when the uplink transmissions from the base stations 12-2 and 12-3 are not needed for successful decoding, which in turn reduces bandwidth requirements for inter-base station communication.

FIG. 25 illustrates the operation of the cellular communications network 10 of FIG. 22 to provide inter-base station MRN based UL CoMP for the wireless device 16-1 according to another embodiment in which the MRN 18 moves according to a predefined movement schedule. In this embodiment, the base station 12-1 provides geographical information to the MRN 18 that defines the target CoMP zone 20 and then MRN based UL CoMP operation is activated at the MRN 18 when the MRN 18 is positioned in the target CoMP zone 20 according to an actual measurement of the geographic location of the MRN 18 or the predefined movement schedule of the MRN 18. As illustrated, the base station 12-1 provides information to the MRN 18 that defines the target CoMP zone 20 (step 1800). In this embodiment, the information that defines the target CoMP zone 20 is geographical information (e.g., a latitude and longitude coordinate pair and a radius that defines the target CoMP zone 20 as a circular geographic area, multiple latitude and longitude pairs that define edges of a polygon that define the target CoMP zone 20 as a polygonal geographic area, or the like).

The base station 12-1 also discovers the wireless device 16-1 as a wireless device for MRN based UL CoMP using the MRN 18 when the MRN 18 is positioned in the target CoMP zone 20 (step 1802). In this embodiment, the wireless device 16-1 discovered in step 1802 is a wireless device that will benefit from MRN based UL CoMP when the MRN 18 is positioned in the target CoMP zone 20. In one particular embodiment, the wireless device 16-1 is a wireless device that is at a fixed location, where the fixed location is such that Equations (1) and (11)-(14) above are satisfied. In another particular embodiment, the wireless device 16-1 is a mobile device that is opportunistically selected by the base station 12-1 such that Equations (1) and (11)-(14) above are satisfied.

Once the wireless device 16-1 is discovered, the base station 12-1 provides information to the MRN 18 that enables or instructs the MRN 18 to provide MRN based UL CoMP operation for the wireless device 16-1 when the MRN 18 is located in the target CoMP zone 20 (step 1804). In one embodiment, this information includes information that specifically identifies the wireless device 16-1 and/or the uplink physical resources to be used by the wireless device 16-1. Thereafter, when the MRN 18 determines that the MRN 18 is positioned in the target CoMP zone 20, the MRN 18 activates MRN based UL CoMP for the wireless device 16-1 (step 1806). Depending on the particular embodiment, the MRN 18 determines that it is in the target CoMP zone 20 by, for example, determining the actual geographic location of the MRN 18 and comparing it to the geographic area defining the target CoMP zone 20 or determining when the MRN 18 is scheduled to be in the target CoMP zone 20 according to the predefined movement schedule for the MRN 18.

Note that, in an alternative embodiment, as an alternative to steps 1800, 1804, and 1806, the base station 12-1 may use the predefined schedule of movement for the MRN 18 to determine when the MRN 18 is scheduled to be positioned in the target CoMP zone 20. Then, either prior to or when the MRN 18 is scheduled to be positioned in the target CoMP zone 20, the base station 12-1 instructs the MRN 18 to activate MRN based UL CoMP for the wireless device 16-1. This instruction may define a time window in which the MRN 18 is to keep MRN based UL CoMP activated for the wireless device 16-1 (e.g., a time window that the MRN 18 is scheduled to be in the target CoMP zone 20). Alternatively, the base station 12-1 may instruct the MRN 18 to deactivate MRN based UL CoMP at the appropriate time (i.e., at the time or shortly after the time that the MRN 18 is scheduled to leave the target CoMP zone 20).

Once MRN based UL CoMP is activated, the wireless device 16-1 transmits an uplink transmission to the base station 12-1 (step 1808). The MRN 18 receives the uplink transmission from the wireless device 16-1 and re-transmits the uplink transmission to the base station 12-1 (step 1810). In addition, in this embodiment, the base stations 12-2 and 12-3 receive the uplink transmission from the wireless device 16-1 and re-transmit the uplink transmission to the base station 12-1 via inter-base station, e.g., X2, communication (steps 1812 and 1814). The base station 12-1 then combines the uplink transmission received from the wireless device 16-1 in step 1808, the re-transmission of the uplink transmission received from the MRN 18 in step 1810, and the uplink transmissions received from the base stations 12-2 and 12-3 in steps 1812 and 1814 using the desired UL CoMP combining scheme (e.g., MRC or IRC) to provide a combined uplink transmission (step 1816). The base station 12-1 then decodes the combined uplink transmission. HARQ may be used for the uplink.

Note that, in one particular embodiment, the base station 12-1 first combines the uplink transmission received from the wireless device 16-1 in step 1808 and the re-transmission of the uplink transmission received from the MRN 18 in step 1810. If the base station 12-1 is then able to successfully decode the resulting combined uplink transmission, the base station 12-1 does not need the uplink transmissions from the base stations 12-2 and 12-3 and, therefore, can ignore those uplink transmissions. This reduces processing requirements for UL CoMP combining as well as eliminates latency issues resulting from inter-base station communication. In addition, the base station 12-1 may cause the base stations 12-2 and 12-3 to not send the uplink transmission when the uplink transmissions from the base stations 12-2 and 12-3 are not needed for successful decoding, which in turn reduces bandwidth requirements for inter-base station communication.

FIG. 26 illustrates an embodiment of the cellular communications network 10 that provides inter-base station MRN based DL CoMP. In general, in this example, a coordinating set for DL CoMP for the wireless device 16-1 includes the base stations 12-2 and 12-3 in addition to the MRN 18. In this embodiment, the base station 12-1 transmits a downlink transmission for the wireless device 16-1. The MRN 18 receives the downlink transmission and re-transmits the downlink transmission to the wireless device 16-1. In this embodiment, the base station 12-1 also transmits the downlink transmission to the base stations 12-2 and 12-3 via inter-base station communication (e.g., X2 communication for LTE). Since the base stations 12-2 and 12-3 are also members of the DL CoMP coordinating set, the base stations 12-2 and 12-3 also transmit the downlink transmission to the wireless device 16-1. The wireless device 16-1 then combines the downlink transmissions from the base station 12-1, the MRN 18, the base station 12-2, and the base station 12-3 according to the desired DL CoMP combining scheme to thereby provide a combined downlink transmission.

In this embodiment, the target CoMP zone 20 is defined such that, when the MRN 18 is in the target CoMP zone 20: (1) the downlink transmission from the MRN 18 to the wireless device 16-1 is relatively strong as compared to a dominant downlink interferer at the wireless device 16-1 resulting from a downlink transmission in a neighboring cell 14 using the same downlink physical resources, (2) the downlink transmission from the base station 12-1 to the MRN 18 is relatively strong as compared to the dominant downlink interferer as seen at the MRN 18, and (3) self-interference at the MRN 18 resulting from the downlink transmissions from the base stations 12-2 and 12-3 is mitigated. "Self-interference" implies interference due to the transmission of the same information data stream from a different node (e.g., different base stations 12). Also, criterion (3) is valid if the same downlink frequency resources are used at the base station 12-1 for transmitting to both the wireless device 16-1 and the MRN 18, and the same frequency resources are used from base stations 12-2 and 12-3.

FIGS. 27A and 27B illustrate the operation of the cellular communications network 10 of FIG. 26 to provide MRN based DL CoMP for the wireless device 16-1 according to one embodiment in which the MRN 18 autonomously moves to the target CoMP zone 20. The embodiment of FIGS. 27A and 27B is similar to that of FIGS. 23A and 23B but for the downlink scenario rather than the uplink scenario.

In this embodiment, the base station 12-1 and/or the MRN 18 obtain the link metrics for the various links by transmitting corresponding CSI-RSs and, in response, receiving corresponding CQI reports. Note that while CSI-RS and CQI reports are used in this embodiment, other techniques for obtaining the link metrics can be used (e.g., SRS in the uplink). More specifically, in this embodiment, the base station 12-1 transmits a CSI-RS (CSI-RS 1), which is received by the MRN 18 and the wireless device 16-1 (step 1900). Using CSI-RS 1, the wireless device 16-1 and the MRN 18 generate CQI values for the corresponding links and then return the CQI values to the base station 12-1 in corresponding CQI reports (steps 1902 and 1904).

In addition, the MRN 18 transmits a CSI-RS (CSI-RS 2), which is received by the wireless device 16-1 (step 1906). Using CSI-RS 2, the wireless device 16-1 generates a CQI value for the corresponding link between the MRN 18 and the wireless device 16-1 and then returns the CQI value to the MRN 18 in a corresponding CQI report (step 1908). In this embodiment, the CQI report from the wireless device 16-1 may also be received by the base station 12-1. However, the present disclosure is not limited thereto. Rather, in an alternative embodiment, the CQI report in step 1908 is received only by the MRN 18, where the MRN 18 subsequently sends the CQI report or the CQI value from the CQI report to the base station 12-1.

Still further, in this embodiment, the base station 12-2 serving the cell 14-2, which is part of the DL CoMP coordinating set, transmits a CSI-RS (CSI-RS 3), which is received by the MRN 18 (step 1910). Using CSI-RS 3, the MRN 18 generates a CQI value for the corresponding link to the base station 12-2 and then sends the CQI value to the base station 12-1 in a corresponding CQI report (step 1912). Alternatively, the CQI report may be returned to the base station 12-2, where the base station 12-2 then sends the CQI report or the CQI value from the CQI report to the base station 12-1 via inter-base station communication. Likewise, the base station 12-3 serving the cell 14-3, which is part of the DL CoMP coordinating set, transmits a CSI-RS (CSI-RS 4), which is received by the MRN 18 (step 1914). Using CSI-RS 4, the MRN 18 generates a CQI value for the corresponding link to the base station 12-3 and then sends the CQI value to the base station 12-1 in a corresponding CQI report (step 1916). Alternatively, the CQI report may be returned to the base station 12-3, where the base station 12-3 then sends the CQI report or the CQI value from the CQI reports to the base station 12-1 via inter-base station communication.

In the same manner, a base station 12-X serving a neighboring cell 14-X of the base station 12-1 transmits a CSI-RS (CSI-RS 5), which is received by the wireless device 16-1 and the MRN 18 (step 1918). The base station 12-X is a neighboring base station of the base station 12-1 that is not part of the DL CoMP coordinating set and, as discussed below, is a source of a dominant interferer to the downlink to the wireless device 16-1. Using CSI-RS 5, the wireless device 16-1 and the MRN 18 generate CQI values for the corresponding links to the base station 12-X and then send the CQI values to the base station 12-1 in corresponding CQI reports (steps 1920 and 1922). Alternatively, the CQI reports may be returned to the base station 12-X, where the base station 12-X then sends the CQI reports or the CQI values from the CQI reports to the base station 12-1 via inter-base station communication.

Next, using at least some of the CQI values obtained in steps 1900-1922, the base station 12-1 discovers the wireless device 16-1 as a wireless device for MRN based DL CoMP (step 1924). In general, in step 1924, the base station 12-1 discovers the wireless device 16-1 as a wireless device that will benefit from MRN based DL CoMP. In one embodiment, the base station 12-1 utilizes Equation (4) above for discovery of the wireless device 16-1. Once the wireless device 16-1 is discovered, the base station 12-1 identifies the base station 12-X as a source of a dominant interferer to the downlink from the base station 12-1 to the wireless device 16-1 (step 1926). While the identification of the base station 12-2 as the source of the dominant interferer can be performed using any suitable process, in one embodiment, the base station 12-1 receives reports on the signal strength at pilot symbols received from the strongest cells. Thus, the base station 12-1 is aware of the neighboring base station 12-2 with the shortest radio distance to the wireless device 16-1. In addition, the base station 12-1 can combine this information with information on scheduling decisions of the strongest neighboring base stations 12 so as to estimate with higher accuracy the base station 12-2 as the source of the dominant interferer.

In this embodiment, the base station 12-1 also obtains geographic locations of the wireless device 16-1 and the base stations 12-2, 12-3, and 12-X (step 1928). As discussed above, the geographic locations of the wireless device 16-1 and the base stations 12-2, 12-3, and 12-X can be obtained using any suitable technique. Note that step 1928 is optional.

Next, based on at least some of the CQI values and/or at least some of the geographic locations of the wireless device 16-1 and the base stations 12-2, 12-3, and 12-X, the base station 12-1 determines whether the MRN 18 is in the target CoMP zone 20 for DL CoMP for the wireless device 16-1 (step 1930). In this particular example, the base station 12-1 determines that the MRN 18 is not in the target CoMP zone 20. In this embodiment, the target CoMP zone 20 is defined based on the link metrics for $S_{1e,DL}$, $S_{1R,DL}$, $S'_{X1,DL}$ (interfering signal from the base station 12-X to the MRN 18), $S_{1X,DL}$ (interfering signal from the base station 12-X to the wireless device 16-1), $S'_{21,DL}$ (self-interfering signal from the base station 12-2 to the MRN 18), and $S'_{31,DL}$ (self-interfering signal from the base station 12-3 to the MRN 18).

In general, the target CoMP zone 20 is defined based on the link metrics such that: (1) the radio distance between the source of the dominant downlink interferer, i.e., the base station 12-X, and the MRN 18 is relatively large as compared to the radio distance between the base station 12-1 and the MRN 18, (2) the radio distance between the source of the dominant downlink interferer, i.e., the base station 12-X, and the wireless device 16-1 is relatively large as compared to the radio distance between the MRN 18 and the wireless device 16-1, and (3) the radio distances between the base stations 12-2 and 12-3 in the DL CoMP coordinating set and the MRN 18 are relatively large as compared to the radio distance between the base station 12-1 and the MRN 18. In other words, the target CoMP zone 20 is defined based on the link metrics such that: (1) the dominant downlink interferer seen at the MRN 18 is relatively weak as compared to the downlink from the base station 12-1 to the MRN 18, (2) the dominant downlink interferer at the wireless device 16-1 is relatively weak as compared to the downlink signal from the MRN 18 to the wireless device 16-1, and (3) the self-interference seen at the MRN 18 resulting from the downlink signals from the base stations 12-2 and 12-3 to the wireless device 16-1 is relatively weak as compared to the downlink signal from the base station 12-1 to the MRN 18.

More specifically, in one particular embodiment, the target CoMP zone 20 is defined by the following equations:

$$\gamma_{2,DL} = \frac{CQI_{S_{1e,DL}}}{CQI_{S'_{X1,DL}} + I + n} > Threshold2_{DL} \quad (15)$$

$$\gamma_{3,DL} = \frac{CQI_{S_{1R,DL}}}{CQI_{S_{X1,DL}} + I + n} > Threshold3_{DL} \quad (16)$$

$$\gamma_{4,DL} = \frac{CQI_{S_{1e,DL}}}{CQI_{S'_{21,DL}} + I + n} > Threshold4_{DL} \quad (17)$$

$$\gamma_{5,DL} = \frac{CQI_{S_{1e,DL}}}{CQI_{S'_{31,DL}} + I + n} > Threshold5_{DL} \quad (18)$$

where $CQI_{S_{1e,DL}}$ is the CQI value for the link between the base station 12-1 and the MRN 18, $CQI_{S'_{X1,DL}}$ is the CQI value for the link for the interfering signal from the base station 12-X to the MRN 18, $CQI_{S_{1R,DL}}$ is the CQI value for the link between the MRN 18 and the wireless device 16-1, $CQI_{S_{X1,DL}}$ is the CQI value for the link for the interfering signal from the base station 12-X to the wireless device 16-1, $CQI_{S'_{21,DL}}$ is the CQI value for the link for the self-interference from the base station 12-2 to the MRN 18, $CQI_{S'_{31,DL}}$ is the CQI value for the link for the self-interference from the base station 12-3 to the MRN 18, I is interference, n is noise, and Threshold2$_{DL}$, Threshold3$_{DL}$, Threshold4$_{DL}$, and Threshold5$_{DL}$ are predefined threshold values. In one embodiment, the predefined threshold values (Threshold2$_{UL}$, Threshold3$_{UL}$, Threshold4$_{UL}$, and Threshold5$_{UL}$) are network settable values. The predefined threshold values (Threshold2$_{DL}$, Threshold3$_{DL}$, Threshold4$_{DL}$, and Threshold5$_{DL}$) are defined such that, when Y is greater than Threshold2$_{DL}$, $\gamma_{3,DL}$ is greater than Threshold3$_{DL}$, $\gamma_{4,DL}$ is greater than Threshold4$_{DL}$, and $\gamma_{5,DL}$ is greater than Threshold5$_{DL}$, the MRN 18 is in the target CoMP zone 20. The base station 12-1 can thus determine where the MRN 18 is in relation to the target CoMP zone 20 based on the CQI values for the appropriate links obtained in steps 1900-1922 and, in some embodiments, the geographic locations of the wireless device 16-1 and the base stations 12-2, 12-3, and 12-X.

In response to determining that the MRN 18 is not in the target CoMP zone 20, the base station 12-1 sends an instruction to the MRN 18 to move toward the target CoMP zone 20 (step 1932). In response to receiving the instruction to move, the MRN 18 moves according to the instruction (step 1934). In this embodiment, sometime thereafter, the base station 12-1 updates the CQI information, or values, for the appropriate links and, in some embodiments, the geographic location of the wireless device 16-1 (step 1936). The base station 12-1 then determines whether the MRN 18 is now in the target CoMP zone 20 and, if not, instructs the MRN 18 to continue to move toward the target CoMP zone 20 (step 1938). The process of steps 1936 and 1938 continues until the base station 12-1 determines that the MRN 18 is in the target CoMP zone 20 (step 1940). In response, the base station 12-1 then sends an instruction to the MRN 18 to enable MRN based DL CoMP for the wireless device 16-1 (step 1942).

After enabling MRN based DL CoMP for the wireless device 16-1 at the MRN 18, the base station 12-1 sends a downlink transmission for the wireless device 16-1 to the base stations 12-2 and 12-3 (steps 1944 and 1946) via inter-base station communication and transmits the downlink transmission to the wireless device 16-1 and the MRN 18 (step 1948). The MRN 18 receives the downlink transmission from the base station 12-1 and re-transmits the downlink transmission to the wireless device 16-1 (step 1950). In addition, the base stations 12-2 and 12-3 transmit the downlink transmission to the wireless device 16-1 (steps 1952 and 1954). The wireless device 16-1 then combines the downlink transmission received from the base station 12-1 in step 1948, the re-transmission of the downlink transmission received from the MRN 18 in step 1950, and the downlink transmissions received from the base stations 12-2 and 12-3 in steps 1952 and 1954 using the desired DL CoMP combining scheme (e.g., MRC or IRC) to provide a combined downlink transmission (step 1956). The wireless device 16-1 then decodes the combined downlink transmission. As described above for the uplink scenario, HARQ may be utilized for the downlink as well.

Note that, in one particular embodiment, the wireless device 16-1 first combines the downlink transmission received from the base station 12-1 received in step 1948 and the re-transmission of the downlink transmission received from the MRN 18 in step 1950. If the wireless device 16-1 is then able to successfully decode the resulting combined downlink transmission, the wireless device 16-1 does not need the downlink transmissions from the base stations 12-2 and 12-3 and, therefore, can ignore those downlink transmissions. This reduces processing requirements for DL CoMP combining as well as eliminates latency issues resulting from inter-base station communication. In addition, the base station 12-1 or the wireless device 16-1 may cause the base stations 12-2 and 12-3 to not transmit the downlink transmission when the downlink transmissions from the base stations 12-2 and 12-3 are not needed for successful decoding, which in turn reduces bandwidth requirements for inter-base station communication.

Before proceeding, it should be noted that while the base station 12-1 determines whether the MRN 18 is located in the target CoMP zone 20 and instructs the MRN 18 to move accordingly in the embodiment of FIGS. 27A and 27B, the present disclosure is not limited thereto. In one alternative embodiment, the link metrics are provided to the MRN 18, and the MRN 18 determines whether the MRN 18 is in the target CoMP zone 20. If not, the MRN 18 autonomously moves to the target CoMP zone 20 using, for example, a suitable search algorithm.

It should also be noted that while, in the example above, the wireless device 16-1 is discovered and the target CoMP zone 20 is defined based on Equations (4) and (15)-(18), the present disclosure is not limited thereto. In addition to or as an alternative to the metrics in Equations (4) and (15)-(18), other possible metrics can be employed to define the target CoMP zone 20 in order to minimize interference (e.g., SINR and/or SLNR). It should also be noted that, if the signal $S_{11,DL}$ is too weak (e.g., the SINR is below the predefined threshold value Threshold$1_{DL}$) to constructively contribute to a CoMP type signal, the wireless device 16-1 may chose to ignore it and only decode the downlink transmission for the wireless device 16-1 received from the MRN 18.

FIG. 28 illustrates the operation of the cellular communications network 10 of FIG. 26 to provide inter-base station MRN based DL CoMP for the wireless device 16-1 according to one embodiment in which the MRN 18 moves according to a predefined movement schedule. In this embodiment, the base station 12-1 obtains link metrics for the various links only when the MRN 18 is to be located in the target CoMP zone 20 according to the predefined movement schedule for the MRN 18. The embodiment of FIG. 28 is similar to that of FIG. 24 but for the downlink scenario rather than the uplink scenario.

First, the base station 12-1 determines when the MRN 18 is to be in the target CoMP zone 20 based on the predefined schedule of movement for the MRN 18 (step 2000). For example, the MRN 18 may be located on a bus that has a predefined schedule of movement. The schedule of movement of the bus can therefore be used as the predefined schedule of movement for the MRN 18. Further, using historical information, the base station 12-1 determines a geographical area that corresponds to the target CoMP zone 20. For example, the process of FIGS. 27A and 27B may have previously been performed a number of times for one or more wireless devices 16. Based on information gathered during those iterations of the process of FIGS. 27A and 27B, the base station 12-1 can determine a geographical area that is frequently a target CoMP zone for MRN based DL CoMP. This geographical area can then be used by the base station 12-1 as the target CoMP zone 20. Then, by comparing the predefined schedule of movement for the MRN 18 and the geographical area corresponding to the target CoMP zone 20, the base station 12-1 determines when the MRN 18 is to be in the target CoMP zone 20.

Next, the base station 12-1 schedules transmission of CSI-RS in a time window during which the MRN 18 is scheduled to be in the target CoMP zone 20 (step 2002). The base station 12-1 then transmits a CSI-RS (CSI-RS 1) as scheduled, where CSI-RE 1 is received by the MRN 18 and the wireless device 16-1 (step 2004). Using CSI-RS 1, the wireless device 16-1 generates a CQI value for the corresponding link and then returns the CQI value to the base station 12-1 in a corresponding CQI report (step 2006). In addition, the MRN 18 transmits a CSI-RS (CSI-RS 2), which is received by the wireless device 16-1 (step 2008). Using CSI-RS 2, the wireless device 16-1 generates a CQI value for the corresponding link between the MRN 18 and the wireless device 16-1 and then returns the CQI value to the MRN 18 in a corresponding CQI report (step 2010). In this embodiment, the CQI report from the wireless device 16-1 may also be received by the base station 12-1. However, the present disclosure is not limited thereto. Rather, in an alternative embodiment, the CQI report in step 2010 is received only by the MRN 18, where the MRN 18 subsequently sends the CQI report or the CQI value from the CQI report to the base station 12-1. Like the wireless device 16-1, using CSI-RS 1, the MRN 18 generates a CQI value for the corresponding link and then returns the CQI value to the base station 12-1 in corresponding CQI report (step 2012).

Still further, in this embodiment, the base station 12-2, which is part of the DL CoMP coordinating set, transmits a CSI-RS (CSI-RS 3), which is received by the MRN 18 (step 2014). Using CSI-RS 3, the MRN 18 generates a CQI value for the corresponding link to the base station 12-2 and then sends the CQI value to the base station 12-1 in a corresponding CQI report (step 2016). Alternatively, the CQI report may be returned to the base station 12-2, where the base station 12-2 then sends the CQI report or the CQI value from the CQI report to the base station 12-1 via inter-base station communication. Likewise, the base station 12-3, which is part of the DL CoMP coordinating set, transmits a CSI-RS (CSI-RS 4), which is received by the MRN 18 (step 2018). Using CSI-RS 4, the MRN 18 generates a CQI value for the corresponding link to the base station 12-3 and then sends the CQI value to the base station 12-1 in a corresponding CQI report (step 2020). Alternatively, the CQI report may be returned to the base station 12-3, where the base station 12-3 then sends the CQI report or the CQI value from the CQI reports to the base station 12-1 via inter-base station communication.

In the same manner, a base station 12-X serving a neighboring cell 14-X of the base station 12-1 transmits a CSI-RS (CSI-RS 5), which is received by the wireless device 16-1 and the MRN 18 (step 2022). The base station 12-X is a neighboring base station of the base station 12-1 that is not part of the DL CoMP coordinating set and, as discussed below, is a source of a dominant interferer to the downlink to the wireless device 16-1. Using CSI-RS 5, the wireless device 16-1 and the MRN 18 generate CQI values for the corresponding links to the base station 12-X and then send the CQI values to the base station 12-1 in corresponding CQI reports (steps 2024 and 2026). Alternatively, the CQI reports may be returned to the base station 12-X, where the base station 12-X then sends the CQI reports or the CQI values from the CQI reports to the base station 12-1 via inter-base station communication.

Next, using at least some of the CQI values obtained in steps 2004-2026, the base station 12-1 discovers the wireless device 16-1 as a wireless device for MRN based DL CoMP (step 2028). More specifically, in one embodiment, the base station 12-1 discovers the wireless device 16-1 based on Equation (4) above. In addition, the base station 12-1 may utilize the other link metrics (e.g., utilize Equations (15)-(18) above) as part of the discovery process to ensure discovery of a wireless device for which the target CoMP zone 20 is in fact the target CoMP zone for the wireless device.

Once the wireless device 16-1 is discovered, the base station 12-1 provides information to the MRN 18 that enables or instructs the MRN 18 to provide MRN based DL CoMP operation for the wireless device 16-1 (step 2030). In one embodiment, this information includes information that specifically identifies the wireless device 16-1 and/or the downlink physical resources to be used for the downlink to the wireless device 16-1. Sometime thereafter, the base station 12-1 sends a downlink transmission for the wireless device 16-1 to the base stations 12-2 and 12-3 (steps 2032 and 2034) via inter-base station communication and transmits the downlink transmission to the wireless device 16-1 and the MRN 18 (step 2036). The MRN 18 receives the downlink transmission from the base station 12-1 and re-transmits the downlink transmission to the wireless device 16-1 (step 2038). In addition, the base stations 12-2 and 12-3 transmit the downlink transmission to the wireless device 16-2 (steps 2040 and 2042). The wireless device 16-1 then combines the downlink transmission received from the base station 12-1 in step 2036, the re-transmission of the downlink transmission received from the MRN 18 in step 2038, and the downlink transmissions received from the base stations 12-2 and 12-3 in steps 2040 and 2042 using the desired DL CoMP combining scheme (e.g., MRC or IRC) to provide a combined downlink transmission (step 2044). The wireless device 16-1 then decodes the combined downlink transmission. As described above for the uplink scenario, HARQ may be utilized for the downlink as well.

Note that, in one particular embodiment, the wireless device 16-1 first combines the downlink transmission received from the base station 12-1 received in step 2036 and the re-transmission of the downlink transmission received from the MRN 18 in step 2038. If the wireless device 16-1 is then able to successfully decode the resulting combined downlink transmission, the wireless device 16-1 does not need the downlink transmissions from the base stations 12-2 and 12-3 and, therefore, can ignore those downlink transmissions. This reduces processing requirements for DL CoMP combining as well as eliminates latency issues resulting from inter-base station communication. In addition, the base station 12-1 or the wireless device 16-1 may cause the base stations 12-2 and 12-3 to not transmit the downlink transmission when the downlink transmissions from the base stations 12-2 and 12-3 are not needed for successful decoding, which in turn reduces bandwidth requirements for inter-base station communication.

FIG. 29 illustrates the operation of the cellular communications network 10 of FIG. 26 to provide inter-base station MRN based DL CoMP for the wireless device 16-1 according to another embodiment in which the MRN 18 moves according to a predefined movement schedule. This embodiment is similar to that of FIG. 25 but for the downlink scenario rather than the uplink scenario. In this embodiment, the base station 12-1 provides geographical information to the MRN 18 that defines the target CoMP zone 20 and then MRN based DL CoMP operation is activated at the MRN 18 when the MRN 18 is positioned in the target CoMP zone 20 according to an actual measurement of the geographic location of the MRN 18 or the predefined movement schedule of the MRN 18. As illustrated, the base station 12-1 provides information to the MRN 18 that defines the target CoMP zone 20 (step 2100). In this embodiment, the information that defines the target CoMP zone 20 is geographical information (e.g., a latitude and longitude coordinate pair and a radius that defines the target CoMP zone 20 as a circular geographic area, multiple latitude and longitude pairs that define edges of a polygon that define the target CoMP zone 20 as a polygonal geographic area, or the like).

The base station 12-1 also discovers the wireless device 16-1 as a wireless device for MRN based DL CoMP using the MRN 18 when the MRN 18 is positioned in the target CoMP zone 20 (step 2102). In this embodiment, the wireless device 16-1 discovered in step 2102 is a wireless device that will benefit from MRN based DL CoMP when the MRN 18 is positioned in the target CoMP zone 20. In one particular embodiment, the wireless device 16-1 is a wireless device that is at a fixed location, where the fixed location is such that Equations (4) and (15)-(18) above are satisfied. In another particular embodiment, the wireless device 16-1 is a mobile device that is opportunistically selected by the base station 12-1 such that Equations (4) and (15)-(18) above are satisfied.

Once the wireless device 16-1 is discovered, the base station 12-1 provides information to the MRN 18 that enables or instructs the MRN 18 to provide MRN based DL CoMP operation for the wireless device 16-1 when the MRN 18 is located in the target CoMP zone 20 (step 2104). In one embodiment, this information includes information that specifically identifies the wireless device 16-1 and/or the downlink physical resources to be used for the downlink from the base station 12-1 to the wireless device 16-1. Thereafter, when the MRN 18 determines that the MRN 18 is positioned in the target CoMP zone 20, the MRN 18 activates MRN based DL CoMP for the wireless device 16-1 (step 2106). Depending on the particular embodiment, the MRN 18 determines that it is in the target CoMP zone 20 by, for example, determining the actual geographic location of the MRN 18 and comparing it to the geographic area defining the target CoMP zone 20 or determining when the MRN 18 is scheduled to be in the target CoMP zone 20 according to the predefined movement schedule for the MRN 18.

Note that, in an alternative embodiment, as an alternative to steps 2100, 2104, and 2106, the base station 12-1 may use the predefined schedule of movement for the MRN 18 to determine when the MRN 18 is scheduled to be positioned in the target CoMP zone 20. Then, either prior to or when the MRN 18 is scheduled to be positioned in the target CoMP zone 20, the base station 12-1 instructs the MRN 18 to activate MRN based DL CoMP for the wireless device 16-1. This instruction may define a time window in which the MRN 18 is to keep MRN based DL CoMP activated for the wireless device 16-1 (e.g., a time window that the MRN 18 is scheduled to be in the target CoMP zone 20). Alternatively, the base station 12-1 may instruct the MRN 18 to deactivate MRN based DL CoMP at the appropriate time (i.e., at the time or shortly after the time that the MRN 18 is scheduled to leave the target CoMP zone 20).

Once MRN based DL CoMP is activated, the base station 12-1 sends a downlink transmission for the wireless device 16-1 to the base stations 12-2 and 12-3 (steps 2108 and 2110) via inter-base station communication and transmits the downlink transmission to the wireless device 16-1 and the MRN 18 (step 2112). The MRN 18 receives the downlink transmission from the base station 12-1 and re-transmits the downlink transmission to the wireless device 16-1 (step 2114). In addition, the base stations 12-2 and 12-3 transmit the downlink transmission to the wireless device 16-1 (steps 2116 and 2118). The wireless device 16-1 then combines the downlink transmission received from the base station 12-1 in step 2112, the re-transmission of the downlink transmission received from the MRN 18 in step 2114, and the downlink transmissions received from the base stations 12-2 and 12-3 in steps 2116 and 2118 using the desired DL CoMP combining scheme (e.g., MRC or IRC) to provide a combined downlink transmission (step 2120). The wireless device 16-1 then decodes the combined downlink transmission. As described above for the uplink scenario, HARQ may be utilized for the downlink as well.

Note that, in one particular embodiment, the wireless device 16-1 first combines the downlink transmission received from the base station 12-1 received in step 2112 and the re-transmission of the downlink transmission received from the MRN 18 in step 2114. If the wireless device 16-1 is then able to successfully decode the resulting combined downlink transmission, the wireless device 16-1 does not need the downlink transmissions from the base stations 12-2 and 12-3 and, therefore, can ignore those downlink transmissions. This reduces processing requirements for DL CoMP combining as well as eliminates latency issues resulting from inter-base station communication. In addition, the base station 12-1 or the wireless device 16-1 may cause the base stations 12-2 and 12-3 to not transmit the downlink transmission when the downlink transmissions from the base stations 12-2 and 12-3 are not needed for successful decoding, which in turn reduces bandwidth requirements for inter-base station communication.

FIG. 30 is a block diagram of one of the base stations 12 in the cellular communications network 10 according to one embodiment of the present disclosure. As illustrated, the base station 12 includes a radio subsystem 26 and a processing subsystem 28. The radio subsystem 26 generally includes analog and, in some embodiments, digital components for wirelessly sending and receiving data to and from the wireless devices 16 within the corresponding cell 14 and the MRN 18 within the corresponding cell 14. In particular embodiments, the radio subsystem 26 may represent or include one or more Radio Frequency (RF) transceiver(s), or separate RF transmitter(s) and receiver(s), capable of transmitting suitable information wirelessly to and receiving suitable information from other network components or nodes. From a wireless communications protocol view, the radio subsystem 26 implements at least part of Layer 1 (i.e., the Physical or "PHY" Layer).

The processing subsystem 28 generally implements any remaining portion of Layer 1 not implemented in the radio subsystem 26 as well as functions for higher layers in the wireless communications protocol (e.g., Layer 2 (data link layer), Layer 3 (network layer), etc.). In particular embodiments, the processing subsystem 28 may comprise, for example, one or several general-purpose or special-purpose microprocessors or other microcontrollers programmed with suitable software and/or firmware to carry out some or all of the functionality of the base station 12 described herein. In addition or alternatively, the processing subsystem 28 may comprise various digital hardware blocks (e.g., one or more Application Specific Integrated Circuits (ASICs), one or more off-the-shelf digital and analog hardware components, or a combination thereof) configured to carry out some or all of the functionality of the base station 12 described herein. Additionally, in particular embodiments, the above described functionality of the base station 12 may be implemented, in whole or in part, by the processing subsystem 28 executing software or other instructions stored on a non-transitory computer-readable medium, such as Random Access Memory (RAM), Read Only Memory (ROM), a magnetic storage device, an optical storage device, or any other suitable type of data storage components. Lastly, the base station 12 includes a network interface 30 that provides a wired connection for inter-base station communication.

FIG. 31 is a block diagram of the MRN 18 according to one embodiment of the present disclosure. As illustrated, the MRN 18 includes a radio subsystem 32 and a processing subsystem 34. The radio subsystem 32 generally includes analog and, in some embodiments, digital components for wirelessly sending and receiving data to and from the base stations 12 and the wireless devices 16. In particular embodiments, the radio subsystem 32 may represent or include one or more RF transceivers, or separate RF transmitter(s) and receiver(s), capable of transmitting suitable information wirelessly to and receiving suitable information from other network components or nodes. From a wireless communications protocol view, the radio subsystem 32 implements at least part of Layer 1 (i.e., the Physical or "PHY" Layer).

The processing subsystem 34 generally implements any remaining portion of Layer 1 as well as functions for higher layers in the wireless communications protocol (e.g., Layer 2 (data link layer), Layer 3 (network layer), etc.). In particular embodiments, the processing subsystem 34 may comprise, for example, one or several general-purpose or special-purpose microprocessors or other microcontrollers programmed with suitable software and/or firmware to carry out some or all of the functionality of the MRN 18 described herein. In addition or alternatively, the processing subsystem 34 may comprise various digital hardware blocks (e.g., one or more ASICs, one or more off-the-shelf digital and analog hardware components, or a combination thereof) configured to carry out some or all of the functionality of the MRN 18 described herein. Additionally, in particular embodiments, the above described functionality of the MRN 18 may be implemented, in whole or in part, by the processing subsystem 34 executing software or other instructions stored on a non-transitory computer-readable medium, such as RAM, ROM, a magnetic storage device, an optical storage device, or any other suitable type of data storage components. Of course, the detailed operation for each of the functional protocol layers, and thus the radio subsystem 32 and the processing subsystem 34, will vary depending on both the particular implementation as well as the standard or standards supported by the MRN 18.

FIG. 32 is a block diagram of one of the wireless devices 16 according to one embodiment of the present disclosure. As illustrated, the wireless device 16 includes a radio subsystem 36 and a processing subsystem 38. The radio subsystem 36 generally includes analog and, in some embodiments, digital components for wirelessly sending and receiving data to and from the base stations 12 and the MRN 18. In particular embodiments, the radio subsystem 36 may represent or include one or more RF transceivers, or separate RF transmitter(s) and receiver(s), capable of transmitting suitable information wirelessly to and receiving suitable information from other network components or nodes. From a wireless communications protocol view, the radio subsystem 36 implements at least part of Layer 1 (i.e., the Physical or "PHY" Layer).

The processing subsystem 38 generally implements any remaining portion of Layer 1 as well as functions for higher layers in the wireless communications protocol (e.g., Layer 2 (data link layer), Layer 3 (network layer), etc.). In particular embodiments, the processing subsystem 38 may comprise, for example, one or several general-purpose or special-purpose microprocessors or other microcontrollers programmed with suitable software and/or firmware to carry out some or all of the functionality of the wireless device 16 described herein. In addition or alternatively, the processing subsystem 38 may comprise various digital hardware blocks (e.g., one or more ASICs, one or more off-the-shelf digital and analog hardware components, or a combination thereof) configured to carry out some or all of the functionality of the wireless device 16 described herein. Additionally, in particular embodiments, the above described functionality of the wireless device 16 may be implemented, in whole or in part, by the processing subsystem 38 executing software or other instructions stored on a non-transitory computer-readable medium, such as RAM, ROM, a magnetic storage device, an optical storage device, or any other suitable type of data storage components. Of course, the detailed operation for each of the functional protocol layers, and thus the radio subsystem 36 and the processing subsystem 38, will vary depending on both the particular implementation as well as the standard or standards supported by the wireless device 16.

The following acronyms are used throughout this disclosure.
2G $2^{nd}$ Generation
3G $3^{rd}$ Generation
3GPP $3^{rd}$ Generation Partnership Project
4G $4^{th}$ Generation
ASIC Application Specific Integrated Circuit
CoMP Coordinated Multipoint
CPRI Common Public Radio Interface
CPU Central Processing Unit
CQI Channel Quality Index
CSI-RS Channel State Information Reference Signal
DL Downlink
DSP Digital Signal Processing
eNB Enhanced Node B
FDD Frequency Division Duplexing
FFR Fractional Frequency Reuse
Gbps Gigabits Per Second
HARQ Hybrid Automatic Repeat Request
IRC Interference Rejection Combining
LMS Least Mean Squares
LTE Long Term Evolution
MHz Megahertz
MRC Maximum Ratio Combining
MRN Mobile Relay Node
ms Millisecond
MU-MIMO Multi-User Multiple Input and Multiple Output
OFDM Orthogonal Frequency Division Multiplexing
OTDOA Observed Time Difference of Arrival
PRS Positioning Reference Symbols
RAM Random Access Memory
RB Resource Block
RF Radio Frequency
ROM Read Only Memory
RoT Rise over Thermal
RRH Remote Radio Head
RSRP Reference Signal Received Power
RSRQ Reference Signal Received Quality
SINR Signal to Interference Noise Ratio
SLNR Signal to Leakage Noise Ratio
SRS Surrounding Reference Signals
UE User Equipment
UL Uplink
μs Microsecond
WD Wireless Device Those skilled in the art will recognize improvements and modifications to the preferred embodiments of the present disclosure. All such improvements and modifications are considered within the scope of the concepts disclosed herein and the claims that follow.

What is claimed is:

1. A network node for a cellular communications network, comprising:
a radio subsystem; and
a processing subsystem comprising one or more processors or controllers and/or one or more digital hardware blocks, the processing subsystem connected to the radio subsystem and configured to:
effect Mobile Relay Node (MRN) based Coordinated Multipoint (CoMP) operation for a wireless device via an MRN positioned in a target CoMP zone within a cell served by a serving base station of the wireless device, wherein the target CoMP zone for the wireless device is a zone within the cell served by the serving base station in which interference to the wireless device is mitigated by the MRN based CoMP operation, and wherein the target CoMP zone is a function of a plurality of link metrics comprising a link metric that is indicative of a radio distance between the MRN and the serving base station, a link metric that is indicative of a radio distance between the MRN and the wireless device, and a link metric that is indicative of a radio distance between the MRN and a second wireless device or a second base station.

2. The network node of claim 1 wherein the MRN based CoMP operation is MRN based uplink (UL) CoMP, and the target CoMP zone for the wireless device is a zone within the cell served by the serving base station in which UL interference from a second wireless device located in a cell edge area of a neighboring cell to a UL of the wireless device is mitigated by the MRN based CoMP operation.

3. The network node of claim 2 wherein the link metric that is indicative of a radio distance between the MRN and a second wireless device or a second base station comprises a link metric that is indicative of a radio distance between the MRN and the second wireless device.

4. The network node of claim 3 wherein the target CoMP zone is a zone in which the radio distance between the MRN and the serving base station is relatively less than the radio distance between the second wireless device and the serving base station and the radio distance between the MRN and the wireless device is less than the radio distance between the MRN and the second wireless device.

5. The network node of claim 1 wherein the MRN based CoMP operation is MRN based downlink (DL) CoMP, and the target CoMP zone for the wireless device is a zone within the cell served by the serving base station in which DL interference from a neighboring base station to a DL of the wireless device is mitigated by the MRN based CoMP operation.

6. The network node of claim 5 wherein the plurality of link metrics further comprises a link metric that is indicative of a radio distance between the neighboring base station and the wireless device, and a link metric that is indicative of a radio distance between the MRN and the neighboring base station.

7. The network node of claim 6 wherein the target CoMP zone is a zone in which the radio distance between the MRN and the serving base station is less than the radio distance between the MRN and the neighboring base station and the radio distance between the MRN and the wireless device is less than the radio distance between the neighboring base station and the wireless device.

8. The network node of claim 1 wherein the network node is the serving base station.

9. The network node of claim 8 wherein the processing subsystem is further configured to discover the wireless device as a wireless device for MRN based CoMP operation.

10. The network node of claim 8 wherein:
the target CoMP zone for the wireless device is a zone within the cell served by the serving base station in which uplink (UL) interference from a second wireless device located in a cell edge area of a neighboring cell to a UL of the wireless device is mitigated by the MRN based CoMP operation; and
the processing subsystem is further configured to:
discover the wireless device as a wireless device for MRN based CoMP operation; and
in order to effect MRN based CoMP operation for the wireless device, effect autonomous movement of the MRN to the target CoMP zone.

11. The network node of claim 10 wherein the processing subsystem is further configured to:
receive a UL transmission from the wireless device;
receive a relayed version of the UL transmission from the MRN; and
combine the UL transmission and the relayed version of the UL transmission according to a desired UL CoMP scheme.

12. The network node of claim 10 wherein the processing subsystem is further configured to:
receive a UL transmission from the wireless device in a first Fractional Frequency Reuse (FFR) partition allocated for wireless devices in a cell edge area of the cell of the serving base station of the wireless device;
receive a relayed version of the UL transmission from the MRN in a second FFR partition allocated for wireless devices in the cell edge area of the neighboring cell; and
combine the UL transmission and the relayed version of the UL transmission according to a desired UL CoMP scheme.

13. The network node of claim 12 wherein the second FFR partition is a FFR partition of a cell edge area of a neighboring cell for which there is a greatest radio distance between the MRN and a wireless device in the cell edge area of the neighboring cell that utilizes the second FFR partition and is served by a base station serving the neighboring cell.

14. The network node of claim 10 wherein the MRN is one of a plurality of network nodes in a coordinated set of network nodes for UL CoMP for the wireless device.

15. The network node of claim 8 wherein:
the target CoMP zone for the wireless device is a zone within the cell served by the serving base station in which downlink (DL) interference from a neighboring base station to a DL to the wireless device is mitigated by the MRN based CoMP operation; and
the processing subsystem is further configured to:
discover the wireless device as a wireless device for MRN based CoMP operation; and
in order to effect MRN based CoMP operation for the wireless device, effect autonomous movement of the MRN to the target CoMP zone.

16. The network node of claim 15 wherein the processing subsystem is further configured to transmit a DL transmission for the wireless device such that the wireless device receives the DL transmission and a version of the DL transmission relayed by the MRN and combines the DL transmission and the version of the DL transmission relayed by the MRN according to a desired DL CoMP scheme.

17. The network node of claim 15 wherein the MRN is one of a plurality of network nodes in a coordinated set of network nodes for DL CoMP for the wireless device.

18. The network node of claim 8 wherein the processing subsystem is further configured to:
determine when the MRN is to be in the target CoMP zone based on a predefined movement schedule of the MRN;
discover the wireless device as a wireless device for MRN based CoMP operation when the MRN is in the target CoMP zone; and
in order to effect MRN based CoMP operation for the wireless device, provide information to the MRN that enables the MRN to provide MRN based CoMP operation for the wireless device.

19. The network node of claim 18 wherein:
the target CoMP zone for the wireless device is a zone within the cell served by the serving base station in which uplink (UL) interference from a second wireless device located in a cell edge area of a neighboring cell to a UL of the wireless device is mitigated by the MRN based CoMP operation; and
the processing subsystem is further configured to:
obtain the plurality of link metrics, the plurality of link metrics further comprising a link metric that is indicative of a radio distance between the second wireless device and the serving base station, and a link metric that is indicative of a radio distance between the MRN and the second wireless device; and
in order to discover the wireless device, discover that the target CoMP zone is the target CoMP zone for MRN based CoMP operation for the wireless device based on the plurality of link metrics.

20. The network node of claim 18 wherein the MRN is one of a plurality of network nodes in a coordinated set of network nodes for uplink (UL) CoMP for the wireless device.

21. The network node of claim 18 wherein:
the target CoMP zone for the wireless device is a zone within the cell served by the serving base station in which downlink (DL) interference from a neighboring base station to a DL to the wireless device is mitigated by the MRN based CoMP operation; and the processing subsystem is further configured to:
obtain the plurality of link metrics, the plurality of link metrics further comprising a link metric that is indicative of a radio distance between the neighboring base station and the serving base station, and a link metric that is indicative of a radio distance between the MRN and the neighboring base station; and
in order to discover the wireless device, discover that the target CoMP zone is the target CoMP zone for MRN based CoMP operation for the wireless device based on the plurality of link metrics.

22. The network node of claim 21 wherein the MRN is one of a plurality of network nodes in a coordinated set of network nodes for DL CoMP for the wireless device.

23. The network node of claim 8 wherein, in order to effect MRN based CoMP operation for the wireless device, the processing subsystem is further configured to:
provide information that defines the target CoMP zone to the MRN;
discover the wireless device as a wireless device for an MRN based CoMP zone using the MRN; and
provide information to the MRN that enables the MRN to provide the MRN based CoMP zone for the wireless device.

24. The network node of claim 23 wherein the processing subsystem is further configured to, when the MRN is in the target CoMP zone:
receive an uplink (UL) transmission from the wireless device;
receive a relayed version of the UL transmission from the MRN; and
combine the UL transmission and the relayed version of the UL transmission according to a desired UL CoMP scheme.

25. The network node of claim 23 wherein the processing subsystem is further configured to, when the MRN is in the target CoMP zone:
receive an uplink (UL) transmission from the wireless device in a first Fractional Frequency Reuse (FFR) partition allocated for wireless devices in a cell edge area of the cell of the serving base station of the wireless device;
receive a relayed version of the UL transmission from the MRN in a second FFR partition allocated for wireless devices in a cell edge area of a neighboring cell; and
combine the UL transmission and the relayed version of the UL transmission according to a desired UL CoMP scheme.

26. The network node of claim 25 wherein the second FFR partition is a FFR partition of a cell edge area of a neighboring cell for which there is a greatest radio distance between the MRN and a wireless device in the cell edge area of the neighboring cell that utilizes the second FFR partition and is served by a base station serving the neighboring cell.

27. The network node of claim 23 wherein the MRN is one of a plurality of network nodes in a coordinated set of network nodes for uplink (UL) CoMP for the wireless device.

28. The network node of claim 23 wherein the processing subsystem is further configured to, when the MRN is in the target CoMP zone:
transmit a downlink (DL) transmission for the wireless device, wherein the wireless device receives the DL transmission and a version of the DL transmission relayed by the MRN and combines the DL transmission and the version of the DL transmission relayed by the MRN according to a desired DL CoMP scheme.

29. The network node of claim 23 herein the MRN is one of a plurality of network nodes in a coordinated set of network nodes for downlink (DL) CoMP for the wireless device.

30. The network node of claim 1 wherein the network node is the MRN.

31. The network node of claim 30 wherein:
the MRN based CoMP operation is MRN based uplink (UL) CoMP, and the target CoMP zone for the wireless device is a zone within the cell served by the serving base station in which UL interference from a second wireless device located in a cell edge area of a neighboring cell to a UL of the wireless device is mitigated by the MRN based CoMP operation; and
in order to effect MRN based CoMP operation for the wireless device, the processing subsystem is further configured to autonomously move to the target CoMP zone.

32. The network node of claim 31 wherein the processing subsystem is further configured to:
receive a UL transmission from the wireless device; and
transmit the UL transmission from the MRN to the serving base station.

33. The network node of claim 31 wherein the processing subsystem is further configured to:
receive a UL transmission from the wireless device in a first Fractional Frequency Reuse (FFR) partition allocated for wireless devices in a cell edge area of the cell of the serving base station of the wireless device; and
transmit the UL transmission from the MRN to the base station in a second FFR partition allocated for wireless devices in the cell edge area of the neighboring cell.

34. The network node of claim 33 wherein the second FFR partition is a FFR partition of a cell edge area of a neighboring cell for which there is a greatest radio distance between the MRN and a wireless device in the cell edge area of the neighboring cell that utilizes the second FFR partition and is served by a base station serving the neighboring cell.

35. The network node of claim 31 wherein the MRN is one of a plurality of network nodes in a coordinated set of network nodes for UL CoMP for the wireless device.

36. The network node of claim 30 wherein:
the target CoMP zone for the wireless device is a zone within the cell served by the serving base station in which downlink (DL) interference from a neighboring base station to a DL of the wireless device is mitigated by the MRN based CoMP operation; and
in order to effect MRN based CoMP operation for the wireless device, the processing subsystem is further configured to autonomously move to the target CoMP zone.

37. The network node of claim 36 wherein the processing subsystem is further configured to:
receive a DL transmission from the serving base station for the wireless device; and
transmit the DL transmission from the MRN to the wireless device.

38. The network node of claim 30 wherein the MRN is one of a plurality of network nodes in a coordinated set of network nodes for downlink (DL) CoMP for the wireless device.

39. The network node of claim 30 wherein the MRN moves according to a predefined movement schedule and, in order to effect MRN based CoMP operation for the wireless device, the processing subsystem is further configured to provide MRN based CoMP operation for the wireless device when the MRN is in the target CoMP zone according to the predefined movement schedule.

40. The network node of claim 30 wherein, in order to effect MRN based CoMP operation for the wireless device, the processing subsystem is further configured to:
receive information that defines the target CoMP zone; and
activate MRN based CoMP operation for the wireless device when the MRN is positioned in the target CoMP zone.

41. The network node of claim 40 wherein the MRN moves according to a predefined schedule.

42. The network node of claim 40 wherein the processing subsystem is further configured to, when the MRN is in the target CoMP zone:
receive an uplink (UL) transmission from the wireless device; and
transmit the UL transmission from the MRN to the serving base station.

43. The network node of claim 40 wherein the processing subsystem is further configured to, when the MRN is in the target CoMP zone:
receive an uplink (UL) transmission from the wireless device in a first Fractional Frequency Reuse (FFR) partition allocated for wireless devices in a cell edge area of the cell of the serving base station of the wireless device; and
transmit the UL transmission from the MRN to the serving base station in a second FFR partition allocated for wireless devices in a cell edge area of a neighboring cell.

44. The network node of claim 43 wherein the second FFR partition is a FFR partition of a cell edge area of a neighboring cell for which there is a greatest radio distance between the MRN and a wireless device in the cell edge area of the neighboring cell that utilizes the second FFR partition and is served by a base station serving the neighboring cell.

45. The node of claim 40 wherein the MRN is one of a plurality of network nodes in a coordinated set of network nodes for uplink (UL) CoMP for the wireless device.

46. The network node of claim 40 wherein the processing subsystem is further configured to, when the MRN is in the target CoMP zone:
receive a downlink (DL) transmission from the serving base station for the wireless device; and
transmit the DL transmission from the MRN to the wireless device.

47. The network node of claim 40 wherein the MRN is one of a plurality of network nodes in a coordinated set of network nodes for downlink (DL) CoMP for the wireless device.

48. A method of operation of a base station in a cellular communications network, comprising:
discovering a wireless device in a cell served by the base station of the cellular communications network for Mobile Relay Node (MRN) based Coordinated Multipoint (CoMP) operation; and
effecting MRN based CoMP operation for the wireless device via an MRN positioned in a target CoMP zone within the cell served by the base station, wherein the target CoMP zone for the wireless device is a zone within the cell served by the base station in which interference to the wireless device is mitigated by the MRN based CoMP operation, and wherein the target CoMP zone is a function of a plurality of link metrics comprising a link metric that is indicative of a radio distance between the MRN and the serving base station, a link metric that is indicative of a radio distance between the MRN and the wireless device, and a link metric that is indicative of a radio distance between the MRN and a second wireless device or a second base station.

49. A method of operation of a Mobile Relay Node (MRN) in a cellular communications network, comprising:
moving to a target Coordinated Multipoint (CoMP) zone in which to provide MRN based CoMP operation for a wireless device, wherein the target CoMP zone for the wireless device is a zone within a cell served by a serving base station of the wireless device in which interference to the wireless device is mitigated by the MRN based CoMP operation, and wherein the target CoMP zone is a function of a plurality of link metrics comprising a link metric that is indicative of a radio distance between the MRN and the serving base station, a link metric that is indicative of a radio distance between the MRN and the wireless device, and a link metric that is indicative of a radio distance between the MRN and a second wireless device or a second base station; and
in order to provide MRN based CoMP operation for the wireless device, while the MRN is in the target CoMP zone:
receiving a transmission for the wireless device; and
transmitting the transmission for the wireless device.

* * * * *